US007401632B2

(12) United States Patent
Abe et al.

(10) Patent No.: US 7,401,632 B2
(45) Date of Patent: Jul. 22, 2008

(54) METHOD AND APPARATUS OF PRESSING IN MANUFACTURING GLUED LAMINATED WOOD

(75) Inventors: Yukio Abe, Aichi (JP); Makoto Isobe, Aichi (JP); Issaku Okamura, Aichi (JP); Hiroshige Oda, Aichi (JP); Akihito Hamaguchi, Aichi (JP); Noriyuki Honda, Aichi (JP)

(73) Assignee: Meinan Machinery Works, Inc., Obu-shi (JP)

( * ) Notice: Subject to any disclaimer, the term of this patent is extended or adjusted under 35 U.S.C. 154(b) by 262 days.

(21) Appl. No.: 10/936,573

(22) Filed: Sep. 9, 2004

(65) Prior Publication Data

US 2005/0056366 A1 Mar. 17, 2005

(30) Foreign Application Priority Data

Sep. 12, 2003 (JP) ........................... P2003-320676
Mar. 31, 2004 (JP) ........................... P2004-104930

(51) Int. Cl.
*B32B 41/00* (2006.01)

(52) U.S. Cl. ....................... 156/358; 156/359; 156/362; 156/363; 156/364; 156/365; 156/367; 156/368

(58) Field of Classification Search ................. 156/358, 156/359, 362, 363, 364, 366, 583.1, 367, 156/368; 144/213, 332, 245.5, 245.7; 100/51, 100/244, 264
See application file for complete search history.

(56) References Cited

U.S. PATENT DOCUMENTS 4,608,106 A 8/1986 Lahtinen ..................... 156/182
4,797,169 A * 1/1989 Aizawa et al. ................ 156/64
5,421,951 A * 6/1995 Troutner et al. ............. 156/580

(Continued)

FOREIGN PATENT DOCUMENTS

EP 1 400 327 A 3/2004

(Continued)

OTHER PUBLICATIONS

J.C. Bohlen; "LVL Lamniated-Veneer Lumber—Development and Economics"; Forest Prod. J. vol. 22, No. 1, 1972 with partial translation.

(Continued)

*Primary Examiner*—George R Koch, III
(74) *Attorney, Agent, or Firm*—Kratz, Quintos & Hanson, LLP

(57) ABSTRACT

A method and an apparatus of wood pressing usable in manufacturing glued laminated wood such as laminated veneer lumber (LVL) using a number of wood veneer sheets are disclosed. A hot press used for wood pressing includes a pair of heating plates which are disposed one above the other and have pressing surfaces facing each other. The paired heating plates are both movable toward and away from each other. In operation, firstly one of the heating plates is moved toward the other heating plate to a position where the pressing surface of the one heating plate is spaced from a surface to which a veneer sheet is to be glued by a distance corresponding to the thickness of the veneer sheet. Then, the other heating plate is moved toward the one heating plate until a desired pressure is produced pressing.

6 Claims, 39 Drawing Sheets

U.S. PATENT DOCUMENTS

2004/0134589 A1 * 7/2004 Hill ............................ 156/100

FOREIGN PATENT DOCUMENTS

| | | |
|---|---|---|
| EP | 1 614 515 A | 1/2006 |
| JP | 53-018707 | 2/1978 |
| JP | 53-041408 | 4/1978 |
| JP | 53-075313 | 7/1978 |
| JP | 54-011215 | 1/1979 |
| JP | 55-123404 | 9/1980 |

OTHER PUBLICATIONS

European Search Report dated Dec. 2, 2003.

Patent Abstracts of Japan, vol. 2003, No. 12, Dec. 5, 2003 & JP 2005 170013, Jun. 30, 2005 * English language Abstract.

* cited by examiner (a)

(b)

(c)

(d)

(a)

(b)

(c)

(a)

(b)

(c)

(a)

(b)

(a)

(b)

(c)

(d)

(a)

(b)

(c)

(a)

(b)

(a)

(b)

(a)

(b)

METHOD AND APPARATUS OF PRESSING IN MANUFACTURING GLUED LAMINATED WOOD

BACKGROUND OF THE INVENTION

The present invention relates to a method of wood pressing in manufacturing glued laminated wood made of a number of wood sheets such as veneer sheets which are provided by rotary peeling or otherwise prepared, dried appropriately, clipped into a predetermined length, and laminated together by hot pressing with a thermosetting adhesive in such a way that a multiple-layered board of glued laminated wood is made. The invention also relates to a wood pressing apparatus for use in manufacturing the glued laminated wood.

For better understanding of the underlying background of the present invention, firstly reference is made to FIG. 1 which shows a drawing provided in the publication of "LVL Laminated-Veneer Lumber—Development and Economics" by J. C. Bohlen, Forest Prod. J. Vol. 22, No. 1, 1972. The drawing schematically shows a prior art apparatus for manufacturing LVL, that is a typical glued laminated wood, wherein a number of veneer sheets are laminated together in a staggered manner with the wood grain of each veneer sheet running primarily along the length of the resulting product or LVL board.

The apparatus includes three sets of hot presses X, Y and Z arranged at three different stages spaced at an interval along the direction in which LVL board in process is conveyed as indicated by arrow at the right-hand side on the drawing. Each of the hot presses X, Y and Z has a pair of movable upper and lower heating plates X1, Y1 and Z1 disposed one above the other, respectively. For the sake of description of the apparatus, these three sets of hot presses X, Y and Z will be referred to as the first, second and third hot presses, respectively. Though not shown specifically in the drawing, there are provided three sets of veneer feeders associated with the respective hot presses X, Y and Z, and each set includes upper and lower movable veneer sheet feeders as indicated by arrows which depict the feeding directions. In the drawing, reference symbols A, B and C designate wood veneer sheets each having substantially the same length, width and thickness and disposed in the same orientation with the wood grain thereof extending substantially parallel to each other, i.e. extending along the lengthwise direction of the LVL board in process. It is noted that, for the sake of convenience in illustration, each veneer sheet is illustrated with a thickness which is shown exaggeratedly large relative to its length and also that a conveyer for moving a board in process is omitted from the illustration.

In manufacturing LVL board with the apparatus of FIG. 1, firstly a pair of veneer sheets A depicted by shading is prepared with one surface of either one of such veneer sheets A coated with thermosetting adhesive. These veneer sheets A are fed by the first feeders for the first hot press X and combined together with the adhesive-coated surface interposed between the mating surfaces of the two veneer sheets A and with the ends thereof in an offset or staggered relation as shown in the drawing in such orientation that their wood grain extends generally along the length of LVL board to be produced. These two veneer sheets A thus placed one on the other are conveyed to the first pressing station between the first heating plates X1, where the veneer sheets A are glued together under heat and pressure by the hot press X. After the first hot pressing operation is over and the heating plates X1 are retracted, the laminated veneer sheets A are conveyed toward the second pressing station at the second hot press Y.

On the way to the second pressing station, i.e. at an appropriate position between the first and second pressing stations, another pair of veneer sheets B, indicated by shading, each having on one surface thereof adjacent to the laminated veneer sheets A coated with thermosetting adhesive is fed by the second veneer sheet feeders and laid on the opposite outer surfaces of the previously laminated veneer sheets A in a staggered relation to the veneer sheets A as shown in the drawing. The veneer sheets B thus laid onto the veneer sheets A are conveyed therewith to the second pressing station, where the veneer sheets B are pressed by the second hot press Y to be bonded to the laminated veneer sheets A.

After pressing by the second hot press Y is over, the laminated veneer sheets A and B are conveyed toward third hot press Z at the third station. At an appropriate position between the second and third pressing stations, still another pair of veneer sheets C, indicated by shading, having on the inner surfaces thereof coated with adhesive is fed by the third veneer feeders and laid on the opposite outer surfaces of the veneer sheets B in a staggered arrangement. The veneer sheets C thus placed on the laminated veneer sheets A and B are conveyed to the third pressing station, where they are similarly pressed by the third hot press Z. Thus, an assembly of laminated veneer sheets A, B and C is formed.

Steps of operation including the above veneer sheet feeding, laying, hot pressing and conveying are performed successively at the respective positions and stations, whereby an LVL board with six plies as counted through its thickness is formed. As shown in FIG. 1, any two adjacent veneer sheets A, B or C in each layer are disposed with the ends thereof abutting closely each other to form end joints, and the veneer sheets A, B and C are laid such that the end joints are distributed in a regularly staggered arrangement in the resulting LVL board.

The above-cited publication which provides the drawing of FIG. 1 showing a method and an apparatus for manufacturing LVL gives no description about the manner of operation of the respective hot presses. A hot press having a pair of upper and lower heating plates for pressing therebetween wood material such as veneer sheets for manufacturing LVL usually has one of the heating plates movable toward the other heating plate which is stationary or fixed. If such a hot press is used in the apparatus of FIG. 1, problems will occur as will be described below.

If the first, second and third hot presses X, Y and Z shown in FIG. 1 are of such structure that the lower heating plates are fixed and the upper heating plates are movable toward and away from the respective lower heating plates, the lower heating plates of the hot presses Y and Z should be arranged such that their top pressing surfaces are lower than the top pressing surface of the lower heating plate of the first hot press X by distances corresponding to the thickness and twice the thickness of veneer sheet, respectively. As apparent from the drawing of FIG. 1, however, feeding of veneer sheets B or C is extremely difficult in such arrangement of the lower heating plates.

At the hot press Y, for example, a veneer sheet B will have to be inserted into a space between the lower surface of veneer sheet A already pressed in the previous first hot press X and the top surface of the lower heating plate Y1 of the second hot press Y. Since the spaced distance between the above two surfaces of the veneer sheet A and the lower heating plate Y1 corresponds to the thickness of veneer sheet, it would be practically impossible to insert a veneer sheet B into such a limited small space and set it in place. The same is true of a veneer sheet C which is to be inserted into a similar limited small space at the third hot press Z.

If the lower heating plates Y1 and Z1 of the second and third hot presses Y and Z are set such that their top pressing surfaces are lower than the top pressing surface of the lower heating plate X1 of the first hot press by distances which are slightly greater than the thickness and twice the thickness of veneer sheet, respectively, it is still difficult to feed a veneer sheet B or C. At the second hot press Y, for example, veneer sheet B already glued to LVL in process (or the right veneer sheet B of two veneer sheets B which are shown in contact with the lower heating plate Y1 of the second hot press Y in FIG. 1) tends to be brought into contact with the lower heating plate Y1 by bending of the in-process LVL board by its own weight. As a result, the space between the lower surface of veneer sheet A already glued at the previous first hot press X and the top surface of the lower heating plate Y1 of the second hot press Y is narrowed to a distance corresponding to the veneer sheet thickness.

The spaced distance between the top surface of the lower heating plate X1 of the first hot press X and the top surfaces of the lower heating plates Y1 and Z1 of the second and third hot presses Y, Z may be set much larger so that a veneer sheet, for example veneer sheet B, is insertable even if the in-process LVL board is bent by its own weight. When the upper heating plate Y1 is moved down toward its associated lower heating plate Y1 for pressing, however, the in-process LVL board is bent down by the lowering upper heating plate Y1, so that the resulting LVL board is bent into an arcuate shape. The same holds true at the hot pressing station Z. The LVL board thus bent in arcuate shape is rendered useless as a product.

Therefore, an object of the present invention is to provide a method and an apparatus of wood pressing which can be used helpfully in manufacturing glued laminated wood such as LVL.

SUMMARY OF THE INVENTION

According to the present invention, wood pressing method and apparatus are provided which are advantageously applicable to manufacturing of glued laminated wood such as LVL which is made of a number of wood sheets such as veneer sheets. The wood sheets have a predetermined length, width and thickness and they are laminated together into the form of a multiple-layered board of the glued laminated wood by successively supplying a wood sheet having one surface thereof coated with a thermosetting adhesive to each of the upper and lower sides of an in-process glued laminated wood board and then hot pressing such wood sheet by means of a pair of heating plates. The paired heating plates of the present invention are disposed one above the other, have pressing surfaces facing each other and are movable toward and away from each other.

According to the method of the invention, one of the heating plate of said paired heating plates is moved toward the other heating plate to a pressing position where the distance between the pressing surface of the one heating plate and the surface coated with the thermosetting adhesive of the wood sheet supplied to one side of the in-process glued laminated wood board which faces the one heating plate substantially corresponds to the thickness of the respective wood sheet, and then the other heating plate is moved toward the one heating plate until the wood sheet is pressed to the in-process glued laminated wood board under a predetermined pressure.

Pressing apparatus of the present invention includes a wood sheet supply device supplying a wood sheet having one surface thereof coated with the thermosetting adhesive to each of the upper and lower sides of an in-process board of the glued laminated wood for lamination of the wood sheet to each of the upper and lower sides of the in-process glued laminated wood board, and a board carrier carrying thereon the in-process glued laminated wood board and moving it horizontally between a first position where at least part of the in-process glued laminated wood board having the supplied wood sheets are placed between the paired heating plates and a second position where the aforementioned part of the in-process glued laminated wood board is placed horizontally away from the first position.

The apparatus further includes a control which is operable to control the operation of the paired heating plates, wood supply device and board carrier. The controlling is performed in such a way that a wood sheet having one surface thereof coated with the thermosetting adhesive is supplied to one side of the in-process glued laminated wood board which faces one heating plate of said paired heating plates and the in-process glued laminated wood board is moved by the board carrier to the first position at latest before the one heating plate is moved toward the other heating plate to a pressing position where the distance between the pressing surface of the one heating plate and the surface coated with the thermosetting adhesive of the wood sheet supplied to the one side of the in-process glued laminated wood board substantially corresponds to the thickness of the respective wood sheet. The control is operable also to control in such a way that, after the one pressing plate has moved to the pressing position, another wood sheet having one surface thereof coated with the thermosetting adhesive is supplied to the other side of the in-process glued laminated wood board at latest before the other heating plate is moved toward the one heating plate until the wood sheets supplied to the opposite sides of the in-process glued laminated wood board are pressed thereto under a predetermined pressure, and the wood sheets are kept pressed under the predetermined pressure for a predetermined length of time.

Features and advantages of the present invention will become more apparent to those skilled in the art from the following description of a preferred embodiment according to the invention, which description is made with reference to the accompanying drawings, wherein:

DESCRIPTION OF THE EMBODIMENTS

The following will describe a preferred embodiment of pressing apparatus for use in the manufacture of laminated veneer lumber (LVL) by way of describing the apparatus of manufacturing such laminated veneer lumber.

It is noted that all veneer sheets for use in the embodiment have been dried appropriately and have substantially the same dimensions, i.e. a thickness of about 4 mm, a length of about 1,000 mm as measured along the general wood grain orientation of veneer sheet and a width of about 1,000 mm as measured across the sheet length. It is also noted that the term "apparatus" appearing hereinafter refers to apparatus for manufacturing LVL unless it otherwise refers.

Figure 1:
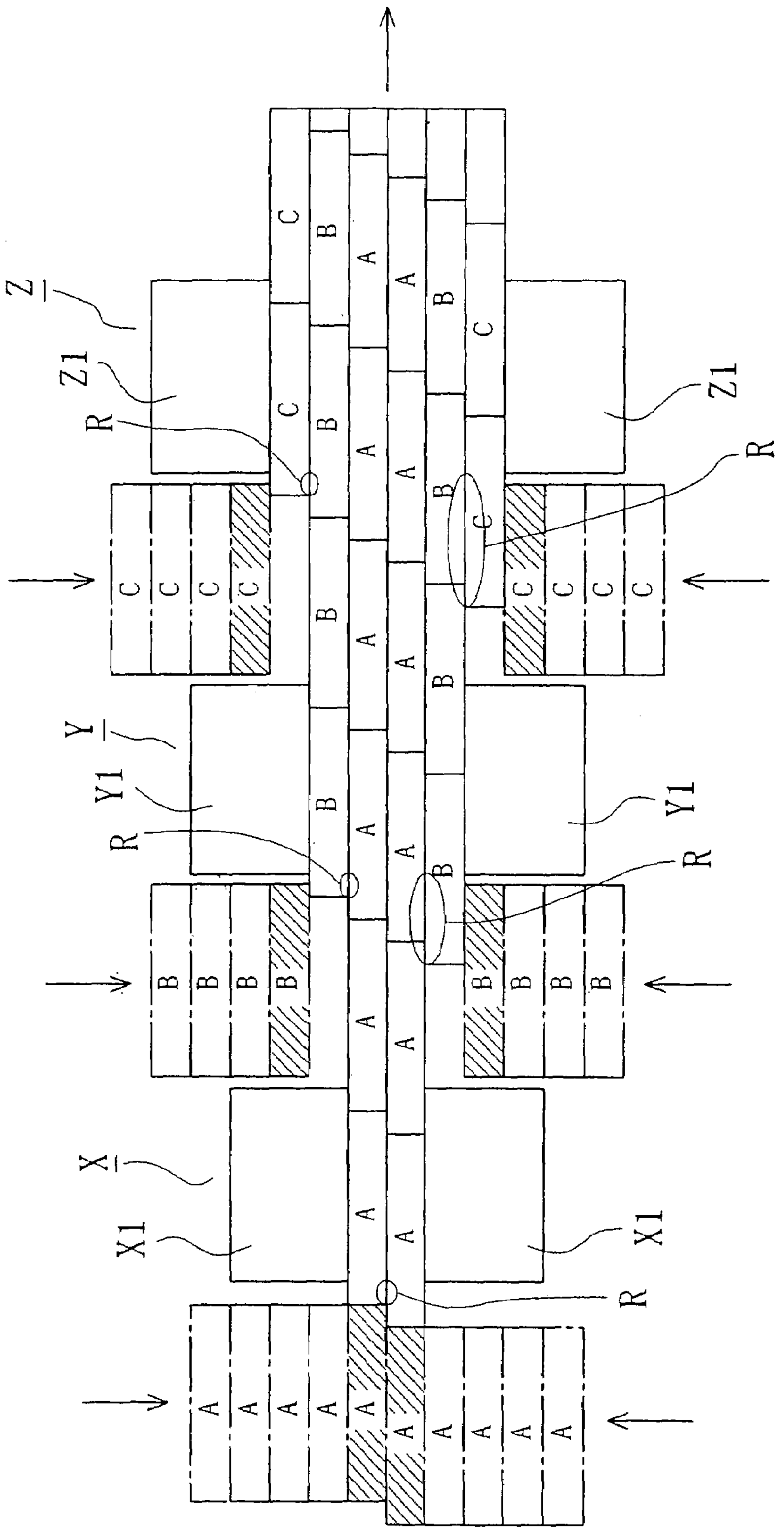
PRIOR ART Fig. 1
FIG. 1 is a schematic illustrative view showing a prior art apparatus for manufacturing LVL as an example of glued laminated wood.
Figure 2:
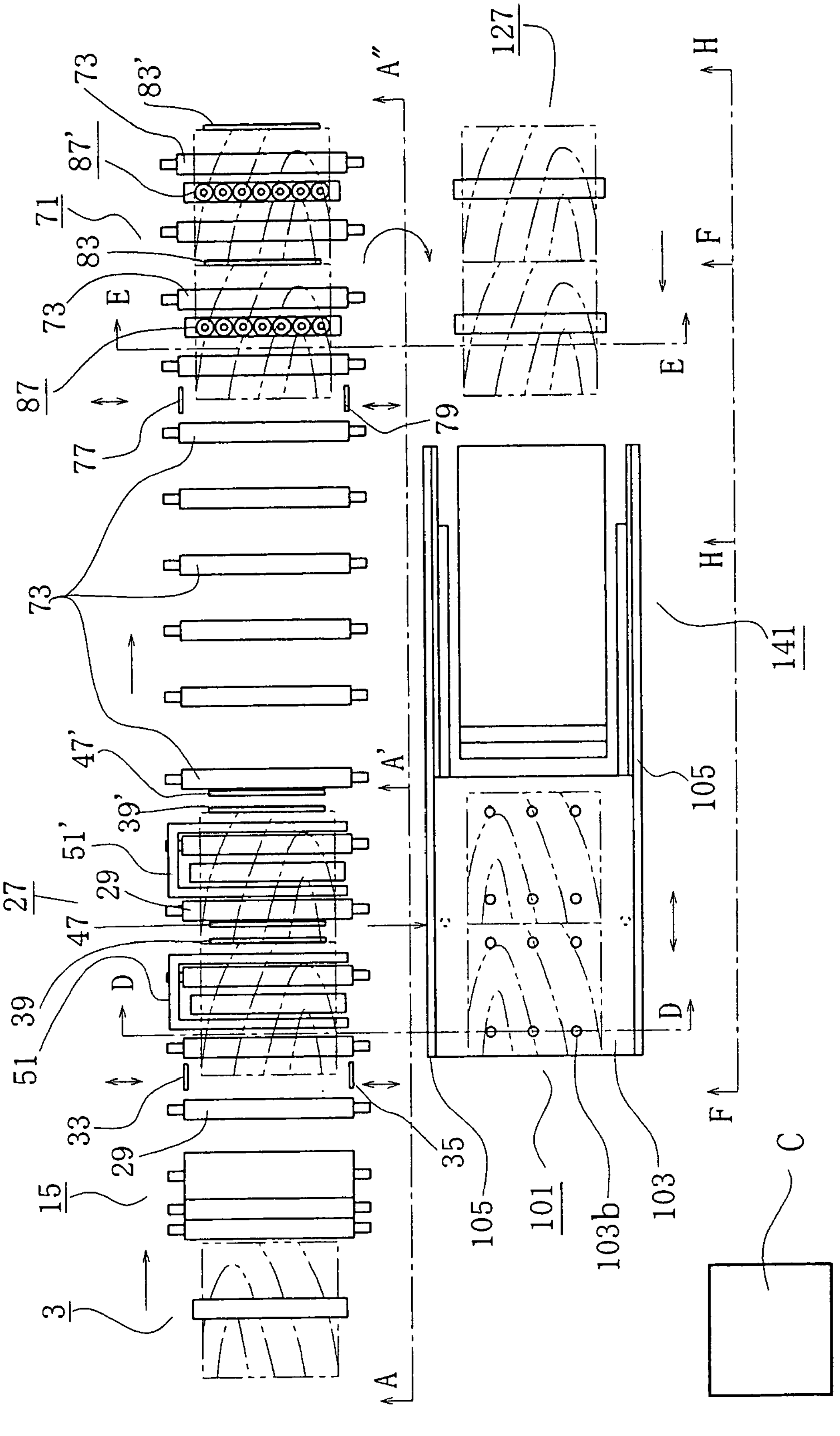
FIG. 2 is a schematic plan view showing an overall view of an apparatus for manufacturing LVL, which uses a wood press constructed and operable according to the present invention.

Referring firstly to FIG. 2, the apparatus has several working stations including veneer sheet feeding station 3, glue spreading station 15, first veneer sheet supply station 27, second veneer sheet supply station 71, veneer sheet loading station 101, base material positioning station 127 (FIG. 10), and hot pressing station 141. As will be described in detail in later part hereof, veneer sheets are moved or conveyed generally rightward as seen in FIG. 2 from the veneer sheet feeding station 3 along conveyer rolls 29, 73, as indicated by arrows at the top of the drawing. The apparatus further includes a control unit C which receives detection signals from various sensors and rotary encoders and generates command signals for controlling the operation of respective actuators such as cylinders, drives such as motors and other devices of the apparatus, as will be described in detail later.

Figure 3:
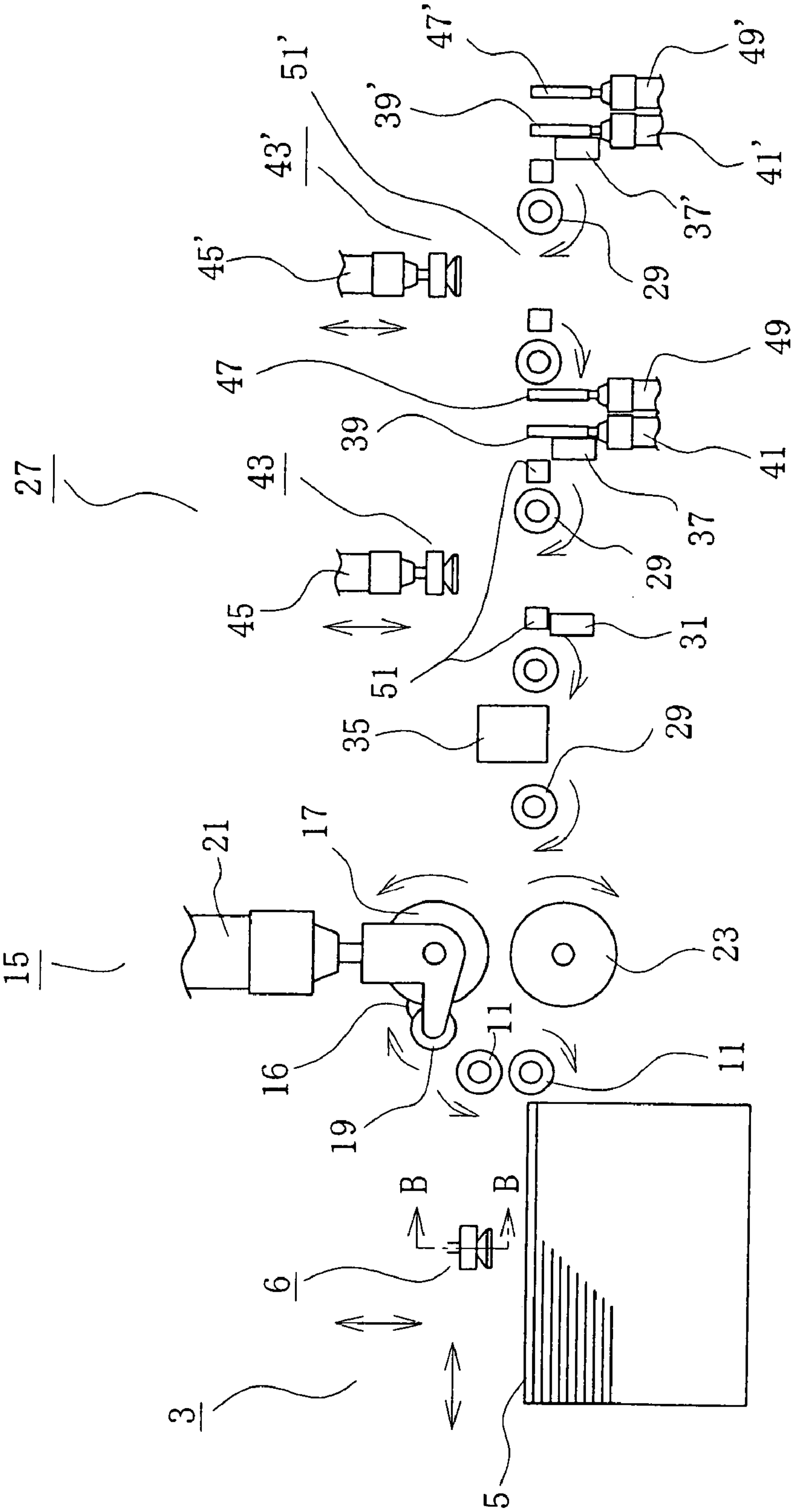
FIG. 3 is a schematic side view as seen from A-A' of FIG. 2.

In the veneer sheet feeding station 3, there is provided a pile of veneer sheets 5 each of which is disposed in the pile with the wood grain thereof extending generally in lateral direction as viewed in the drawings of FIGS. 2 and 3, as clearly seen from the wood grain pattern of the uppermost veneer sheet in the pile shown in FIG. 2. Though not shown in the drawings, the pile of veneer sheets 5 is supported by any suitable elevator which is operable to set the veneer sheet pile in such a way that the uppermost veneer sheet always maintains substantially the same height. For this purpose, there is provided a suitable sensor (not shown) for detecting the height of the veneer sheet pile.

Figure 4:
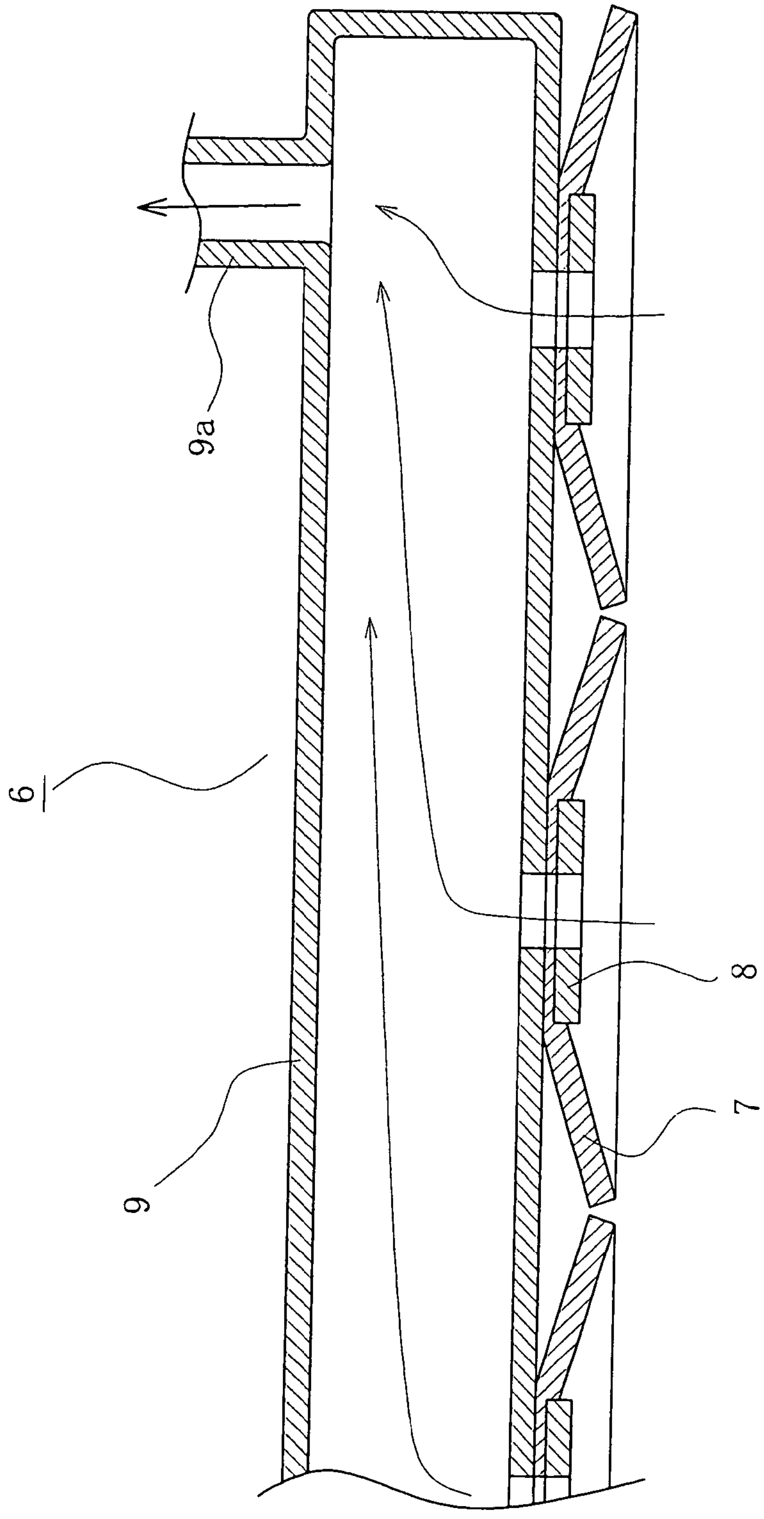
FIG. 4 is a partially cross-sectional view of a suction head as seen from B-B of FIG. 3.

Immediately above the pile of veneer sheets 5 is provided a suction head 6 for picking one veneer sheet 5 at a time from the pile. As shown in FIG. 4, the suction head 6 includes an elongated hollow box 9 disposed extending across the width of veneer sheets 5 and a plurality of suction cups 7 arranged along the extension of the box 9 and each fixed to the box 9 by a retainer 8. As shown in FIG. 4, a hole is formed through each suction cup 7, its associated retainer 8 and the box 9 so that the atmosphere and the box interior communicate through such hole. The suction cups 7 are made of elastic material such as synthetic rubber or sponge having a good contact with the surface of wood veneer sheet. The interior of the suction box 9 is connected through a port 9*a* to any suitable source of vacuum such as blower (not shown) by way of a controllably operable shutter (not shown). When the shutter is open, air flows as indicated by arrows in FIG. 4 and suction force is created, accordingly. As indicated by two double-headed arrows in FIG. 3, the suction head 6 is reciprocally movable by any suitable means such as cylinder (not shown) in both vertical and horizontal directions.

As shown in FIG. 3, immediately downstream of the veneer sheet pile as seen in the conveying direction of veneer sheets is located a pair of rolls 11 rotatable in arrow directions for feeding a veneer sheet 5 picked up by the suction head 6 toward the subsequent glue spreading station 15.

The glue spreading station 15 has a movable roll assembly including a pair of glue roll 17 and doctor roll 19 rotatable in arrow directions as shown in FIG. 3 for applying a predetermined volume of thermosetting adhesive 16 to the upper surface of veneer sheet 5. In the illustrated embodiment, the doctor roll 19 is so adjusted that about 210 grams of adhesive is applied to an area of about 1 $m^2$ of veneer sheet surface. Below the paired glue roll 17 and the doctor roll 19 is provided a stationary roll 23 rotatable in arrow direction. Reference numeral 21 designates a cylinder for moving the roll assembly 17, 19 toward and away from the stationary roll 23. Specifically, the cylinder 21 is operable to move the roll assembly 17, 19 between the lowered or glue spreading position where the spaced distance between the peripheral surfaces of the glue roll 17 and the stationary roll 23 is slightly smaller than the thickness of veneer sheet and the elevated or standby position where the roll assembly 17, 19 are retracted so that the peripheral surface of the glue roll 17 is spaced sufficiently away from the stationary roll 23.

Downstream of the glue spreading station 15 is arranged a number of rotatable conveying rolls including a first group of rolls 29 and a second group of rolls 73 arranged in juxtaposed relation to each other for conveying veneer sheets 5 successively along a conveying pass defined by such rolls 29, 73.

Though detailed description will be provided later, a veneer sheet having its upper surface coated with adhesive and moved in arrow direction by the first rolls 29 is stopped at a predetermined position along the conveying pass, centered there with respect to the conveying pass and then moved laterally across the conveying pass at the first veneer sheet supply station 27. For this purpose, the first veneer sheet supply station 27 has the following arrangement.

A sensor 31 is provided (FIG. 3) in the veneer sheet conveying pass for detecting the arrival of the leading end of a veneer sheet being moved by the rolls 29 at the position defined by the sensor 31. At a distance of about 500 mm upstream of the sensor 31 is located a pair of centering plates 33, 35 movable reciprocally by air cylinders (not shown) in the directions as indicated by double-headed arrows in FIG. 2. More specifically, these centering plates 33, 35 are movable by the air cylinders between the retracted position where the plates 33, 35 are spaced away from each other at a distance greater than 1,000 mm, i.e. the width of veneer sheet, so that veneer sheet being conveyed by the rolls 29 is clear of the plates 33, 35, and the centering position where the plates 33, 35 are moved toward each other at a spaced interval of about 1,000 mm so that a veneer sheet then placed between the plates 33, 35 is straightened and centered with respect to the veneer sheet conveying path .

As shown in FIG. 3, a sensor 37 is located downstream of the sensor 31 for detecting the arrival of veneer sheet at the position defined by the sensor 31. Immediately downstream of this sensor 37 is disposed a first stop plate 39 which is movable by a cylinder 41 between its operative position where the stop plate 39 is extended to stop the movement of veneer sheet by contact with the leading end of the veneer sheet being conveyed by the rolls 29 and its inoperative position where the stop plate 39 is retracted as shown in FIG. 3. A similar second stop plate 47 is located spaced about 120 mm downstream of the first stop plate 39 and moved by a cylinder 49 between the extended operative and retracted inoperative positions.

A suction head 43, which is similar to the aforementioned suction head 6, is provided at a position upstream of the first stop plate 39 and above the veneer sheet conveying path. The suction head 43 is vertically movable by a cylinder 45, as indicated by double-headed arrow in FIG. 2.

Figure 5:
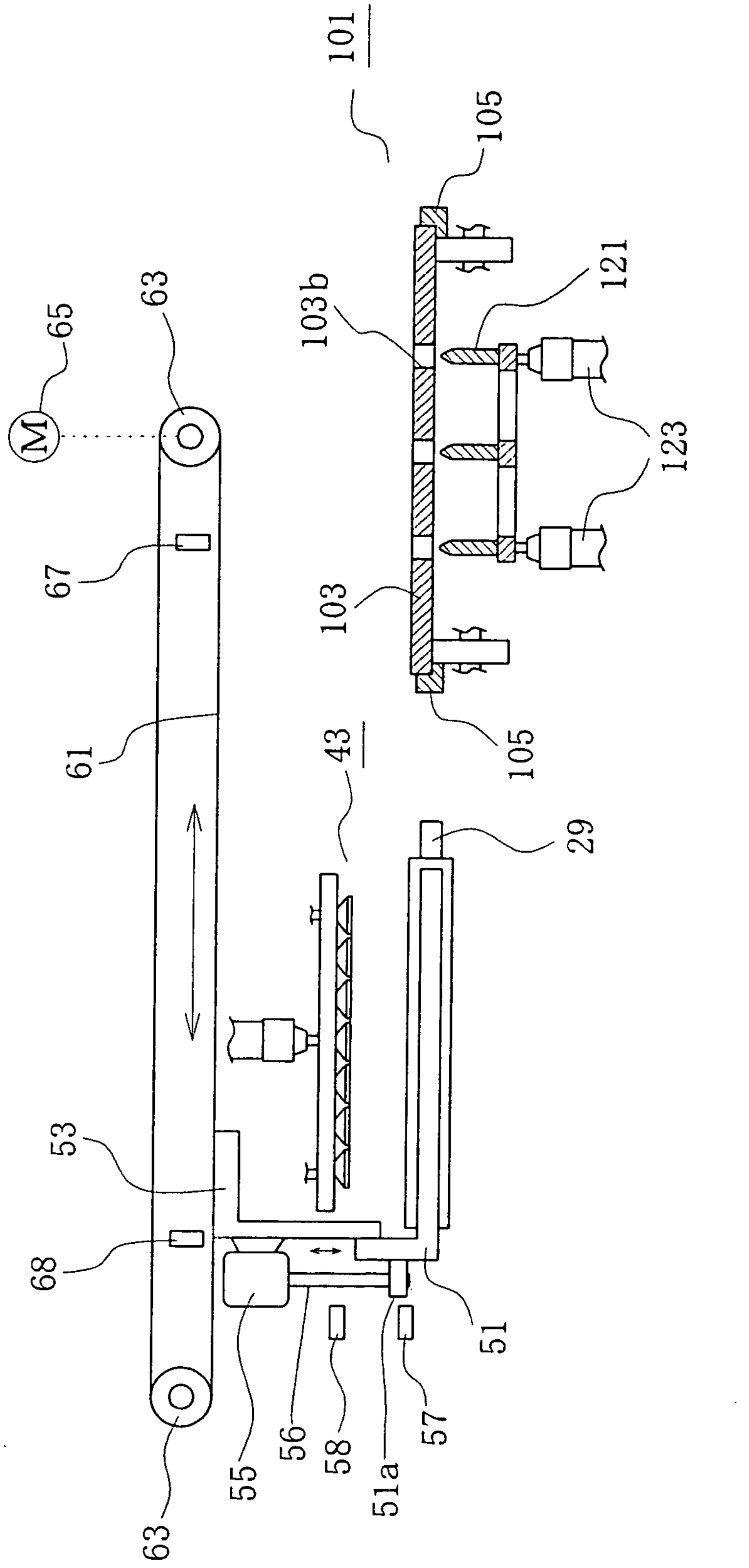
FIG. 5 is a schematic end view of the apparatus as seen from D-D of FIG. 2.

Upstream of the stop plates 39, 47 is arranged a first device for traversing a veneer sheet or moving a veneer sheet across the conveying path toward the veneer sheet loading station 101. As shown in FIGS. 2, 3 and 5, the first veneer sheet traversing device includes a lifting bar 51 having two long bar portions extending across the veneer sheet conveying path and a short bar portion connecting one ends of the two long bars, thereby presenting a channel shape as seen from the top as shown in FIG. 2. As shown in FIG. 5, the lifting bar 51 has fixed thereto at the closed end of its channel shape a block 51*a* which has formed vertically therethrough a threaded hole. An electric motor 55 fixedly mounted on a support block 53 has a threaded shaft 56 driven by the motor 55 and engaged with the threaded hole in the block 51*a*, so that rotation of the shaft 56 by the motor 55 causes the lifting bar 51 to move up and down relative to the support block 53. Reference numerals 57, 58 designate reflection type sensors for determining the lowermost and uppermost positions of the lifting bar 51, respectively, by detecting the block 51*a* movable with the lifting bar 51. As shown in FIG. 5, the support block 53 is fixed at its top to a belt 61 trained between a pair of pulley 63 one of which is positively driven by a motor 65, so that the block 53 and its associated parts including the lifting bar 51 are movable reciprocally as indicated by double-headed arrow. Reference numerals 67, 68 designate reflection type sensors for detecting the respective ends of the movable range of the support block 53 and hence of the lifting bar 51.

Downstream of and spaced at about 1,000 mm from the first veneer sheet traversing device is provided a second veneer sheet traversing device which is substantially identical in structure and arrangement to the first traversing device described above. Like component parts or elements of the second traversing device are designated by like numerals with a prime, e.g. 43' for suction head, 51' for lifting bar, 39' and 47' for first and second stop plates, 53' for support block and 65' for motor, etc.

A veneer sheet having its upper surface coated with adhesive and moved forward by the second conveying rolls 73 is stopped at a predetermined position along the conveying pass, centered and then moved laterally across the conveying pass at the second veneer sheet supply station 71. For this purpose, the second veneer sheet supply station 71 has the following arrangement.

Figure 6:
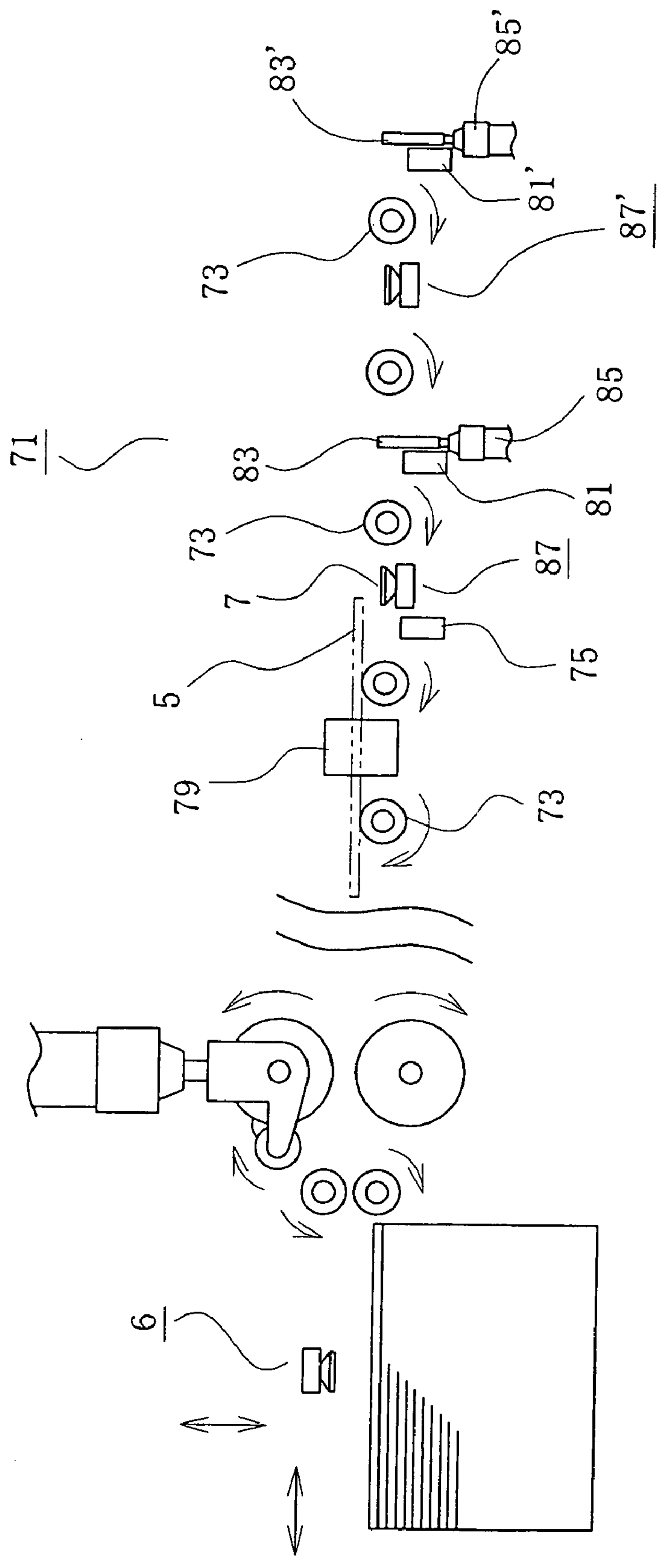
FIG. 6 is a schematic partial side view of the apparatus as seen from A-A" of FIG. 2.
Figure 7:
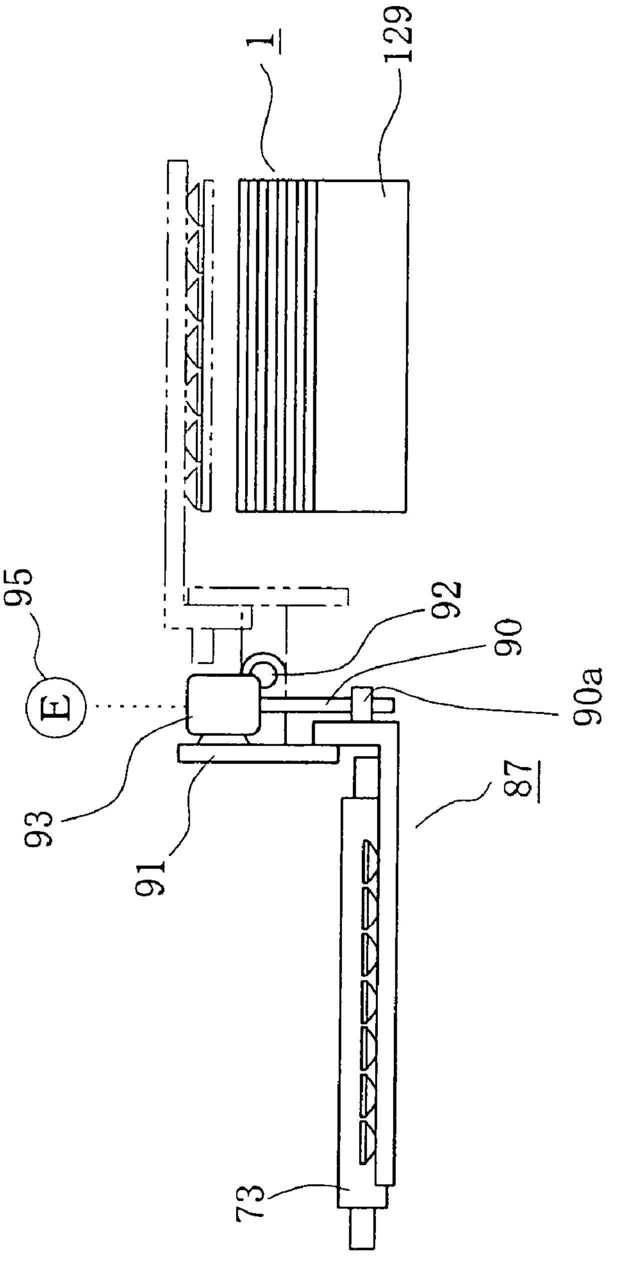
FIG. 7 is a schematic end view of the apparatus as seen from E-E of FIG. 2.

Referring to FIGS. 2, 6 and 7, the second veneer sheet supply station 71 includes a sensor 75 (FIG. 6) for detecting the arrival of the leading end of a veneer sheet being conveyed by the second rolls 73 at the position defined by the sensor 75 and a pair of second centering plates 77, 79 provided at a distance of about 500 mm upstream of the sensor 75. These centering plates 77, 79 are identical in structure and operation to the aforementioned first centering plates 33, 35 described with reference to the first veneer sheet supply station. Another sensor 81 is located slightly downstream of the sensor 75 as shown in FIG. 6 for detecting the arrival of the leading end of a veneer sheet at the position which is defined by the sensor 81. Immediately downstream of this sensor 81 is disposed a stop plate 83 which is movable by a cylinder 85 in the same manner as the aforementioned stop plates 39, 47.

About 500 mm upstream of the stop plate 83 is disposed a first suction head 87 similar in structure to the suction head 6 of FIG. 4 and having a plurality of suction cups 7. As shown in FIG. 6, the suction head 87 is located below the veneer sheet conveying path with the suction cups 7 thereof facing upward. As shown in FIG. 7, the suction head 87 has fixed thereto a block 90*a* which has formed therethrough a threaded hole. An electric servo motor 93 fixedly mounted on a support block 91 has a threaded shaft 90 driven by the motor 93 and engaged with the threaded hole in the block 90*a*, so that rotation of the shaft 90 by the motor 93 causes the suction head 87 to move up and down relative to the support block 91. In FIG. 7, reference numeral 92 designates a shaft on which the motor support 91 is pivotally supported so that the motor support 91 and hence the suction head 87 is swung by a motor (not shown) for about 180 degrees between the standby position shown by solid line and the inverted position indicated by dash-dot line. Additionally, a rotary encoder 95 is connected to the servo motor 93 which counts the rotation angle of the motor 93 thereby to determine the current position of the suction head 87 with respect to a reference position which will be described in later part hereof, thus making it possible to controllably position the suction head 87.

About 1,000 mm downstream of the first suction head 87 is provided a second suction head 87' and its associated parts and devices which are identical in structure and operation to the corresponding counterparts of the suction head 87 described with reference to FIG. 7. Such devices and parts for the second suction head 87' will be referred to by like reference numerals with a prime, such as threaded shaft 90', servo motor 93', rotary encoder 95', etc.

The veneer sheet loading station 101 will be now described while having reference to FIGS. 2, 5, 8 and 9. The device at the station 101 includes a veneer sheet carrier plate 103 which carries thereon two veneer sheets disposed as shown by dash-dot line in FIG. 2 and is reciprocally movable in arrow directions for transferring such veneer sheets toward the hot pressing station 141. A pair of guide members 105 is disposed on opposite sides of the veneer sheet carrier plate 103 at a spaced interval of at about 1,300 mm for guiding the movement of the sheet carrier plate 103.

Figure 8:
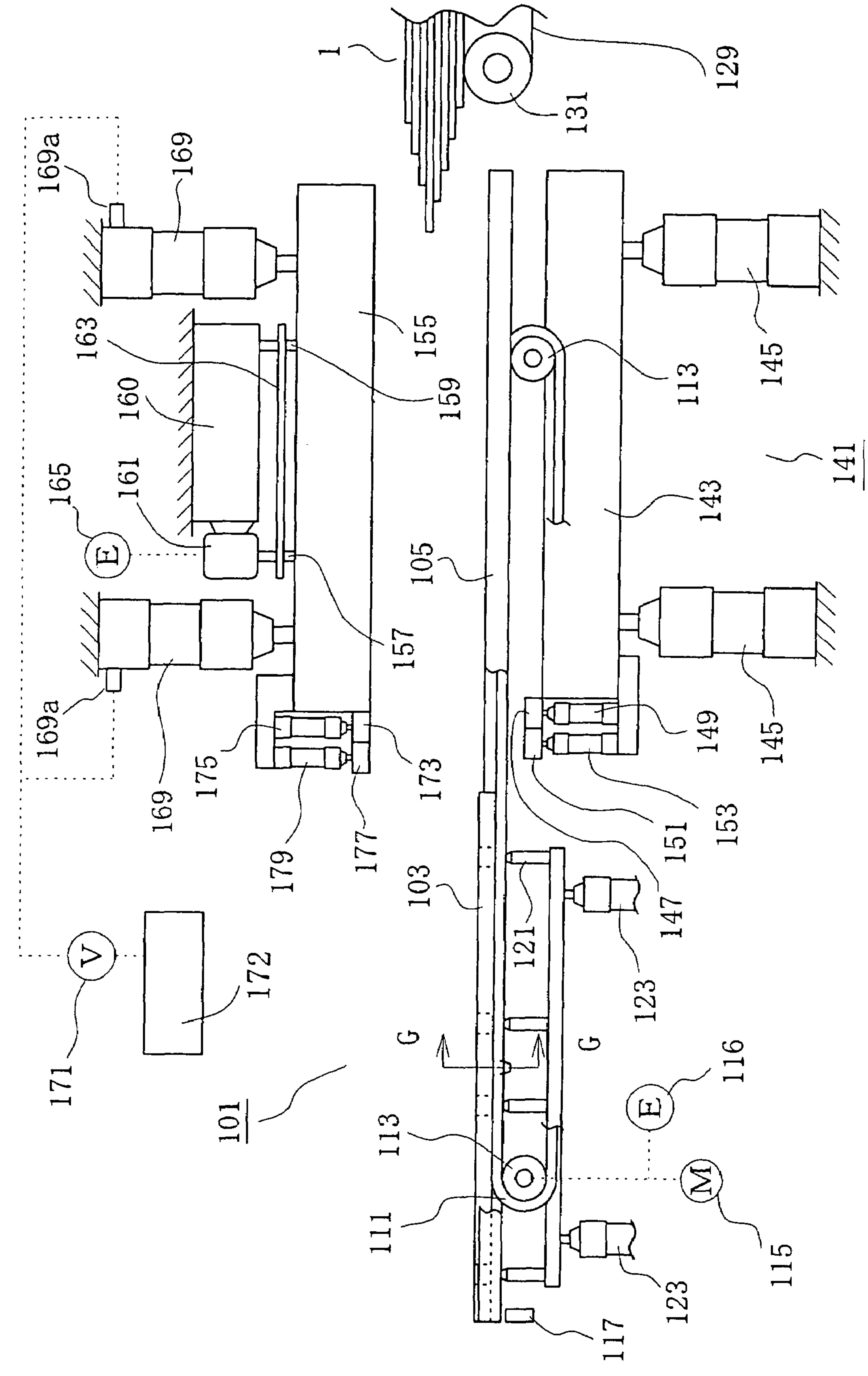
FIG. 8 is a schematic side view of the apparatus as seen from F-F of FIG. 2.
Figure 9:
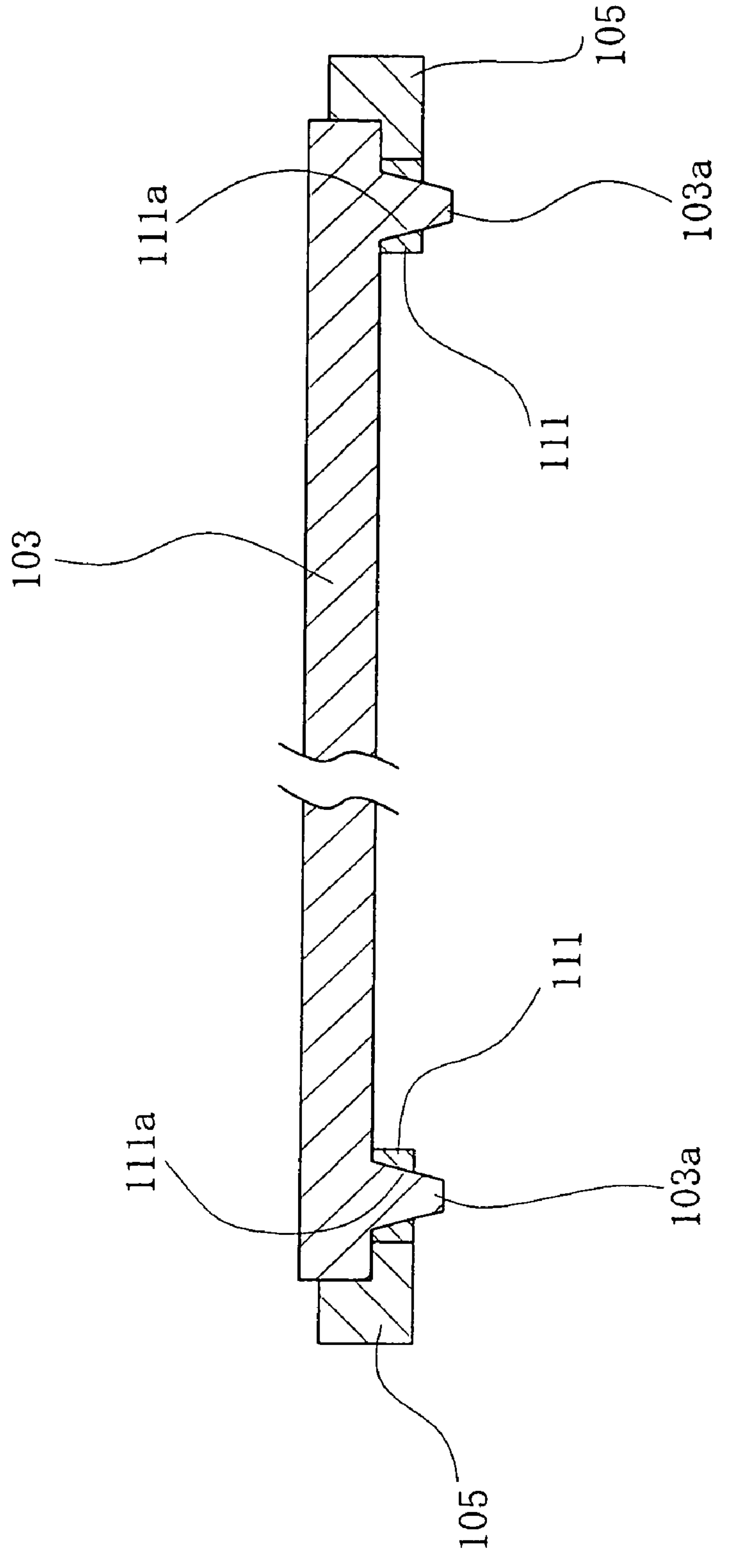
FIG. 9 is a schematic view as seen from G-G of FIG. 8.

The veneer sheet carrier plate 103 is driven to move by a pair of belts 111 trained between a pair of pulleys 113 one of which is driven reversibly by a servo motor 115 as shown in FIG. 8. The servo motor 115 is connected to a rotary encoder 116 which counts the rotation angle of the servo motor 115 thereby to determine the current position of the sheet carrier plate 103 with respect to a predetermined reference position of the apparatus and make possible controllably positioning the carrier plate 103. As shown in FIG. 9, each belt 111 is formed with upwardly divergent holes 111*a* which are engageable with complementary conical projections 103*a* formed on the veneer sheet carrier plate 103. With the projections 103*a* of the veneer sheet carrier plate 103 received in the holes 111*a* of the belts 111, the carrier plate 103 is engaged with and held by the belts 111 so that the plate 103 is moved along the guide members 105 the by the belts 111. The veneer sheet carrier plate 103 can be disengaged from the belts 111 by moving upwardly the carrier plate 103. The carrier plate 103 should desirably be made material of high thermally conduction such as aluminum or copper. Reference numeral 117 in FIG. 8 designate a sensor for detecting the arrival of the veneer sheet carrier plate 103 at start position where veneer sheets transferred by the veneer sheet traversing devices are placed onto the carrier plate 103.

As shown in FIGS. 2 and 5, the veneer sheet carrier plate 103 has formed through its thickness a plurality of holes 103*b*. Specifically, the carrier plate 103 has as many as 12 holes 103*b* which are arranged in such a way that six holes 103 are covered by each of two veneer sheets placed on the carrier plate 103, as most clearly seen in FIG. 2. With the veneer sheet carrier plate 103 located at the aforementioned start position (FIG. 2), there are provided immediately below the carrier plate 103 upstanding rods 121 located in alignment with the respective holes 103*b* in the carrier plate 103 so that rods 12 which are movable by cylinders 123 are insertable though the holes 103*b*.

Figure 10:
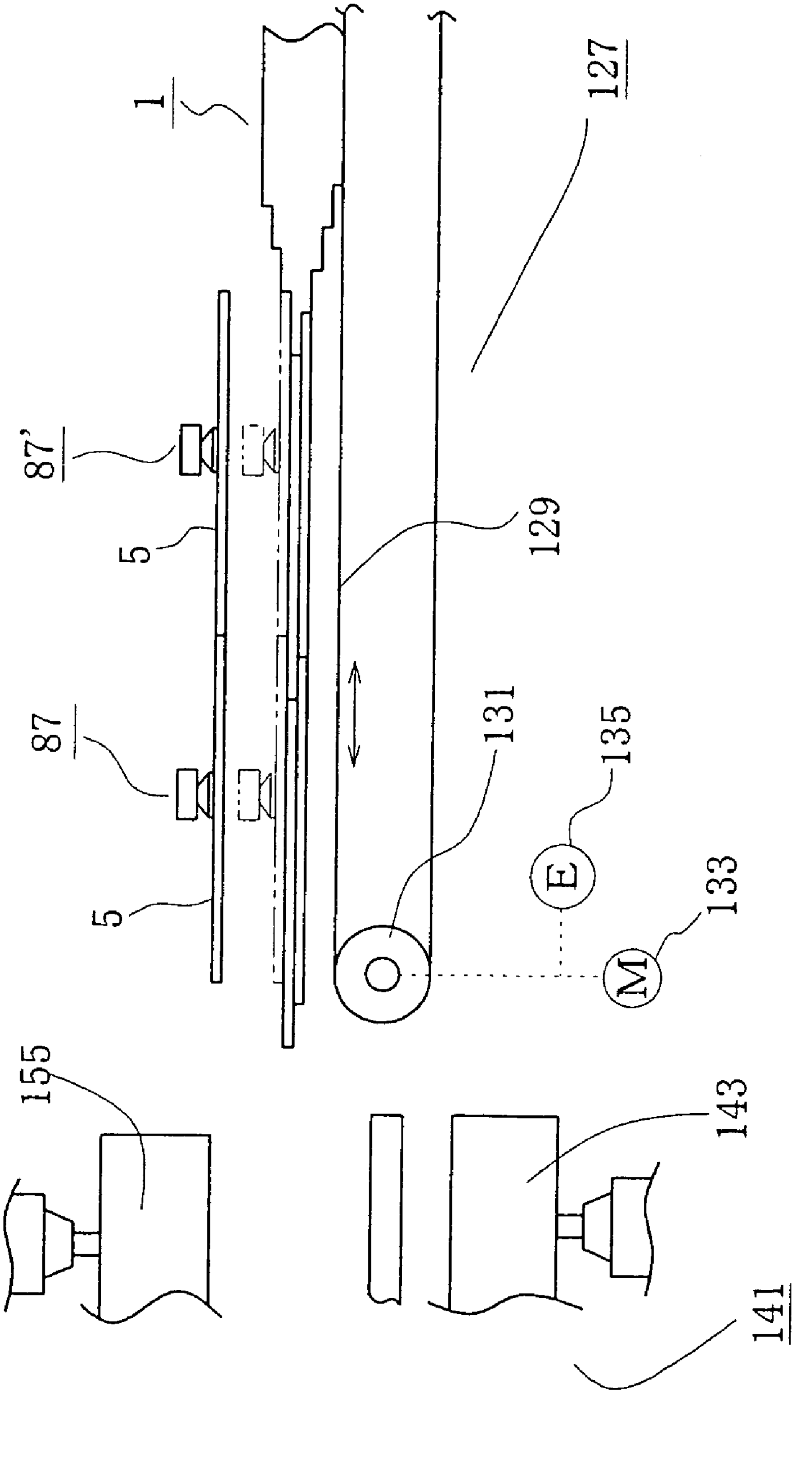
FIG. 10 is a schematic partial side view of the apparatus as seen from H-H of FIG. 2.

Referring to FIG. 10, a device for positioning a base material or an in-process LVL board at the station 127 will be described. Base material 1 (FIG. 10) which is to be positioned by the device will be described in detail in later part hereof with reference to FIG. 11. The positioning device includes a carrier in the form of a chain conveyer 129 trained between pulleys (only one pulley 131 being shown) and having a substantially flat conveying upper leg. The pulley 131 is connected to a servo motor 133 for driving the chain conveyer 129 reversibly as indicated by double-head arrow. A rotary encoder 135 is connected to the servo motor 133 for counting the rotation angle of the servo motor 113 thereby to determine the current position of the chain conveyer 129 which carries thereon a base material 1 from one end of which a continuous length of LVL board is to be made. Thus, it is made possible to controllably position the base material with respect to a heating plate of hot press which will be described below.

The hot pressing station 141 will be now described with reference to FIG. 8. A hot press is provided in this working station 141, which includes a lower heating plate 143 having a length of about 2,120 mm as measured laterally on the drawing of FIG. 8 and a width of about 1,100 mm. This lower heating plate 143 is heated constantly by steam to a temperature of 170 to 190° C. and movable vertically by hydraulic cylinders 145 between its retracted inoperative position as shown in FIG. 8 and its elevated operative position.

On the left hand side of the lower heating plate 143 as seen in FIG. 8, or on the side adjacent to the veneer sheet loading station 101, are provided a pair of first and second auxiliary lower heating plates 147, 151 each having a length of about 120 mm and the same width as the lower heating plate 143, or about 1,100 mm. Both auxiliary heating plates 147, 151 are heated by steam to the same temperature as the lower heating plates 143 and movable vertically by hydraulic cylinders 149, 153 between their retracted inoperative positions as shown in FIG. 8 and the elevated operative positions, respectively. It is noted that each auxiliary heating plate is moved by two hydraulic cylinders disposed across the width of the heating plate and, therefore, only one cylinder is shown for each heating plate in FIG. 8. The first auxiliary heating plate 147 in its retracted position (FIG. 8) has its top surface located at a position which is higher than the top surface of the lower heating plate 143 by a distance corresponding to the thickness of the veneer sheet carrier plate 103. The cylinders 149 elevate the first auxiliary heating plate 147 for a distance of about 4 mm, i.e. the distance corresponding to the thickness of veneer sheet. On the other hand, the second auxiliary lower heating plate 151 in its retracted position has its top surface located at the position as the first auxiliary heating plate 147, but it is elevated by the cylinders 153 for a distance of about 8 mm, i.e. the distance corresponding to twice the thickness of veneer sheet.

The hot press further includes an upper heating plate 155 located above and in facing relation to the lower heating plates 143. The upper heating plate 155 has the same dimensions and heated to the same temperature as the lower heating plate 143. It is noted that the lower and upper heating plates 143, 155 are disposed in an offset relation to each other. Specifically, the upper heating plate 155 is positioned about 70 mm leftward, or toward the station 101, with respect to the lower plate 143, as most clearly seen, e.g. in FIGS. 20(*b*) and 20(*c*) which show the heating plates 143, 155 in their closed state.

The upper heating plate 155 has formed in the top surface thereof a pair of threaded holes (not shown) which receive therein screws 157, 159, respectively. The screw 157 is operatively connected to a servo motor 161 mounted to a support block 160 which is in turn fixed to a frame of the apparatus, while the other screw 159 is freely rotatably mounted to the block 160. The screws 157, 159 have sprockets (not shown) which are connected by an endless chain 163 so that the rotation of the screw 157 driven by the servo motor 161 is transmitted to the screw 159 and both screws 157, 159 are rotated in a synchronous manner. Thus, the upper heating plate 155 is driven to move up or down by the servo motor 161. The servo motor 161 has a rotary encoder 165 which counts the rotation angle of the servo motor 161 thereby to determine the current position of the upper heating plate 155 with respect to the reference position mentioned previously with reference to the suction head 87 and make it possible to controllably position the upper heating plate.

The upper heating plate 155 has a pair of hydraulic cylinders 169 whose rods are connected to the heating plate 155 for holding the heating plate 155 at the desired position as will be described in detail hereinafter. Each cylinder 169 has a fluid port 169*a* which is connected to an oil reservoir 172 through an electromagnetic valve 171. The valve 171 is normally opened to allow the upper heating plate 155 to move up or down, but it is kept closed while the heating plate 155 is to be held at the desired position. When the upper heating plate 155 is moved downward by the motor 161, hydraulic oil is flown through the opened valve 171 and the fluid ports 169*a* and fills the cylinders 169. If the valve 171 is closed with the upper heating plate 155 lowered to any desired position, the heating plate 155 is held at such position by the cylinders 169. If the heating plate is moved upward by the motor 161 with the valve 171 opened, the hydraulic oil in the cylinders 169 is forced out thereof and flown back to the oil reservoir through the fluid ports 1691 and the opened valve 171.

First and second auxiliary upper heating plates 173, 177 are provided on the left hand side of the upper heating plate 155 as seen in FIG. 8, or the side adjacent to the station 101. These auxiliary heating plates 173, 177 are similar to the auxiliary heating plates 147, 151 for the lower heating plates 143 in shape, dimensions and manner of heating. The upper auxiliary heating plates 173, 177 are moved vertically by cylinders 175, 179, respectively, (only one cylinder being shown for each auxiliary heating plate) between the retracted inoperative position as shown in FIG. 8 and the lowered operative position. The first and second auxiliary upper heating plate 173, 177 in their retracted position have their bottom surfaces located substantially flush with the bottom surface of the upper heating plate 155. The first auxiliary heating plate 173 is lowered by the cylinders 175 for a distance of about 4 mm, i.e. the distance corresponding to the thickness of veneer sheet, while the cylinders 179 lowers the second auxiliary heating plate 177 for a distance of about 8 mm, i.e. the distance corresponding to twice the thickness of veneer sheet.

As shown in FIG. 2, the above upper and lower heating plates 155, 143 and their associated auxiliary heating plates 173, 177 and 147, 151 are all disposed within a range between the paired guide members 105.

In the above-described apparatus, the sensors and the rotary encoders are operable to generate detection signal or rotation angle count signal to the control unit C which, responding such signal, generates various command signals for controlling the operation of various drives and actuators such as motors, cylinders and other devices of the apparatus (including those motors and cylinders which are not shown in any drawing).

As mentioned earlier, the rotary encoders 95, 95' and 165 connected to the motors 93, 93' and 161 are operable to determine the current position of the suction heads 87, 87' and the upper heating plate 155, respectively, with respect to a predetermined reference position. In the illustrated embodiment, such reference position is established at a height in the apparatus which corresponds to the mid-position of the base material 1 placed on the chain conveyer 129 as measured across the thickness of the base material 1, i.e. a height corresponding to the mating surfaces between veneer sheets of the fourth and fifth layers of the base material 1. Data of such reference position is stored in a suitable memory of the control unit C so that it controls the operation of, e.g., the motor 161 for the upper heating plate 155 of the hot press so as to move the heating plate 155 to any desired height with reference to such stored reference position.

Figure 11:
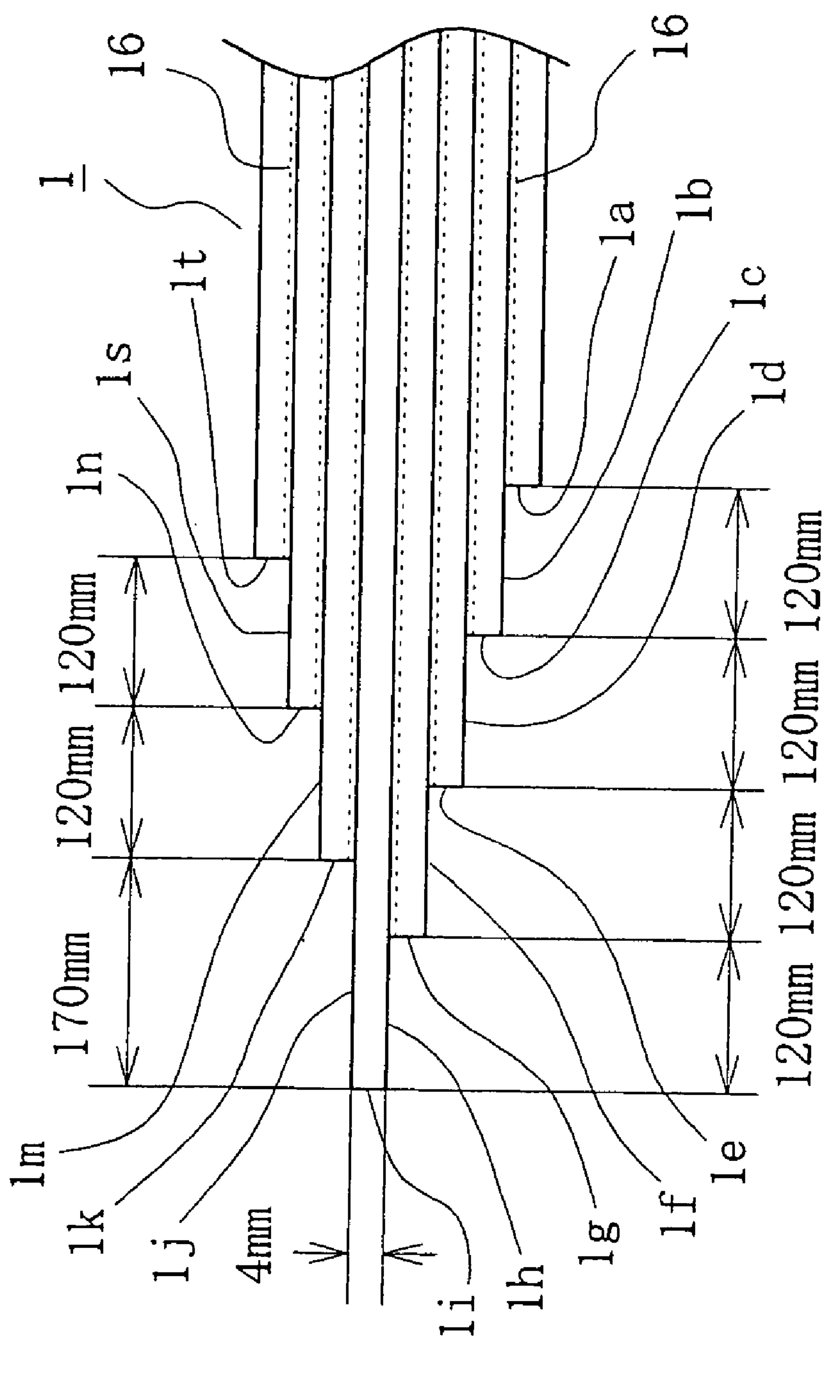
FIG. 11 is schematic illustrative partial view showing an initial base material made of veneer sheets, from one end of which a continuous length of LVL board is to be made.

In manufacturing laminated veneer lumber (LVL) using the above-described apparatus, an initial base material 1 in the form of a laminated veneer assembly as shown in FIG. 11, from one end of which a continuous length of LVL board is to be made, is prepared in advance. The initial base material 1 is made of a plurality of veneer sheets, each having a thickness of about 4 mm, which are laid and glued together by adhesive 16. All veneer sheets are disposed in the base material 1 with the wood grain thereof extending generally in lateral direction as viewed on the drawing. As clearly seen from FIG. 11, the initial base material 1 is of eight-layer configuration, having eight layers of veneer sheets including the first sheet through the eighth sheet as counted from the lowermost veneer sheet. The veneer sheets in the base material 1 are laid in such a regular staggered arrangement that the ends of any two adjacent layers of veneer sheets are spaced at a length of about 120 mm, except 170 mm between the ends of the fifth and sixth veneer sheets, and also that the end portion of the base material 1 is shaped in the form of flights of steps, namely one flight of steps formed by the fifth through eighth veneer sheets and facing upward and the other flight of steps formed by the first through fifth veneer sheet and facing downward.

Specifically, the initial base material 1 has first end face 1*a*, second end face 1*c*, third end face 1*e*, fourth end face 1*g*, fifth end face i*d*, sixth end face 1*k*, seventh end face and eighth end face each having a dimension of about 4 mm as measured vertically as seen in the drawing that corresponds to the veneer sheet thickness, and has further first face 1*b*, second face 1*d*, third face 1*f*, fourth face 1*h*, sixth face 1*m* and seventh face each having a dimension of about 120 mm as measured along the general grain orientation of the veneer sheets, and fifth face 1*j* having a dimension of about 170 mm as measured in the same direction.

Having reference to FIGS. 12 through 37, the following will describe a method of manufacturing laminated veneer lumber (LVL) as the glued laminated wood by using the above-described apparatus.

The initial base material 1 is placed in advance on the chain conveyer 129 which serves as a carrier not only for the base material 1, but also for an in-process LVL board which is formed extending from the base material, as will be appreciated from the description in later part hereof. The paired feeding rolls 11, the paired glue roll 17 and the doctor roll 19 and the stationary roll 23 are started and kept rotated in the respective arrow directions. Manufacture of an LVL board using the initial base material 1 in the apparatus begins with supplying of a veneer sheet which need not be applied with adhesive and is to be arranged in the fifth layer of an LVL board to be made. For this purpose, the glue roll 17 is then placed in its retracted inoperative position away from the stationary roll 23, as shown in FIG. 12(*a*).

Figure 12:
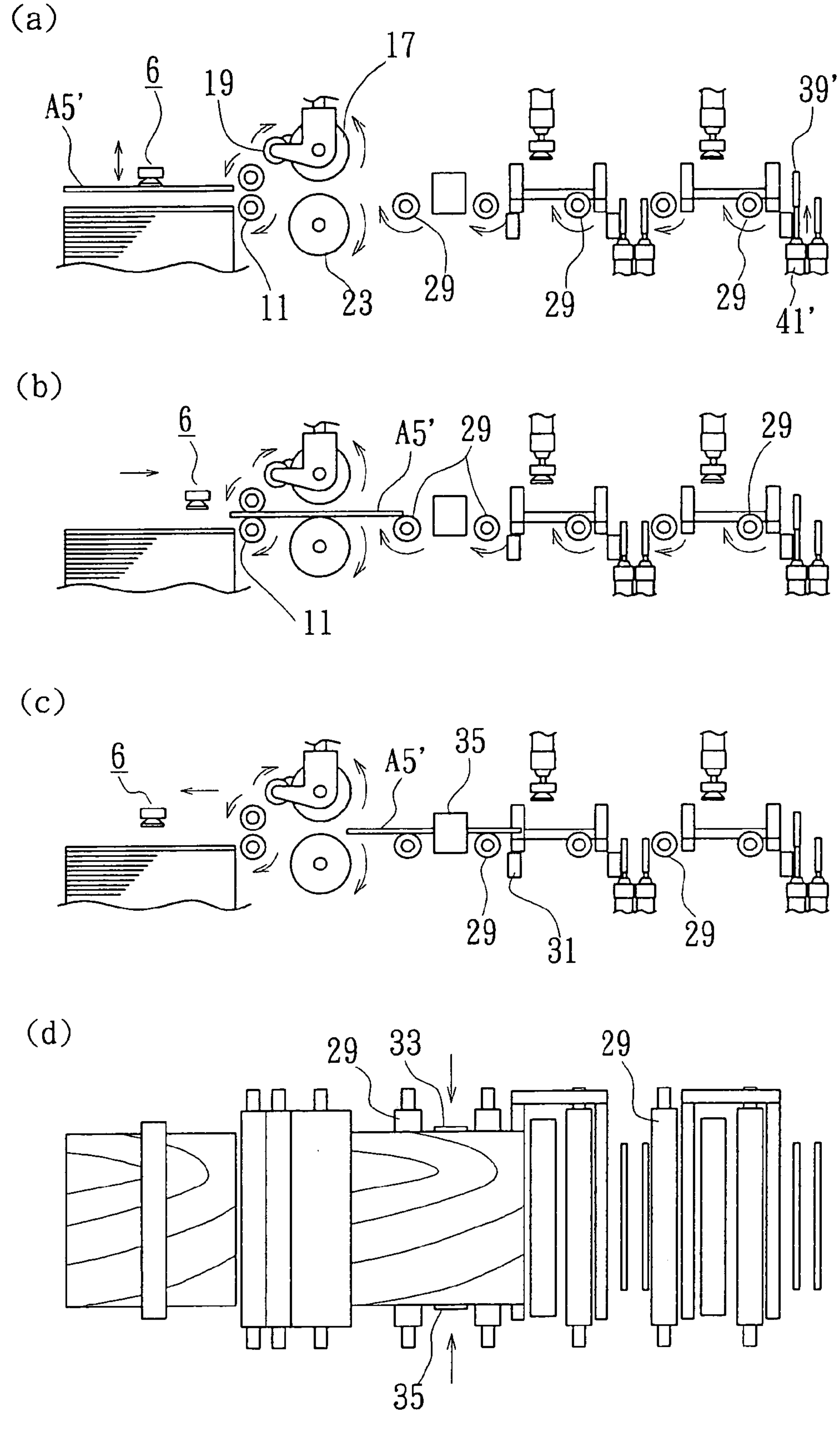
FIGS. 12 through 37 are illustrative views showing respective steps of operation of the apparatus for manufacturing the continuous length of LVL board.

When the control unit C receives a start signal, it generates a signal to start the first conveyer rolls 29 to rotate in arrow direction and simultaneously activate the cylinder 41' thereby to move the stop plate 39' to its extended position as shown in FIG. 12(*a*). Simultaneously, the suction head 6 is operated to pick up the uppermost veneer sheet A5' from the pile as indicated by double-headed arrow in FIG. 12(*a*) and then moved in arrow direction, or rightward as seen on the drawing, to allow the leading end of the veneer sheet A5' to be caught and then transferred forward by the feeding rolls 11 and the first conveyer rolls 29, as shown in FIG. 12(*b*). The suction head 6 is deactivated when the veneer sheet A5' is caught at its leading end by the rolls 11. When the veneer sheet A5' moving past the stationary roll 23 comes to a position where its leading end is detected by the sensor 31, a detection signal is generated by the sensor 31 to the control unit C, which then transmits a signal to stop the first conveyer rolls 29, as shown in FIG. 12(*c*). The same signal causes the suction head 6 to move in arrow direction back to its original standby position as shown in FIG. 12(*c*). In response to a further signal generated by the control unit C after the elapse of a predetermined length of time since the stop of the first conveyer rolls 29, the centering plates 33, 35 are activated to move toward each other until they are brought into contact with the lateral opposite edges of the veneer sheet A5', with the result that the veneer sheet A5' is straightened and centered with respect to the veneer sheet conveying path as shown in FIG. 12(*d*). The centering plates 33, 35 are moved away from each other to their retracted position after the elapse of a predetermined length of time since the activation of the centering plates 33, 35 that is long enough for the veneer sheet to be properly centered and, simultaneously, the conveyer rolls 29 are rotated again to move forward the veneer sheet A5'.

Figure 13:
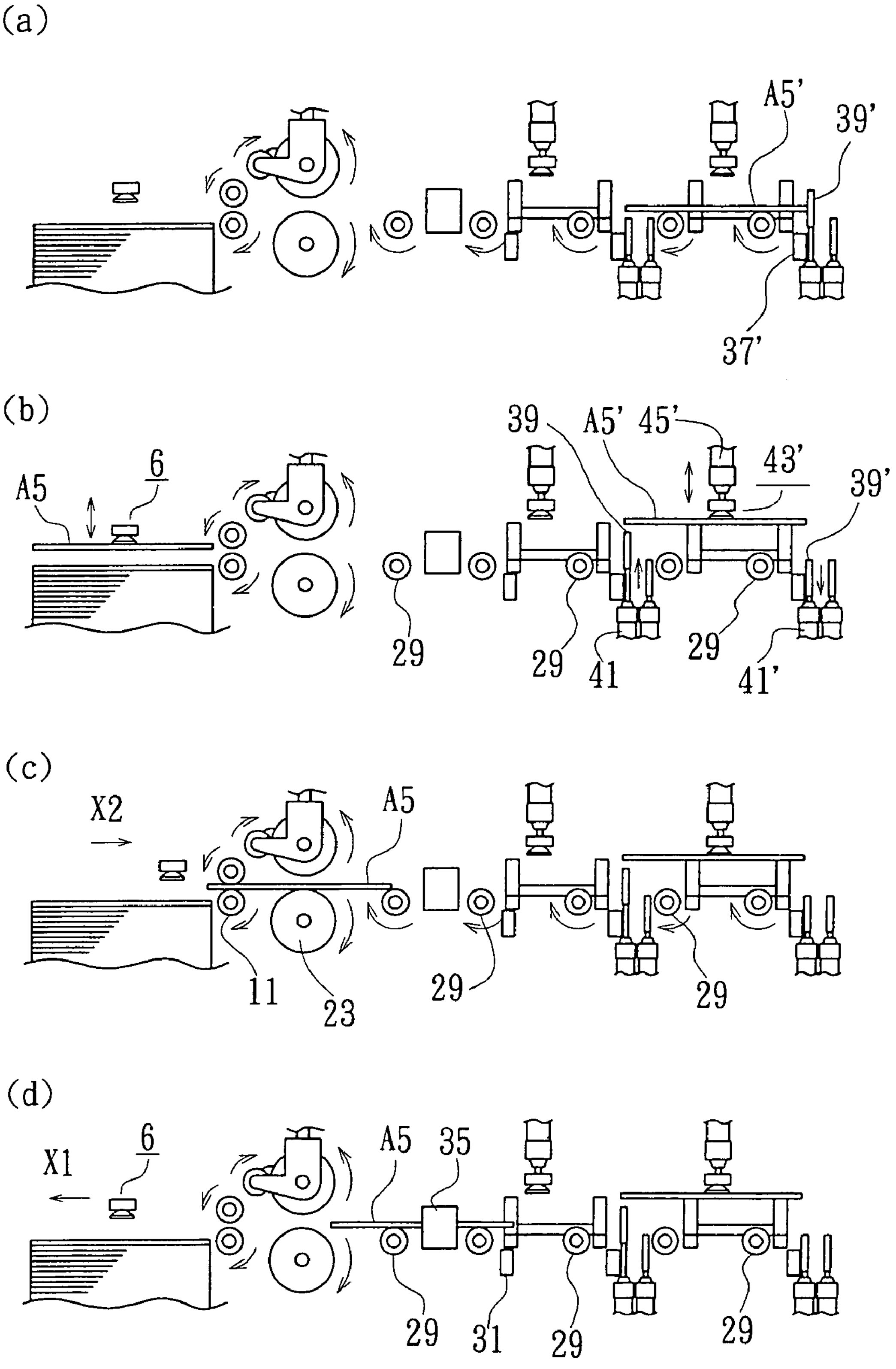

As the veneer sheet A5' comes to a position where its leading end is detected by the sensor 37' as shown in FIG. 13(*a*), the control unit C provides a signal which causes the conveyer rolls 29 to stop after the elapse of a predetermined length of time since the detection by the sensor 37' that is long enough for the leading end to be brought into contact with the stop plate 39', as shown in FIG. 13(*a*). The cylinder 41'is operated so as to move the stop plate 39' to its retracted position. Subsequently the control unit C provides a signal which operates the cylinder 45' so as to lower the suction head 43' for picking up the veneer sheet A5' and then to raise the suction head 43' with the veneer sheet A5' at the standby position, as shown in FIG. 13(*b*). Simultaneously with the raising of the suction head 43', the cylinder 41 is operated so as to move the stop plate 39 to its extended operative position, and the suction head 6 at the veneer sheet feeding station 3 is operated to pick up the uppermost veneer sheet A5 from the veneer sheet pile, as shown in the same drawing.

The first conveyer rolls 29 are then activated again and the suction head 6 moves the sheet A5 between the feed rolls 11, as shown in FIG. 13(*c*), so that the second veneer sheet A5 is moved forward in the same manner as the veneer sheet A5'. As the leading end of the veneer sheet A5 is detected by the sensor 31, the control unit C responding to a detection signal from the sensor 31 generates a signal which causes the conveyer rolls 29 to stop and the suction head 6 to move back to its retracted position, as shown in FIG. 13(*d*). The centering plates 33, 35 are operated so as to straighten and center the veneer sheet A5 in the same manner as the veneer sheet A5'. The centering plates 33, 35 are moved away from each other to their retracted position after the elapse of a predetermined length of time and, simultaneously, the conveyer rolls 29 are rotated again to move forward the veneer sheet A5.

Figure 14:
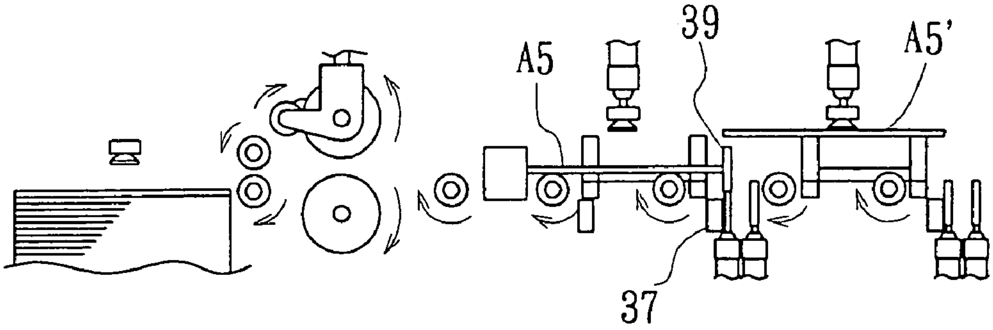
Figure 14:
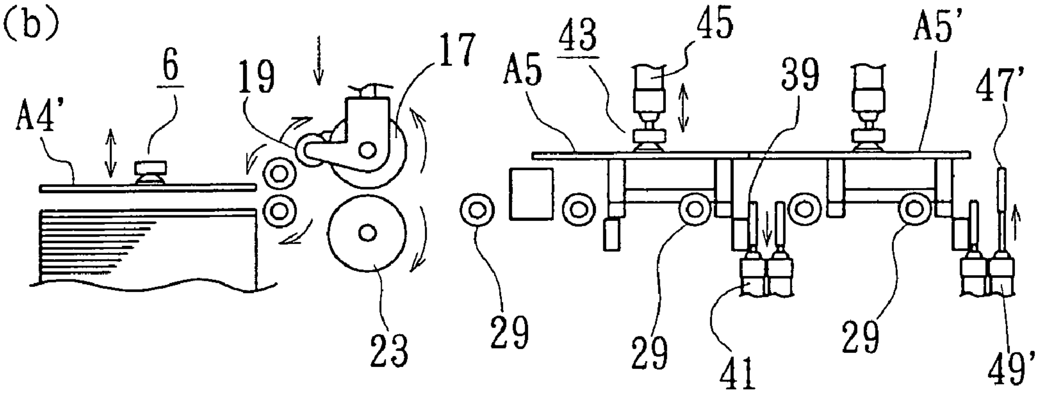
Figure 14:
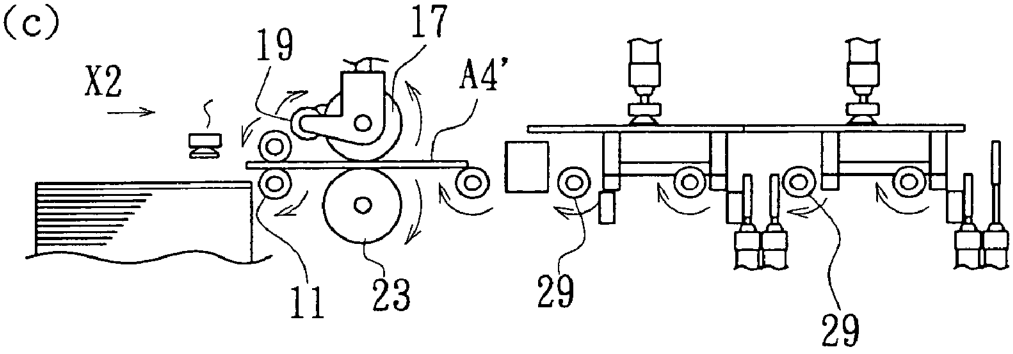
Figure 14:
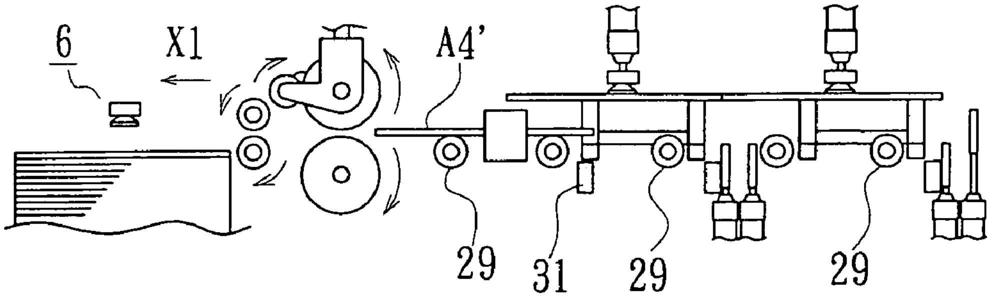

As the veneer sheet A5 comes to a position where its leading end is detected by the sensor 37, the conveyer rolls 29 are stopped after the elapse of a predetermined length of time so that the leading end are brought into contact with the stop plate 39', as shown in FIG. 14(*a*). The cylinder 41 is activated so as to move the stop plate 39 to its retracted position. Then, the cylinder 45 is operated so as to lower the suction head 43 for picking up the veneer sheet A5 and then to raise the suction head 43 with the veneer sheet A5, as shown in FIG. 14(*b*). Subsequently, the cylinder 49' is operated so as to move the stop plate 47' to its extended position and, simultaneously, the cylinder 21 (shown in FIG. 2) is operated so as to lower the roll assembly 17, 19 to the glue spreading position, as shown in FIG. 14(*b*). The suction head 6 is operated so as to pick up the third veneer sheet A4' and the first conveyer rolls 29 are rotated. The veneer sheet A4' is passed through the feed rolls 11 and then between the glue roll 17 and the stationary roll 23, as shown in FIG. 14(*c*), so that the veneer sheet A4' is coated on its upper surface with adhesive. Veneer sheet having its upper surface thus coated with adhesive will be referred to as "coated veneer sheet" hereinafter. After the veneer sheet A4' has passes through the feed rolls 11, the suction head 6 returns to its original standby position, as shown in FIG. 14(*d*).

As the coated veneer sheet A4' comes to a position where its leading end is detected by the sensor 31, the conveyer rolls 29 are stopped and the centering plates 33, 35 are operated for straightening and centering the veneer sheet A4'. The centering plates 33, 35 are moved away from each other to their retracted position after the elapse of a predetermined length of time and, simultaneously, the conveyer rolls 29 are rotated again to move further forward the veneer sheet A4'.

Figure 15:
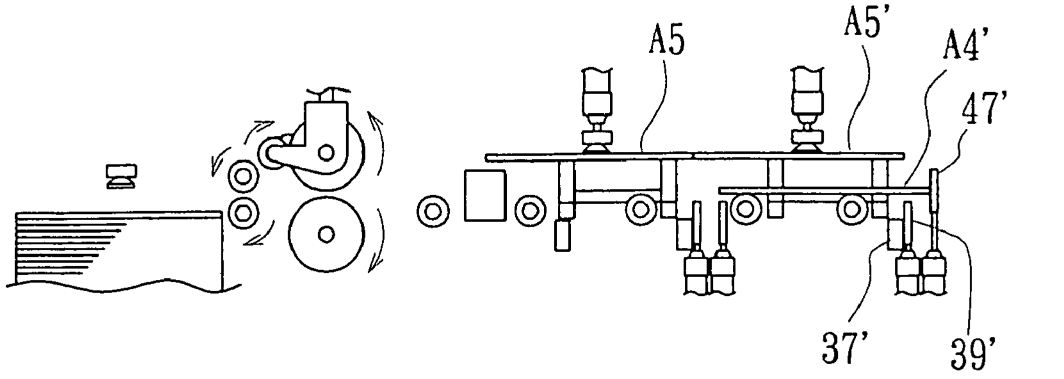
Figure 15:
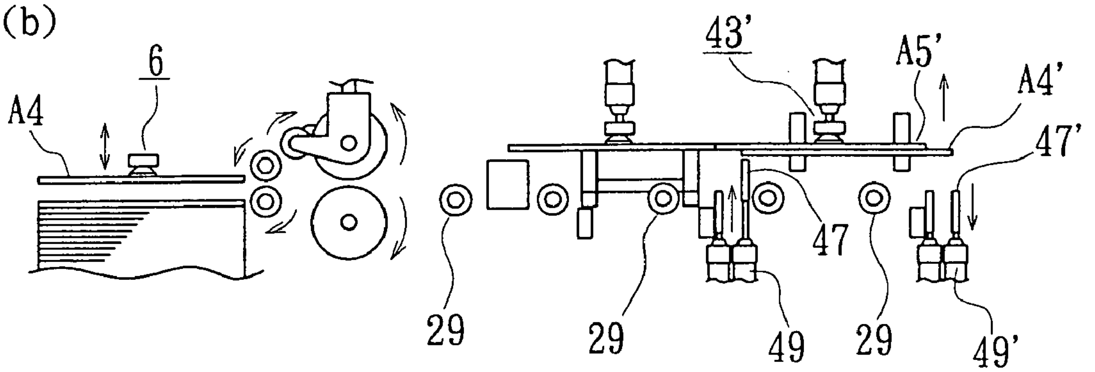
Figure 15:
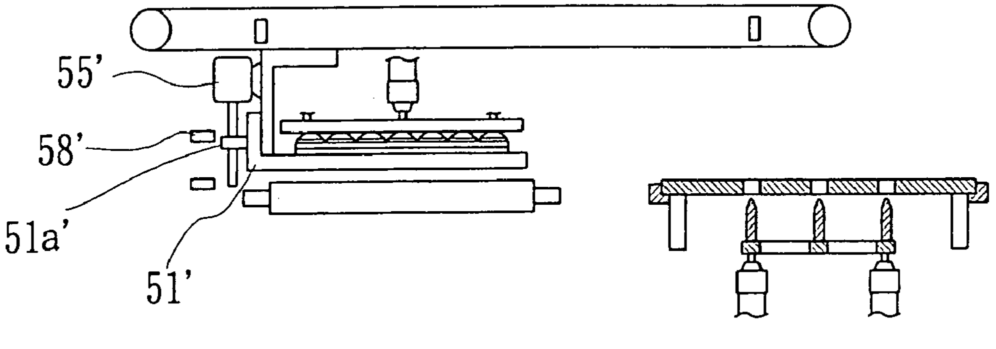

As the leading end of the coated veneer sheet A4' is detected by the sensor 37', the conveyer rolls 29 are stopped after the elapse of a predetermined length of time for the leading end to be brought into contact with the stop plates 47', as shown in FIG. 15(*a*). In the state of FIG. 15(*a*), the coated veneer sheet A4' is located below the veneer sheet A5' at position offset downstream therefrom, or rightward as seen in the drawing, by a distance of about 120 mm that corresponds to the spaced distance between the first and second stop plates 39' and 47'. After the coated veneer sheet A5'has been thus positioned by the stop plate 47', the stop plate 47' is retracted, as shown in FIG. 15(*b*).

The motor 55' for the second veneer sheet traversing device is operated so as to move the lifting bar 51' upward until its block 51*a* ' is detected by the sensor 58', as shown in FIG. 15(*c*). By so doing, the coated veneer sheet A4' is placed below the veneer sheet A5' in offset relation wherein the adjacent ends of the two veneer sheets A4', A5' are staggered by the above distance of about 120 mm, as shown in FIG. 15(*b*). The cylinder 49 is operated to extend the stop plate 47 to its operative position. Subsequently, the suction head 43' is deactivated by closing the shutter (not shown), so that the coated veneer sheet A5' is supported with the veneer sheet A4' by the lifting bar 51'.

Figure 16:
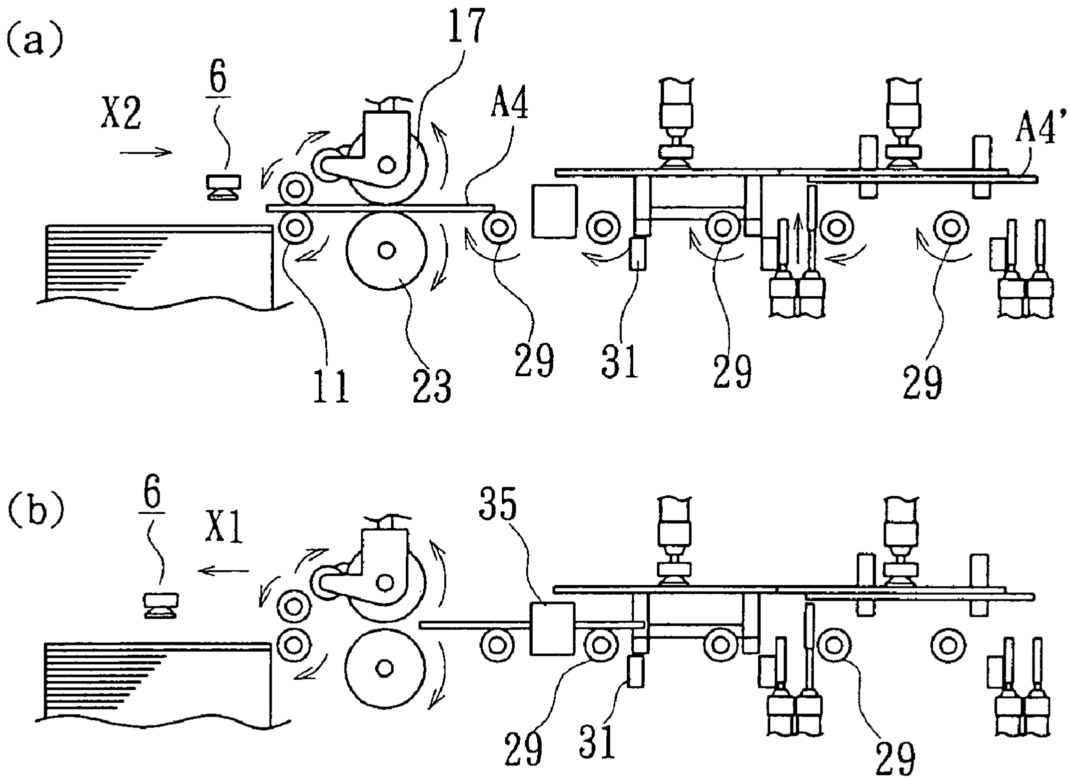

Subsequently, operating the first conveyer rolls 29 and the suction head 6, a fourth veneer sheet A4 is picked up from the pile, coated with adhesive and conveyed forward in the same manner as the veneer sheet A4', as shown in FIG. 16(*a*), until its leading end is detected by the sensor 31. As the movement of the veneer sheet A4 is stopped, the suction head 6 is retracted and the veneer sheet A4 undergoes centering by the centering plates 33, 35, as shown in FIG. 16(*b*), which is followed by reactivation of the first conveyer rolls 29.

Figure 17:
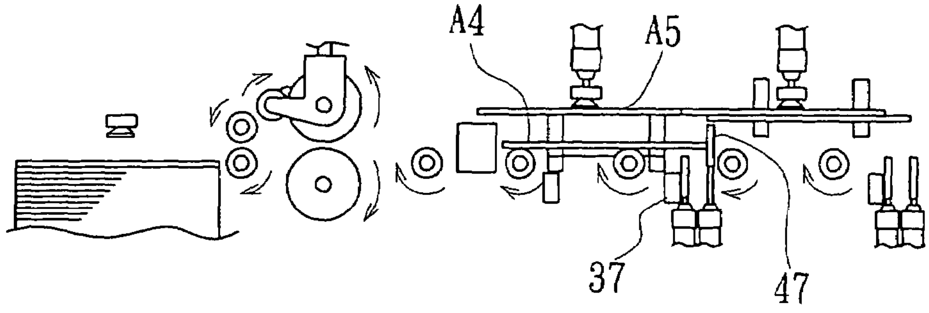
Figure 17:
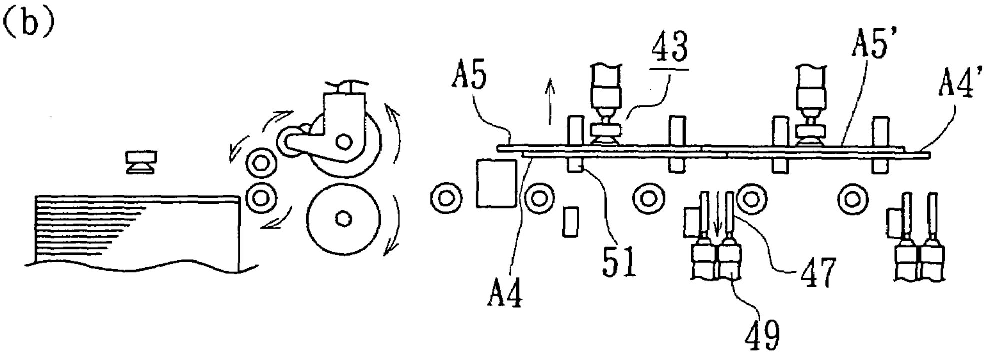
Figure 17:
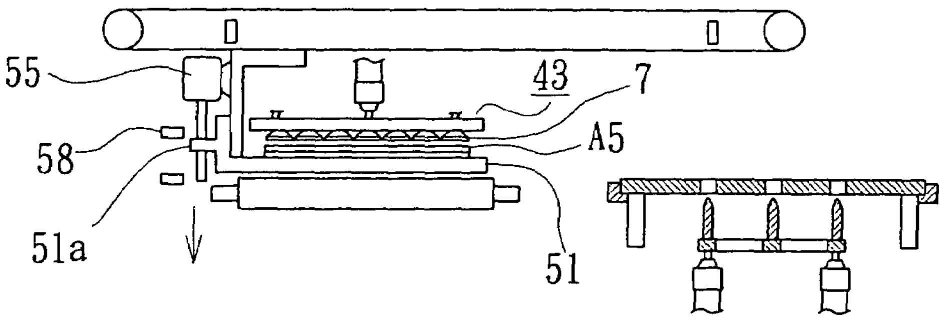

When the leading end of the coated veneer sheet A4 moved by the conveyer rolls 29 is detected by the sensor 37, the conveyer rolls 29 are stopped after the elapse of a predetermined length of time since the detection by the sensor 37 so that the leading end of the coated veneer sheet A4 is brought into contact with the stop plate 47, as shown in FIG. 17(*a*). The coated veneer sheet A4 with its leading end placed in contact with the stop plate 47 is located at a position below the veneer sheet A5 and offset downstream therefrom by a distance of about 120 mm that corresponds to the spaced distance between the first and second stop plates 39 and 47. The cylinder 49 is then operated so as to retract the stop plate 47, as shown in FIG. 17(*b*).

The motor 55 for the first veneer sheet traversing device is operated so as to move the lifting bars 51 upward in the same manner as the lifting bar 51'. Thus, the coated veneer sheet A4 is placed below the veneer sheet A5 in an offset relation with the adjacent ends of the two veneer sheets A4, A5 staggered by about 120 mm, as shown in FIG. 17(*b*). The suction head 43 is deactivated by closing its associated shutter (not shown), so that the coated veneer sheet A5 is released from the suction head 43 and supported with the veneer sheet A4 by the lifting bar 51', as shown in FIG. 17(*b*).

Then, the motors 55, 55' are operated simultaneously so as to lower the lifting bars 51, 51' until the sensors 58, 58' detect the blocks 51*a*, 51*a* ' no more, as shown in FIG. 17(*c*), although the drawing shows only the first veneer sheet traversing device. Thus, the veneer sheets A5, A5' are positioned with a slight clearance from the suction heads 43, 43', respectively, as shown in FIG. 17(*c*) (only veneer sheet A5 being shown in this drawing).

Subsequently, the motors 65, 65' for the first and second veneer sheet traversing devices are activated. Though the following will describe the movement of the lifting bar 51 and the related operation of the first veneer sheet traversing device with reference to FIGS. 18(*a*) through 18(*d*), the same operation takes place simultaneously for the second veneer sheet traversing device.

Figure 18:
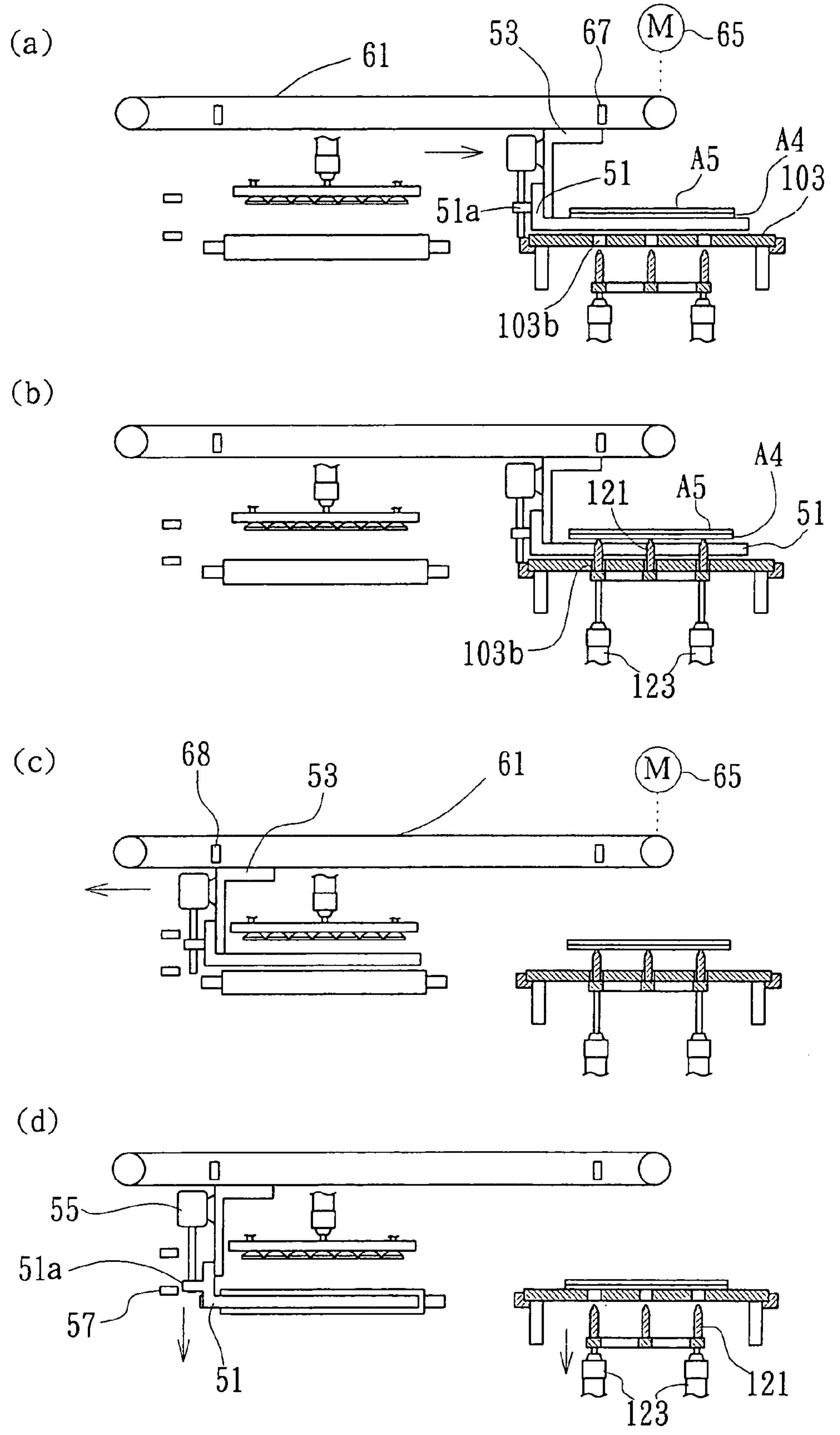

The motor 65 drives the belt 61 to move the support block 53, to which the lifting bar 51 is fixed, rightward as indicated by arrow in FIG. 18(*a*) until the block 53 is detected by the sensor 67, where the lifting bar 51 carrying thereon the veneer sheets A4, A5 is located immediately above the veneer sheet carrier plate 103, as shown in the same drawing. The cylinders 123 are then activated to raise the upstanding rods 121 until they are inserted through the holes 103*b* formed in the veneer sheet carrier plate 103 so that the combined veneer sheets A4, A5 are pushed upward by the rods 121 to be clear of the lifting bar 51, as shown in FIG. 18(*b*). The belt 61 is driven by the motor 65 so as to move back the support block 53 until it is detected by the sensor 68, as shown in FIG. 18(*c*). Subsequently, the cylinders 123 are operated to retract their rods 121 so that the veneer sheets A4, A5 are placed onto the carrier plate 103, and lifting bar 51 is lowered by the motor 55 to its original position where the block 51*a* is detected by the sensor 57, as shown in FIG. 18(*d*).

Figure 19:
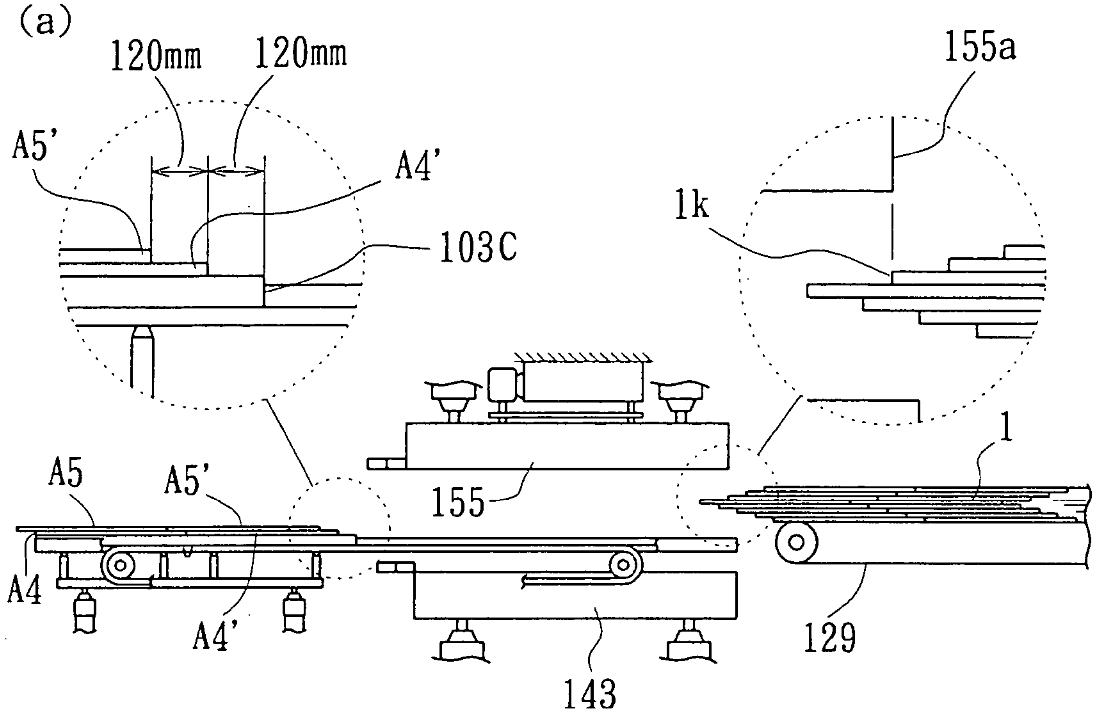
Figure 19:
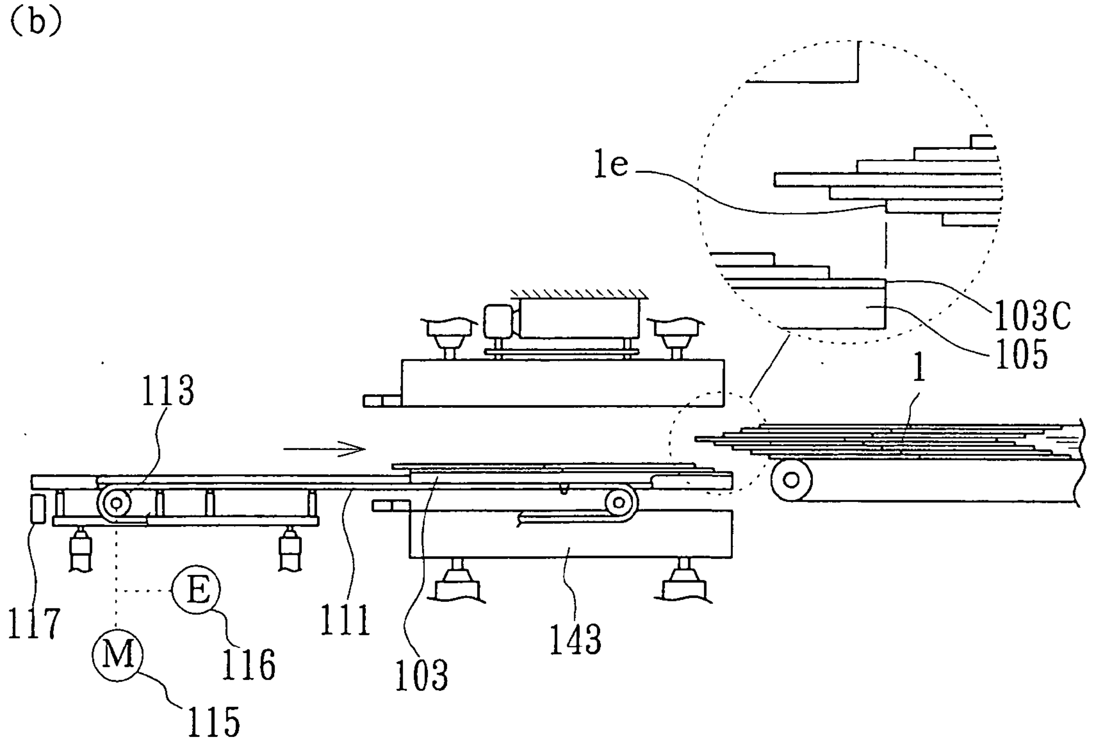

As shown in FIG. 19(*a*), two veneer sheets A4, A4' or A5, A5' thus placed on the carrier plate 103 are disposed one next the other with the adjacent ends thereof set in facing relation to each other. The carrier plate 103 is so sized and arranged that the veneer sheets A4, A5, A4', A5' are placed on the carrier plate 103 by the operation of the first and second veneer sheet traversing devices as described above in such a way that one end of the coated veneer sheet A4' adjacent to the heating plates 143, 155 of the hot press is spaced from the adjacent end face 103*c* of the carrier plate 103 at a distance of about 120 mm, as shown in the left enlarged view of FIG. 19(*a*).

The servo motor 133 is activated to move the chain conveyer 129 to a position where the sixth end face 1*k* (FIG. 11) of veneer sheet in the sixth layer of the initial base material 1 placed on the chain conveyer 129 is substantially in alignment with the adjacent end face 155*a* of the upper heating plate 155, as shown in the right enlarged view of FIG. 19(*a*). Subsequently, the motor 115 is activated to move the belts 111 with the veneer sheet carrier plate 103 until a position is reached where the end face 103*c* of the carrier plate 103 is substantially in alignment with the third end face 1*e* of veneer sheet in the third layer of the initial base material 1 as shown in enlarged view of FIG. 19(*b*). The position where the belts 111 and hence the carrier plate 103 should be stopped is determined by the control unit C which controls the operation of the motor 115 in response to a signal from the rotary encoder 116 which determines the current position of the carrier plate 103 with respect to a predetermined reference position of the apparatus by counting the rotation angle of the motor 115.

Figure 20:
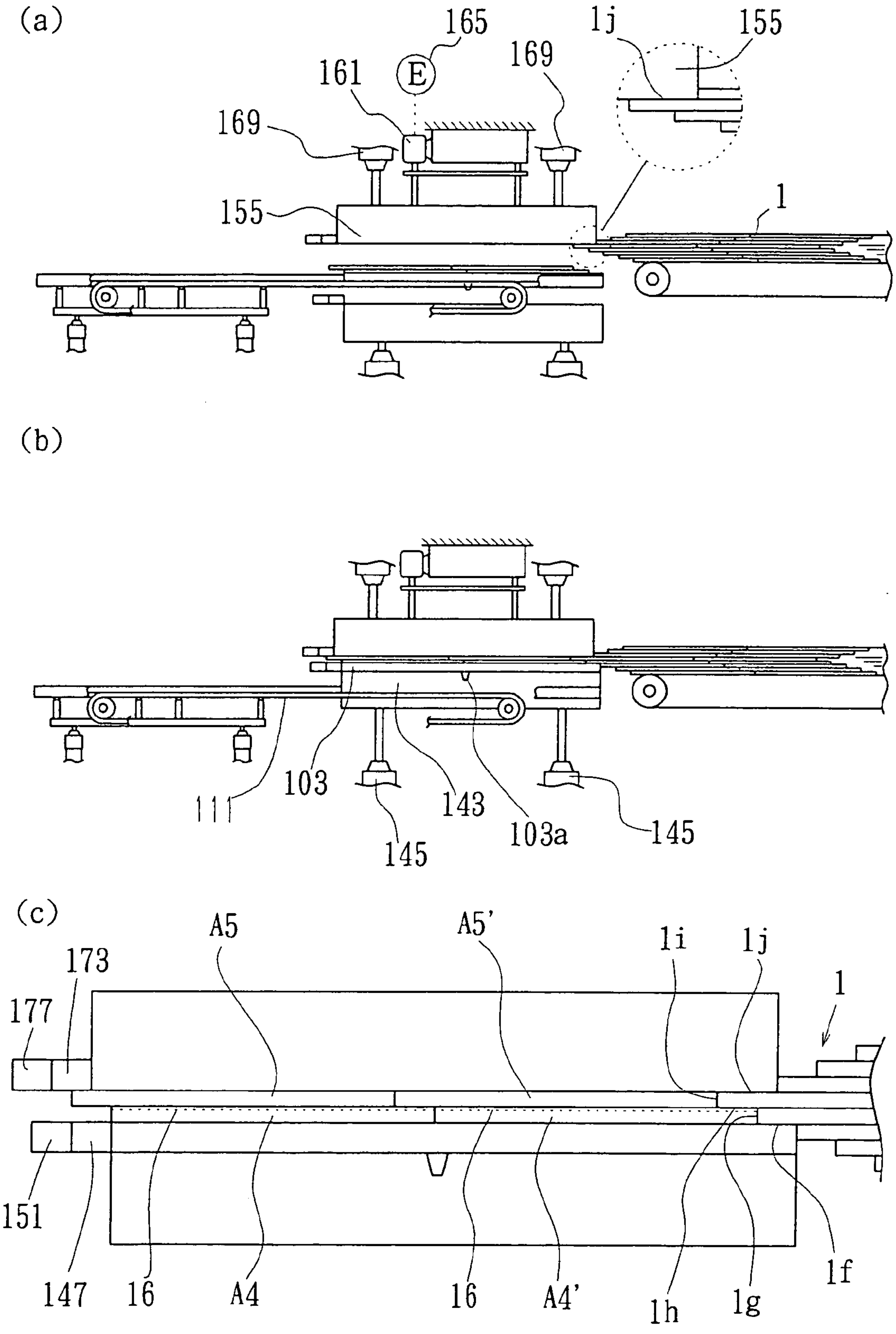

Then, the electromagnetic valve 171 connected to the cylinders 169 through the fluid ports 169*a* is opened and the servo motor 161 is activated so as to lower the upper heating plate 155 until the lower surface of the heating plate 155 comes to a position spaced away from the aforementioned reference position of the base material 1 at a distance corresponding to the thickness of veneer sheet, i.e. to a position where the lower surface of the upper heating plate 155 is moved to the height corresponding to that of the fifth face 1*j* of veneer sheet in the fifth layer of the initial base material 1, as shown in FIG. 20(*a*). The position where the upper heating plate 155 should be stopped is determined by the control unit C which controls the operation of the servo motor 161 in response to a signal from the rotary encoder 165 which determines the current position of the upper heating plate 155 with respect to the aforementioned predetermined reference position of the base material 1 by counting the rotation angle of the motor 161. The electromagnetic valve 171 is closed after the motor 161 is stopped.

Then, the hydraulic cylinders 145, 145 are activated to raise the lower heating plate 143. While the lower heating plate 143 is moved upward, the carrier plate 103 carrying thereon veneer sheets A4, A5, A4', A5' is disengaged from the belts 111 and moved further upward together with the heating plate 143 until the veneer sheets are pressed at a pressure of about 1 MPa, as shown in FIG. 20(*b*). Four veneer sheets A4, A4', A5, A5' are pressed between the heating plates 155, 143 in the same positional relation as that shown in FIG. 19(*a*) and also such that the right ends of the coated veneer sheets A4', AS' adjacent to the initial base material 1 are set in facing relation to the fourth and fifth end faces 1*g* an 1*i* of veneer sheet in the fourth and fifth layers of the initial base material 1, respectively, as shown in FIG. 20(*c*). Additionally, the entire surface area of the coated veneer sheets A4, A4' receives pressure from the lower heating plate 143 and the same entire surface area is backed up or supported by the upper heating plate 155 during pressing. This hot pressing is done at a pressure of about 1 MPa and continued for about three minutes. It is noted that during this hot pressing the auxiliary heating plates 147, 151, 173, 177 do not contribute to hot pressing of veneer sheets.

Figure 21:
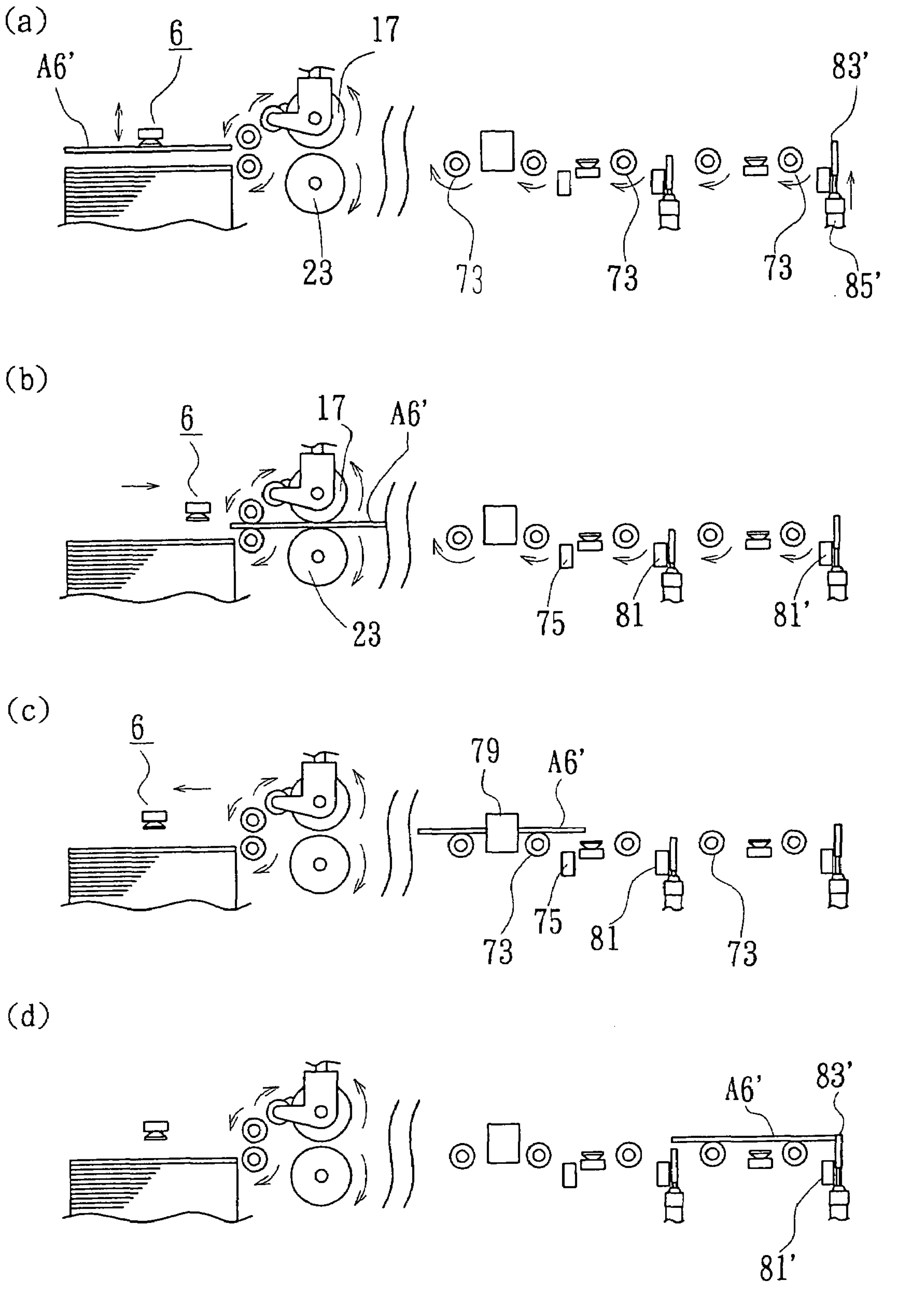

The control unit C generates at an appropriate time during this hot pressing a command signal to initiate a series of operation steps which are to be performed during the three minutes of the above hot pressing for preparation of the next set of veneer sheets. Namely, the second conveyer rolls 73, as well as the first conveyer rolls 29, are driven to rotate and the cylinder 85' is operated so as to extend the stop plate 83', as shown in FIG. 21(*a*). Simultaneously, the suction head 6 is operated to pick up and feed a veneer sheet A6' through the glue spreader 17, 23, as shown in FIG. 21(*b*). As the coated veneer sheet A6' is detected at its leading end by the sensor 75, the second conveyer rolls 73 are stopped and the second centering plates 77, 79 (only one plate 79 being shown) are operated to straighten and center the coated veneer sheet A6', as shown in FIG. 21(*c*). After the centering is over, the second conveyer rolls 73 are rotated again to move the coated veneer sheet A6' forward. As the veneer sheet A6' comes to a position where its leading end is detected by the sensor 81', the second conveyer rolls 73 are stopped after the elapse of a predetermined length of time since the detection by the sensor 81' that is long enough for the leading end to be brought into contact with the stop plate 83', as shown in FIG. 21(*d*).

Figure 22:
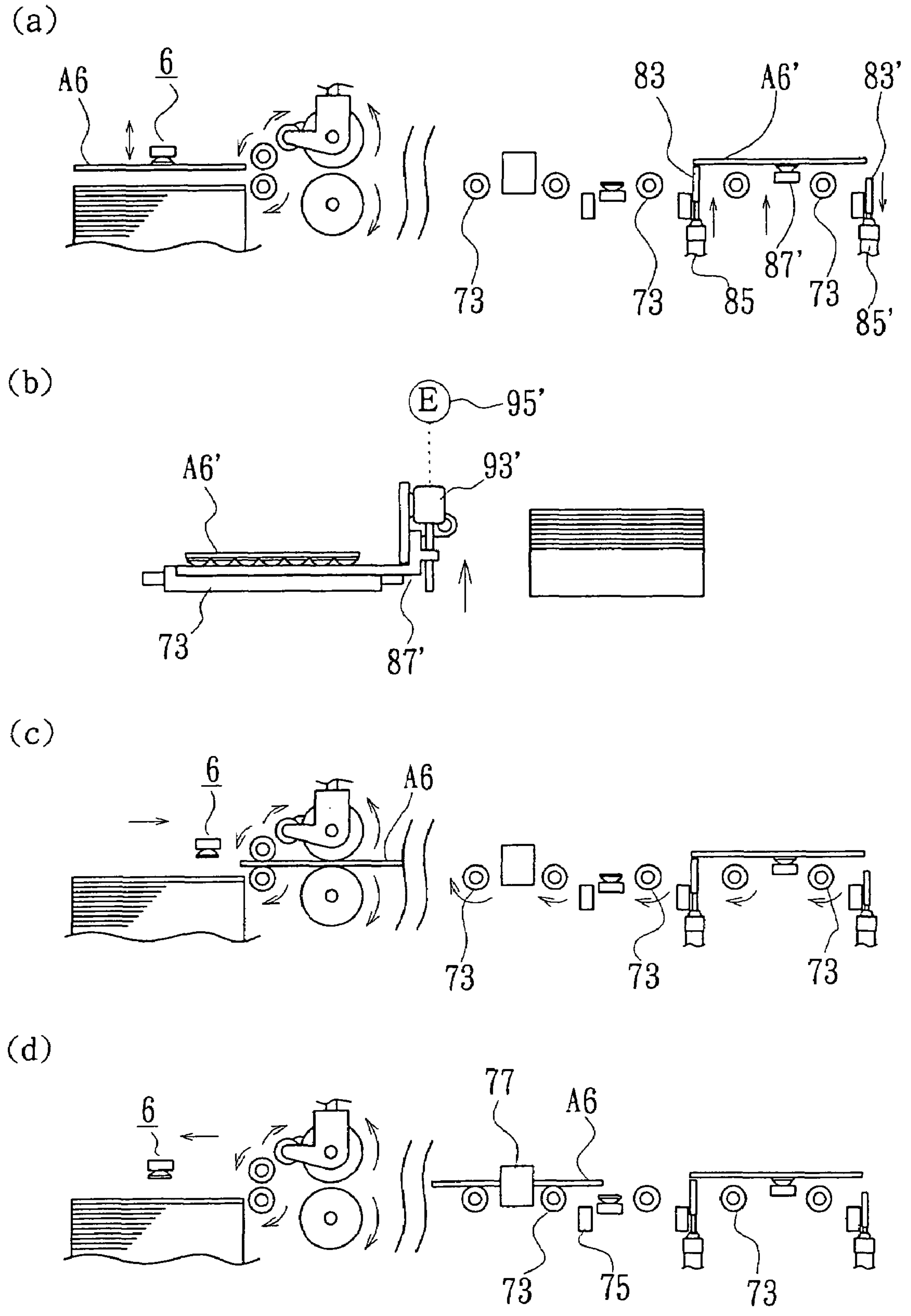

The cylinder 85' is activated to move the stop plate 83' to its retracted position as shown in FIG. 22(*a*), and the servo motor 93' is operated to raise the second suction head 87' for holding by suction and then raising the coated veneer sheet A6' until a predetermined position above the veneer sheet conveying path is reached by the suction head 87', as shown in FIGS. 22(*a*) and 22(*b*). Operation of the servo motor 93'is controlled by the control unit C responding to a signal from the rotary encoder 95'which is operable in the same manner as, for example, the encoder 165 for the motor 161. Then, the cylinder 85 is activated so as to extend the stop plate 83, as shown in FIG. 22(*a*). Simultaneously, the second conveyer rolls 73 are rotated again and the suction head 6 is operated to pick up a veneer sheet A6 and allow it to pass through the glue spreader 17, 23, as shown in FIGS. 22(*a*) and 22(*c*). As the coated veneer sheet A6 comes to a position where its leading end is detected by the sensor 75, the conveyer rolls 73 are stopped and the coated veneer sheet A6 is centered by the centering plates 77, 79, as shown in FIG. 22(*d*). Subsequently, the conveyer rolls 73 are rotated again to move forward the coated veneer sheet A6.

Figure 23:
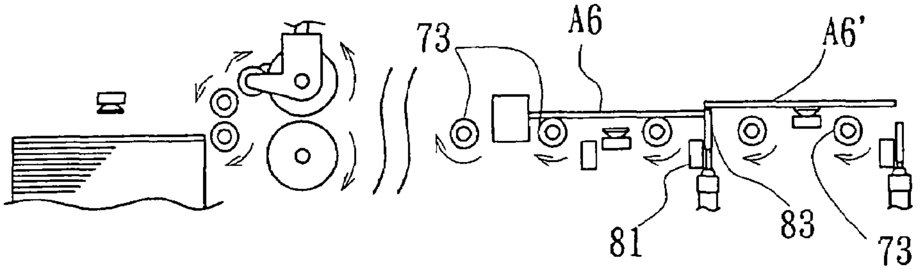
Figure 23:
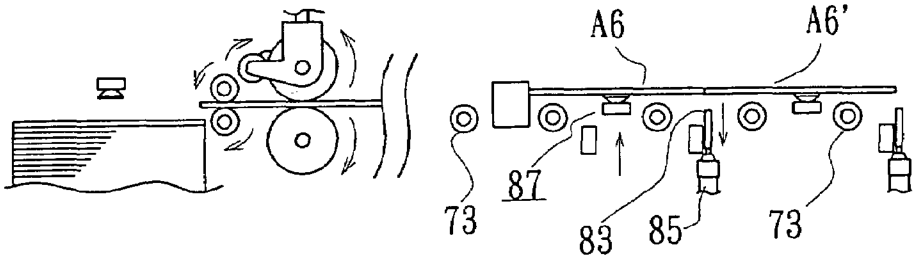
Figure 23:
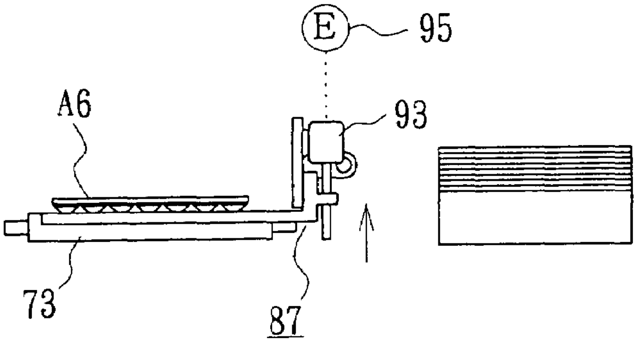
Figure 23:
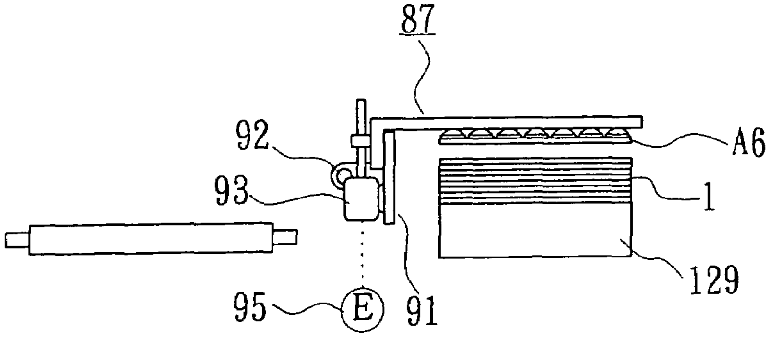

As the coated veneer sheet A6 moves to a position where its leading end is detected by the sensor 81, the conveyer rolls 73 are stopped after the elapse of a predetermined length of time so that the leading end of the veneer sheet A6 is brought into contact with the stop plate 83, as shown in FIG. 23(*a*), and the cylinder 85 is activated to move the stop plate 83 to its retracted position, as shown in FIG. 23(*b*). Similarly to the operation described with reference to FIGS. 22(*a*) and 22(*b*), the servo motor 93 is operated to raise the suction head 87 to the predetermined position above the veneer sheet conveying path, as shown in FIGS. 23(*b*) and 23(*c*). When both veneer sheets A6' and A6 are thus placed at the predetermined positions as shown in FIG. 23(*b*), the control unit C generates a command signal to activate the motors (not shown) to rotate the pivotal shafts 92, 92' for swinging the motor supports 91, 91' and hence the suction heads 87, 87' for about 180 degrees so that the veneer sheets A6, A6'are placed with their coated surfaces disposed immediately above the base material 1, as shown in FIG. 23(*d*).

Figure 24:
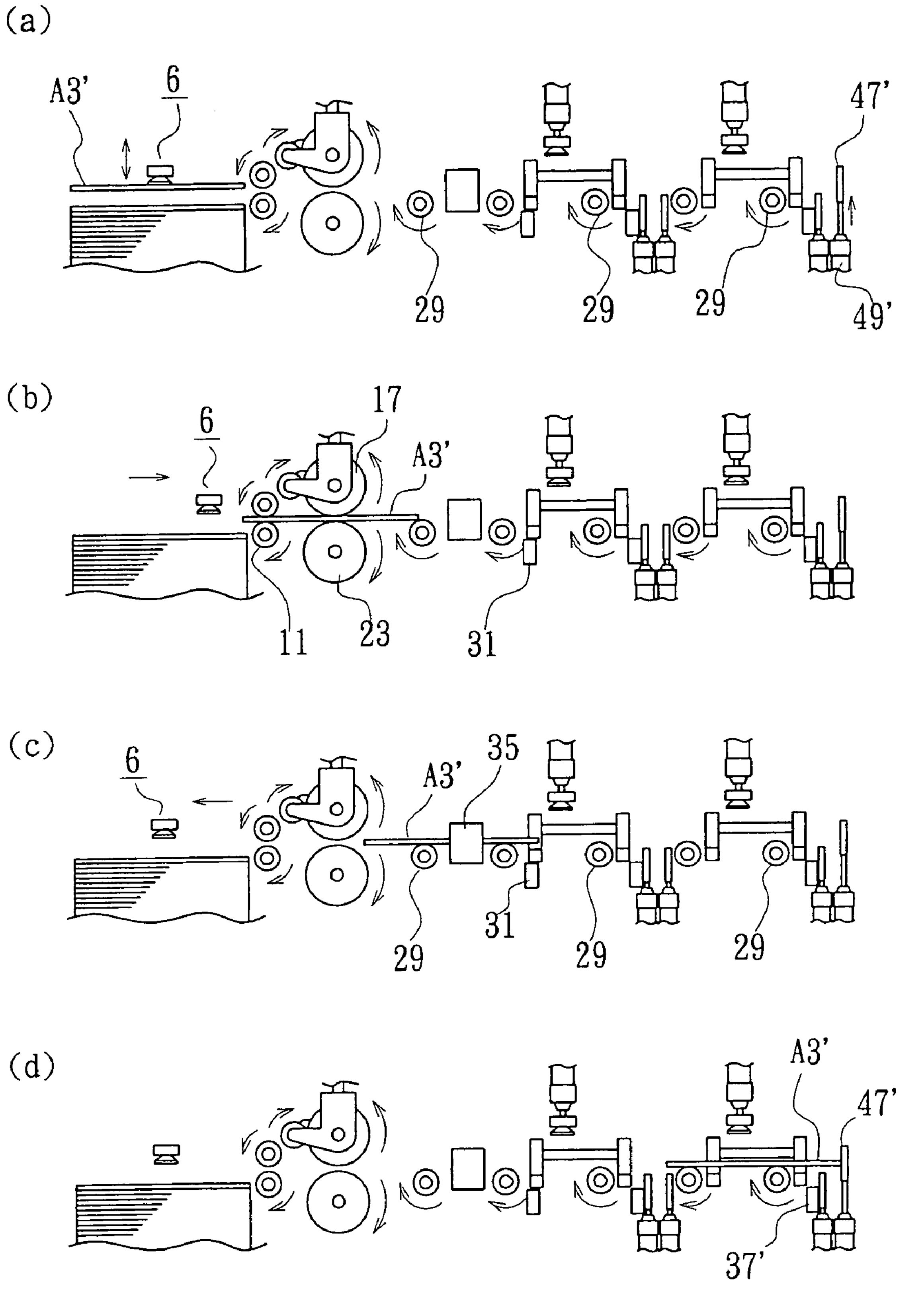

With the first conveyer rolls 29 rotated in arrow direction and the stop plate 47' extended by operating the cylinder 49', as shown in FIG. 24(*a*), the suction head 6 is operated to pick up and feed a veneer sheet A3' through the glue spreader 17, 23, as shown in FIG. 24(*b*), and moved forward until the leading end of the coated veneer sheet A3' is detected by the sensor 31, as shown in FIG. 24(*c*). In the position of FIG. 24(*c*), the coated veneer sheet A3' is centered by the centering plates 33, 35, whereupon the conveyer rolls 29 are rotated again and the coated veneer sheet A3' is moved forward until it is brought into contact with the stop plate 47' in the same manner as described above, e.g., with reference to the veneer sheet A5'.

Figure 25:
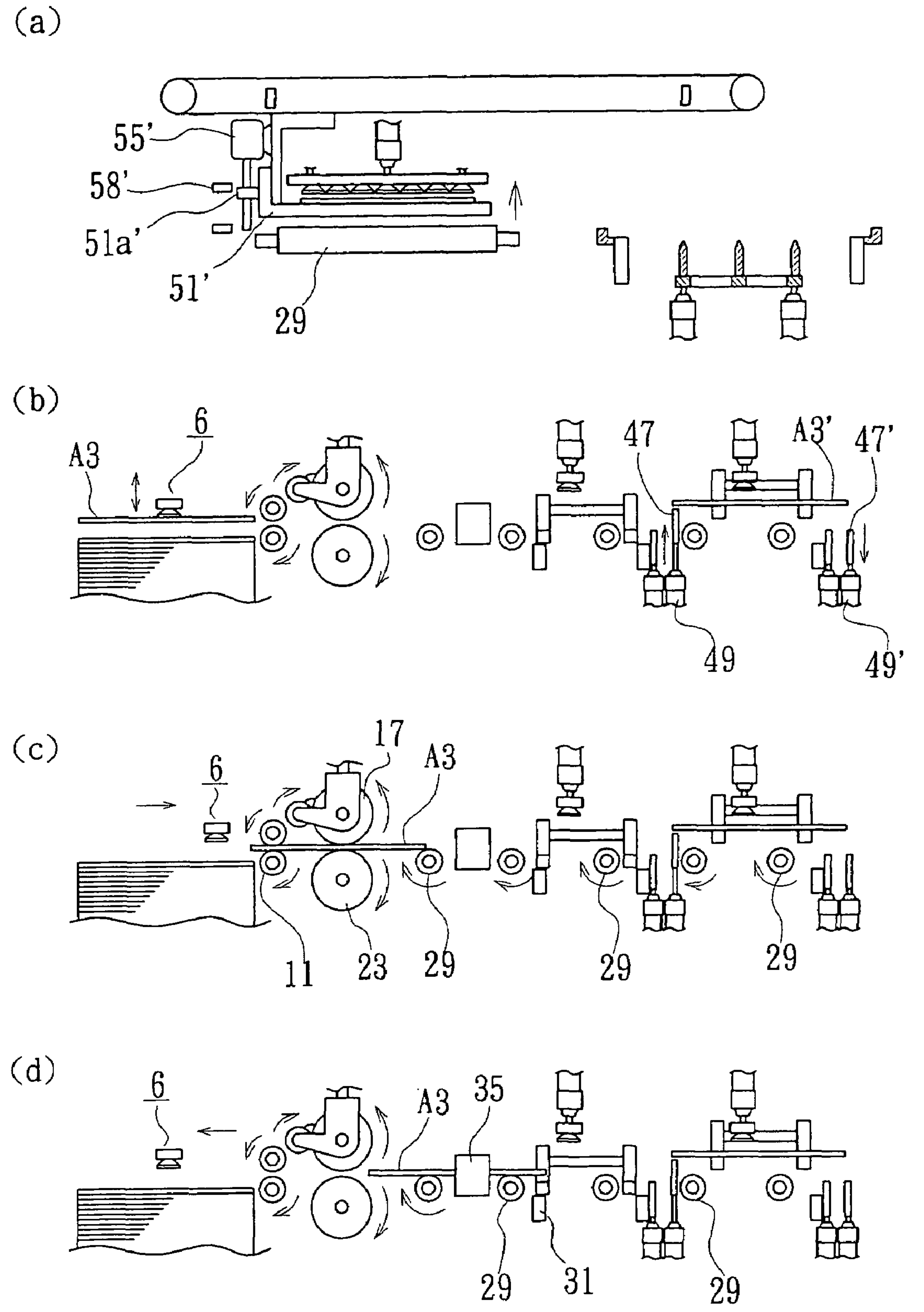

The motor 55' is operated to elevate the lifting bar 51' until its block 51*a* ' is detected by the sensor 58' so that the coated veneer sheet A3' is held at a position above the veneer sheet conveying path, as shown in FIG. 25(*a*). Then operating the cylinders 49' and 49, the stop plate 47' is retracted while the stop plate 47 is extended, as shown in FIG. 25(*b*). With the first conveyer rolls 29 rotated, the suction head 6 is operated to pick up and feed a veneer sheet A3 through the glue spreader 17, 23, as shown in FIGS. 25(*b*) and 25(*c*), and the veneer sheet A3 is moved forward until its leading end is detected by the sensor 31, as shown in FIG. 24(*d*), where the coated veneer sheet A3 is centered by the centering plates 33, 35.

Figure 26:
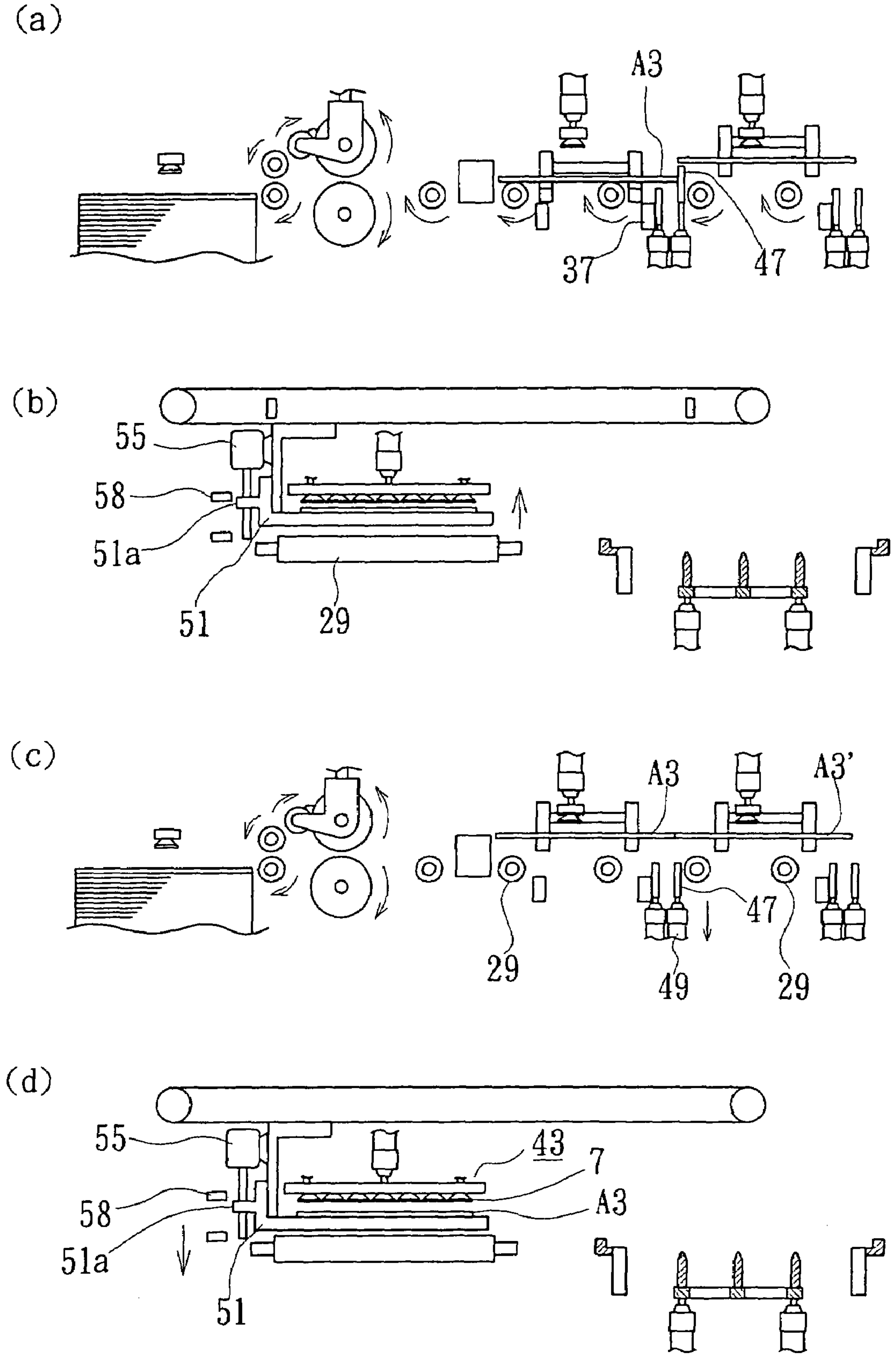

The conveyer rolls 29 are rotated again to move the coated veneer sheet A3 forward. As the veneer sheet A3 comes to a position where its leading end is detected by the sensor 37, the conveyer rolls 29 are stopped after the elapse of a predetermined length of time since the detection so that the leading end of the veneer sheet 3 is brought into contact with the stop plate 47, as shown in FIG. 26(*a*). The motor 55 is operated so as to raise the lifting bar 51 until the block 51*a* is detected by the sensor 58, as shown in FIG. 26(*b*). The cylinder 49 is activated to move the stop plate 47 to its retracted position, as shown in FIG. 26(*c*). Then, the motors 55, 55' are operated simultaneously so as to lower the lifting bars 51, 51' until the sensors 58, 58' detect the blocks 51*a*, 51*a* ' no more, as shown in FIG. 26(*d*), although the drawing shows only the first veneer sheet traversing device. Thus, the veneer sheets A3, A3' are positioned with a slight clearance from the suction heads 43, 43', respectively, as shown in FIG. 26(*d*).

The above steps of operation described with reference to FIGS. 21 through 26 are performed during the three minutes of hot pressing operation of FIG. 20(*c*). The adhesive is set enough during this hot pressing to bond two sets of veneer sheets A4, A4' and A5, A5' to each other, as well as to the initial base material 1. By so doing, a new base material which includes the added veneer sheets A4, A4', A5, A5' is formed. For the sake of the description, such base material will be referred to by reference numeral 1-1. It is noted that such base material 1-1 may be regarded as an in-process LVL board.

Figure 27:
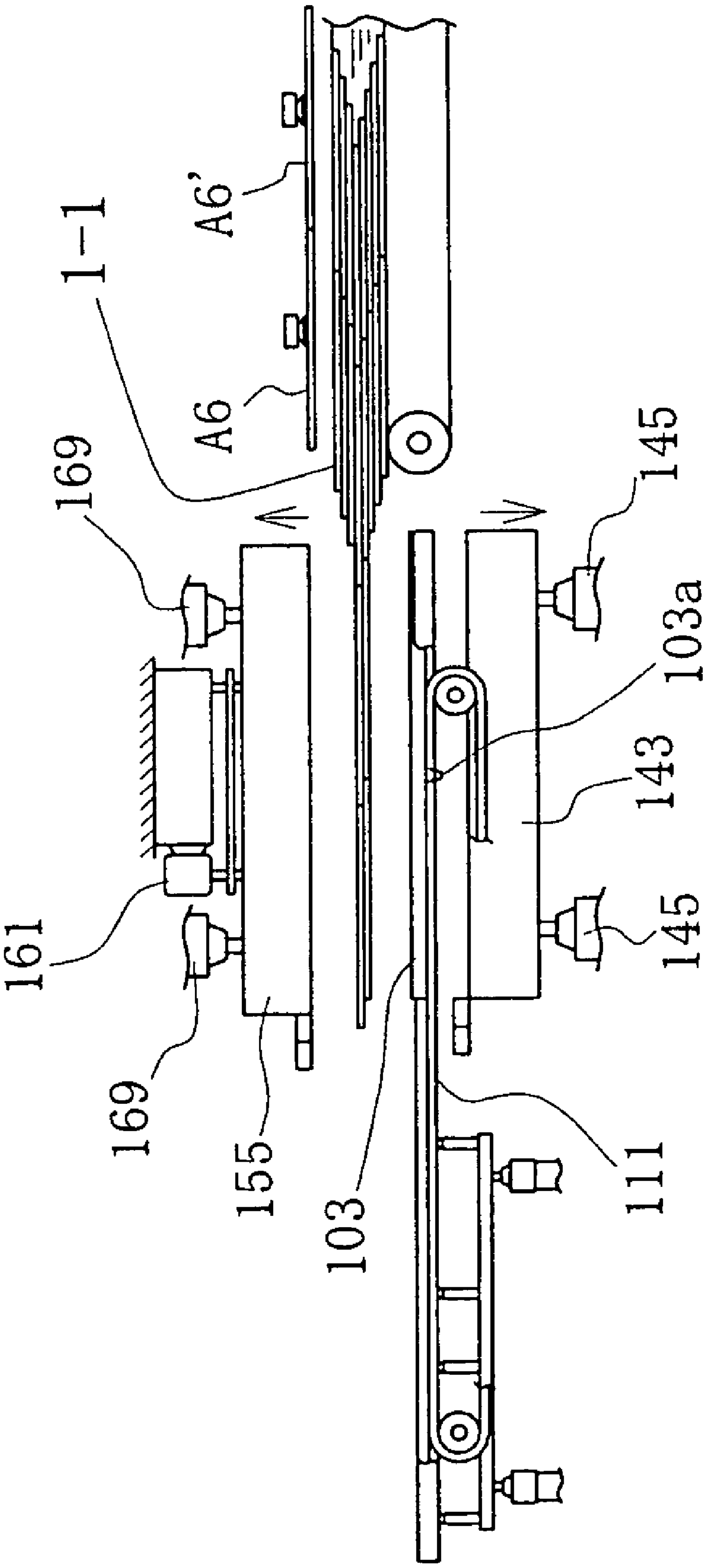

When the three minutes have passed, the control unit C generates a signal which firstly causes the electromagnetic valve 171 (FIG. 8) to open and then the servo motor 161 to operate so as to move the upper heating plate 155 upward to its original standby position, and actuates the hydraulic cylinders 145 so as to move the lower heating plate 143 to its original standby position, as shown in FIG. 27. The carrier plate 103 is lowered with the lower heating plate 143 until it engages with the belts 111 with the projections 103*a* of the carrier plate 103 received in the holes 111*a* in the belts 111.

Figure 28:
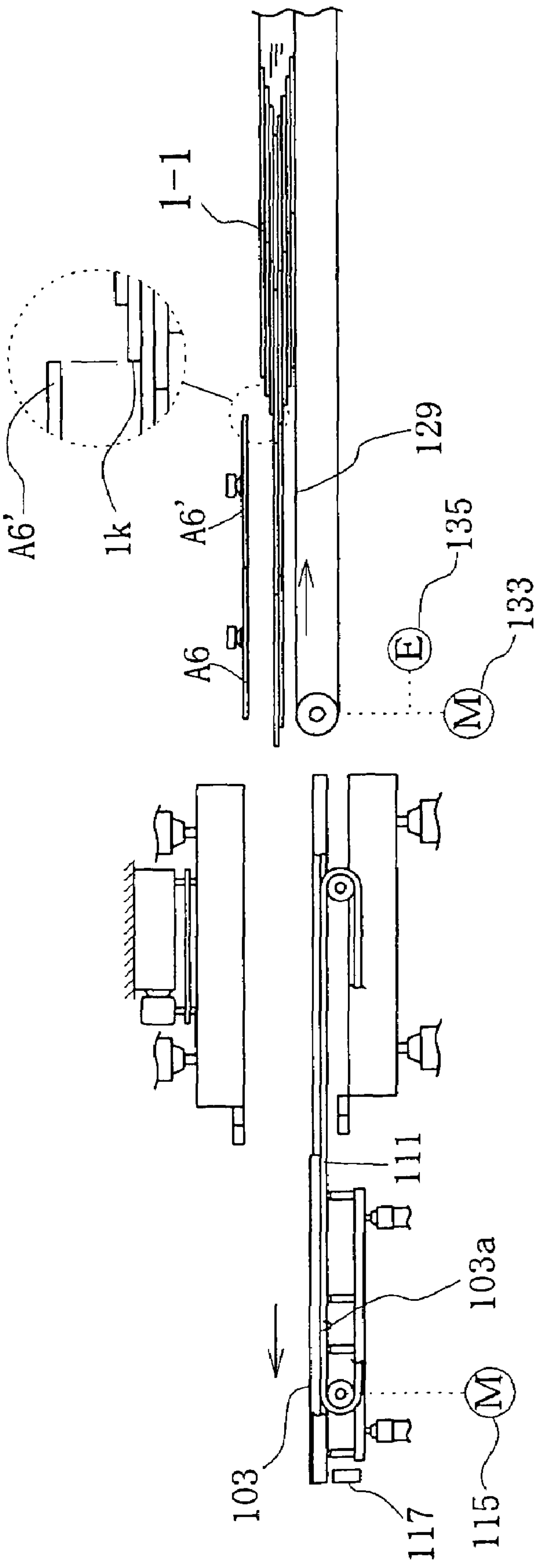

Then, the motor 115 is activated to drive the belts 111 so that the carrier plate 103 engaged with the belts 111 is moved in arrow direction as shown in FIG. 28 until the left end (as seen in FIG. 28) of the carrier plate 103 is detected by the sensor 117. Simultaneously, the motor 133 is also activated to drive the chain conveyer 129 for moving the base material 1-1 in arrow direction to a position where the sixth end face 1*k* of veneer sheet in the sixth layer of the base material 1-1 is substantially in alignment with the adjacent end face of the coated veneer sheet A6' as shown in the enlarged view of FIG. 28.

Subsequently, the motors 65, 65' for the first and second veneer sheet traversing devices are activated. Though the following will describe the movement of the lifting bar 51 and the related operation of the first veneer sheet traversing device with reference to FIGS. 29(*a*) through 29(*d*), the same operation takes place simultaneously for the second veneer sheet traversing device.

Figure 29:
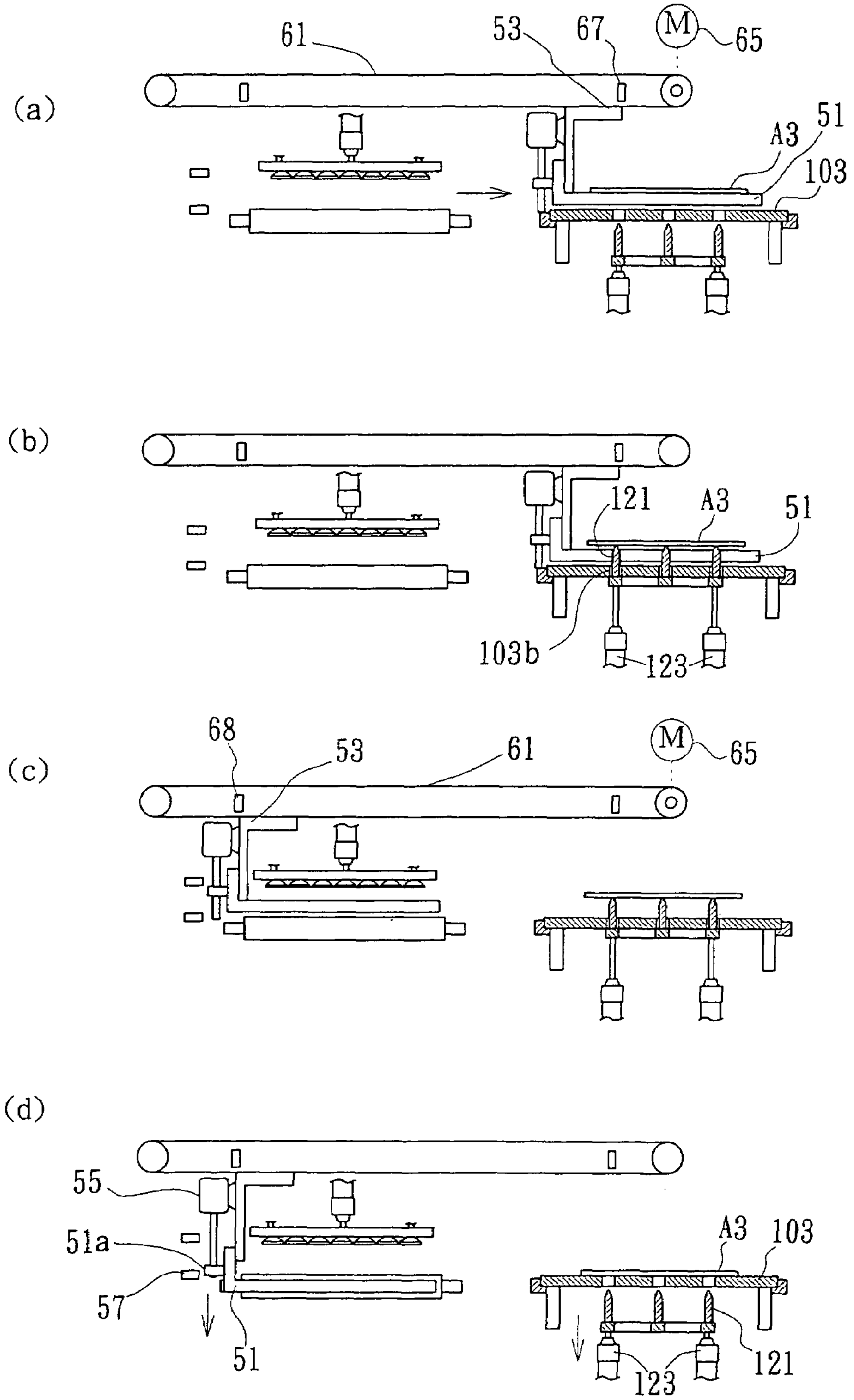
Figure 30:
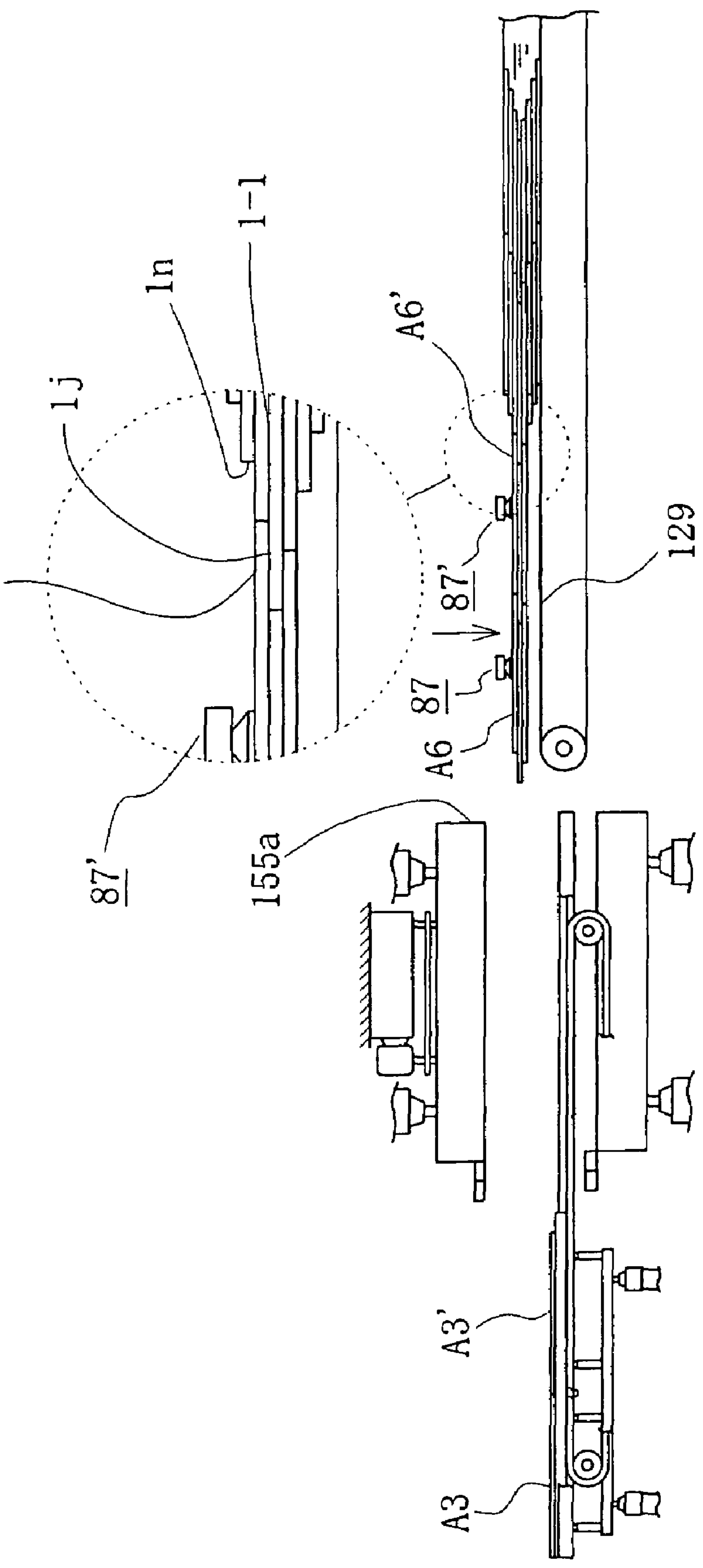

The motor 65 drives the belt 61 to move the support block 53, to which the lifting bar 51 is fixed, rightward as indicated by arrow in FIG. 29(*a*) until the block 53 is detected by the sensor 67, where the lifting bar 51 carrying thereon the veneer sheets A3 is located immediately above the veneer sheet carrier plate 103, as shown in the same drawing. The cylinders 123 are then activated to raise the upstanding rods 121 until they are inserted through the holes 103*b* in the veneer sheet carrier plate 103 so that the veneer sheet A3 is pushed upward by the rods 121 to be clear of the lifting bar 51, as shown in FIG. 29(*b*). The belt 61 is driven by the motor 65 so as to move back the support block 53 until it is detected by the sensor 68, as shown in FIG. 29(*c*). Subsequently, the cylinders 123 are operated to retract their rods 121 so that the veneer sheet A3 is placed onto the carrier plate 103, and lifting bar 51 is lowered by the motor 55 to its original position where the block 51*a* is detected by the sensor 57, as shown in FIG. 29(*d*). As mentioned above, a series of the same steps of operation is performed for the second veneer sheet traversing device so that the coated veneer sheet A3' is placed on the carrier plate 103. As shown in FIG. 30, two veneer sheets A3, A3' placed on the carrier plate 103 are disposed one next the other with the adjacent ends thereof set in facing relation to each other.

Then, the servo motors 93, 93' are activated so as to lower the suction heads 87, 87' as indicated by arrow in FIG. 30 until the coated veneer sheets A6, A6' are positioned where they are brought just into contact with the surfaces of previously laminated veneer sheets A5, A5' and the fifth face 1*j* of veneer sheet in fifth layer of the base material 1-1, as shown in enlarged view of FIG. 30. After the motors 93, 93'are stopped, the suction heads 87, 87' are deactivated by closing their associated shutters (not shown), so that the coated veneer sheet A6, A6' are placed on the base material 1-1.

Figure 31:
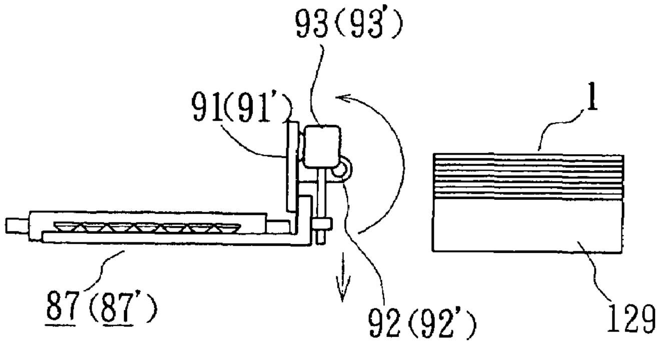
Figure 31:
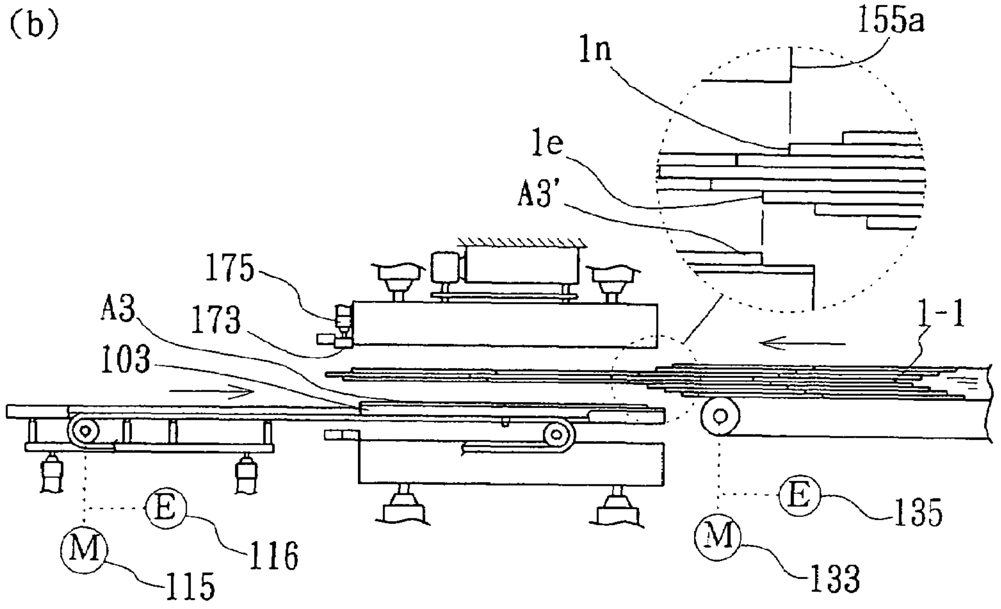
Figure 31:
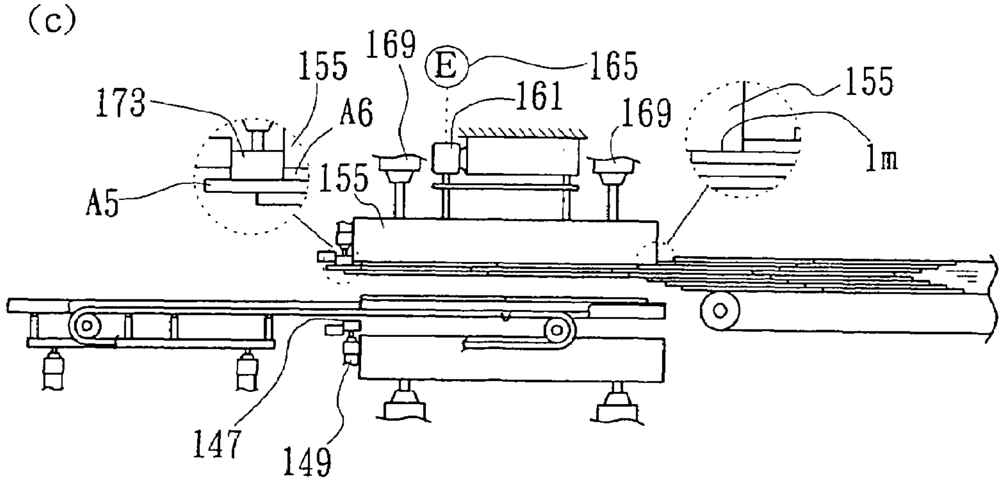

The pivotal shafts 92, 92' are rotated for swinging the motor supports 91, 91'and hence the suction heads 87, 87' for about 180 degrees and then the servo motor 93, 93' are rotated so as to move the suction heads 87, 87' back to their original standby positions, as shown in FIG. 31(*a*)

The servo motor 133 is activated to drive the chain conveyer 129 for moving the base material 1-1 carried thereon to a position where the seventh end face 1*n* of veneer sheet in the seventh layer of the base material 1-1 is substantially in alignment with the adjacent end face 155*a* of the upper heating plate 155, as shown in the enlarged view of FIG. 31(*b*). Subsequently, the servo motor 115 for driving the belt 111 is operated to move the carrier plate 103 in arrow direction of FIG. 31(*b*) until a position is reached where the face of the leading end (or right-hand end as seen in the drawing) of the coated veneer sheet A3' on the carrier plate 103 is substantially in alignment with the third end face 1*e* of veneer sheet in the third layer of the base material 1-1, as shown in the same enlarged view of FIG. 31(*b*).

Then, the cylinders 175 are activated to lower the first auxiliary upper heating plate 173 for about 4 mm, as shown in FIG. 31(*b*).

The electromagnetic valve 171 is opened and the servo motor 161 is activated to lower the upper heating plate 155 until the lower surface of the upper heating plate 155 comes to a position away from the reference position of the base material 1-1 by a distance corresponding to two times the veneer thickness, i.e. to a position where the lower surface of the upper heating plate 155 is moved to the height corresponding to that of the sixth face 1*m* of veneer sheet in the sixth layer of the base material 1-1, as shown in the right enlarged view of in FIG. 31(*c*). The electromagnetic valve 171 is closed after the upper heating plate 155 is positioned and the servo motor 161 is stopped. In the above position of the upper heating plate 155, part of the upper surface of the veneer sheet A5 is held in contact with the first auxiliary upper heating plate 173, as shown in the left enlarged view of FIG. 31(*c*).

Then, the cylinders 149 are activated to raise the first auxiliary lower heating plate 147 for about 4 mm, as shown in FIG. 31(*c*), and the hydraulic cylinders 145, 145 are activated to raise the lower heating plate 143 with the auxiliary lower heating plate 147. By so doing, the carrier plate 103 carrying thereon the veneer sheets A3, A3' are disengaged from the belt 111 and moved upward together with the heating plate 143 until the veneer sheets A3, A3', A6, A6' are pressed to the base material 1-1 at the same pressure of about 1 MPa, as shown in FIGS. 32(*a*) and 32(*b*).

Figure 32:
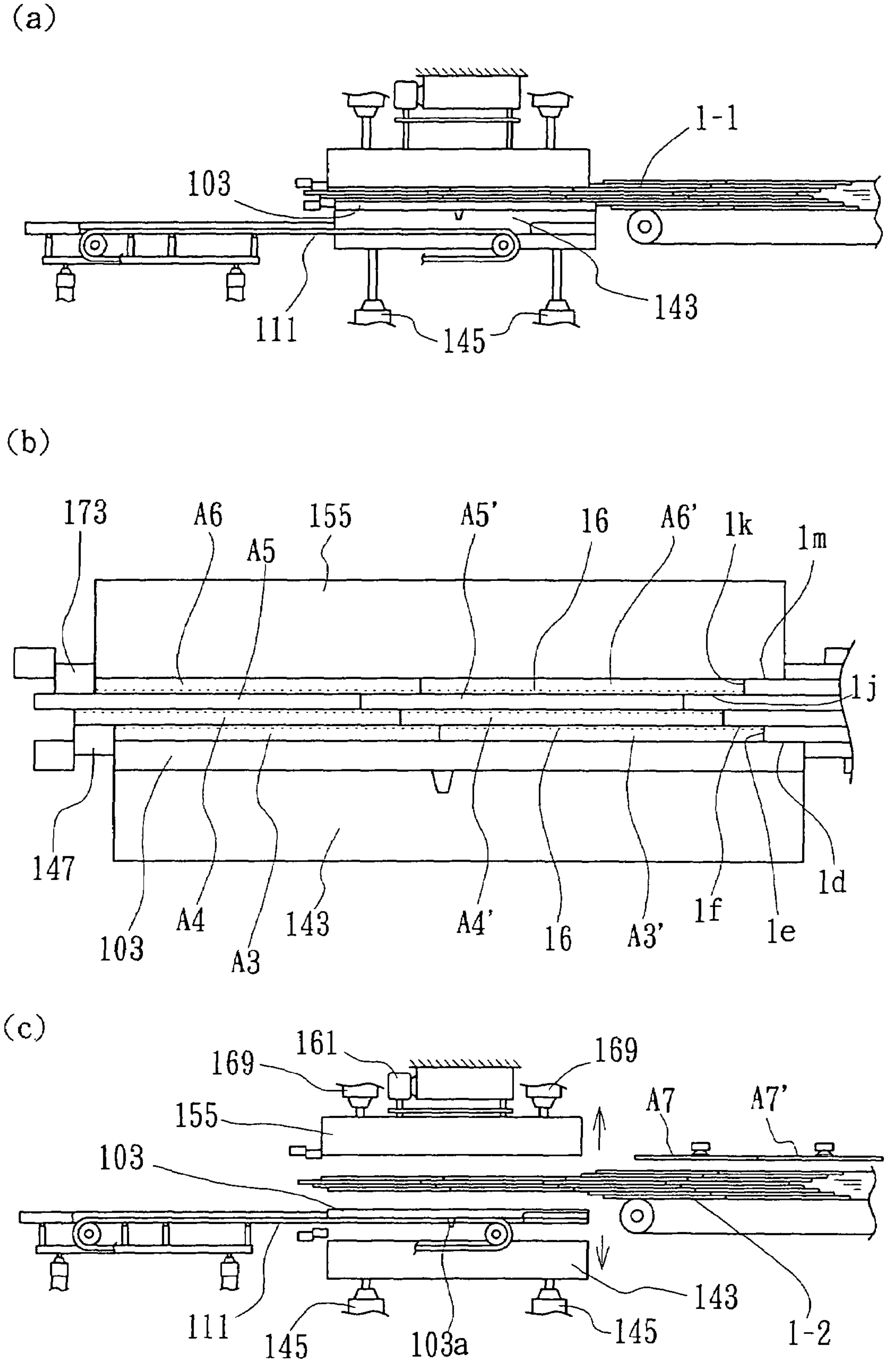

As shown in detail in FIG. 32(*b*), the coated veneer sheet A3' is arranged with its right end in facing relation to the third end face 1*e* of veneer sheet in the third layer of the base material 1-1 and extends over the third face of veneer sheet in the fourth layer and part of the previously laminated veneer sheet A4' of the base material 1-1. Similarly, the veneer sheet A6' is arranged with its right end in facing relation to the sixth end face 1*k* of veneer sheet in the sixth layer of the base material 1-1 and extends over the fifth face 1*j* of veneer sheet in the fifth layer and part of the previously laminated veneer sheet A5' of the base material 1-1. Additionally, during this hot pressing, the entire surface area of the coated veneer sheets A3, A3' is pressed by the lower heating plate 143 and the same entire surface area is supported by the upper heating plate 155. On the other hand, the entire surface area of the coated veneer sheets A6, A6' received pressure form the upper heating plate 155. Major part of the same entire surface area is supported by the lower heating plate 143, while the remaining part thereof which extends beyond the left end face of the lower heating plate 143 is supported by the first auxiliary lower heating plate 147. Hot pressing as shown in FIG. 32(*b*) is continued for about one minute.

During this one-minute hot pressing, two coated veneer sheets A7, A7' are prepared in the same manner as the veneer sheets A6, A6' and placed above the base material 1-1 as shown in FIG. 32(*c*) and two coated veneer sheets A2, A2' are prepared in the same manner as the veneer sheets A3, A3', for example, as shown in FIG. 26(*c*).

As the one-minute hot pressing is over, the control unit C generates a signal which causes the lower and upper heating plates 143, 155 to move to their retracted positions, as shown in FIG. 32(*c*). The carrier plate 103 is lowered with the lower heating plate 143 until it engages with the belts 111. After this hot pressing, the base material 1-1 and the veneer sheets A3, A3', A6, A6' are integrated by gluing although the adhesive is yet to be cured completely. Thus, a new base material which includes the added veneer sheets A3, A3', A6, A6' is formed, which will be referred to by reference numeral 1-2. It is noted that such base material 1-2 is also an in-process LVL board.

Figure 33:
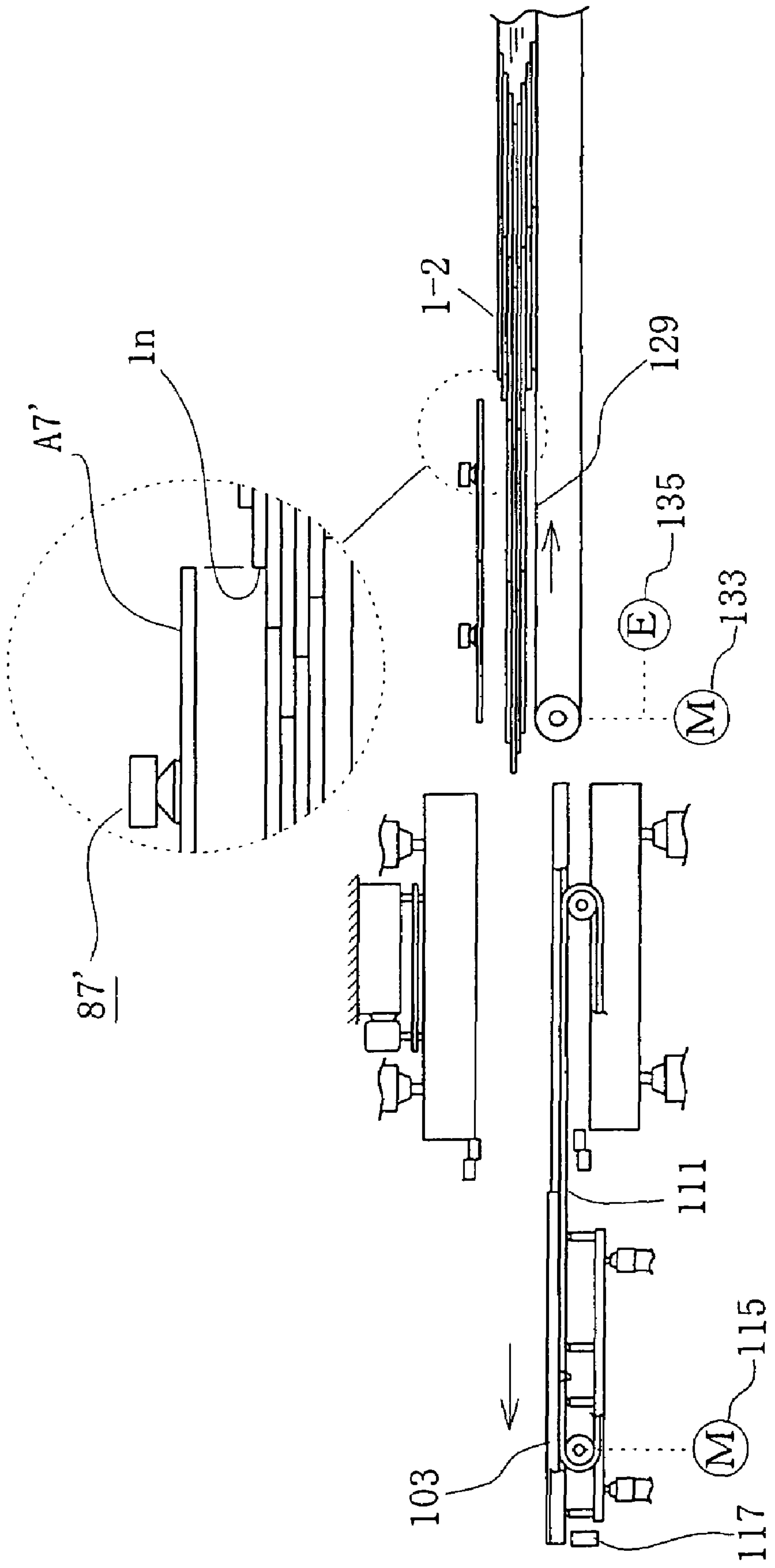

Then, the motor 115 is activated to drive the belt 111 so as to move the carrier plates 103 in arrow direction as shown in FIG. 33 until the left end of the carrier plate 103 is detected by the sensor 117. Simultaneously, the motor 133 is activated to drive the chain conveyer 129 for moving the base material 1-2 to a position where the seventh end face 1n of veneer sheet in the seventh layer of the base material 1-2 is substantially in alignment with the right end face of the coated veneer sheet A7', as shown in enlarged view of FIG. 33.

Figure 34:
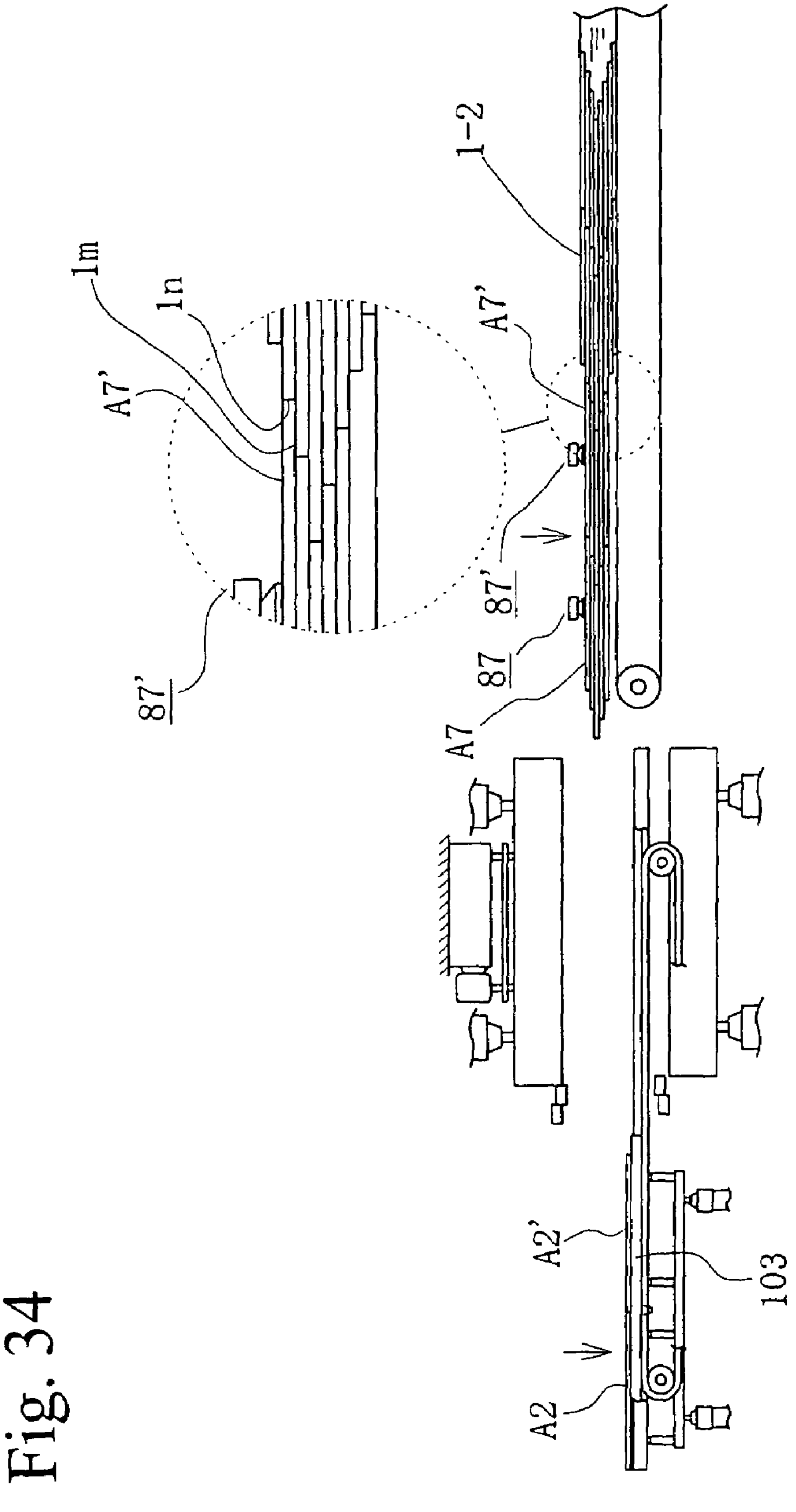

With the base material 1-2 thus positioned, the motors 93, 93' are operated to lower the suction heads 87, 87' as indicated by arrow until the coated veneer sheets A7, A7' are positioned where they are brought just into contact with the surfaces of previously laminated veneer sheets A6, A6' and the sixth face 1*m* of veneer sheet in sixth layer of the base material 1-2, as shown in enlarged view of FIG. 34. After the motors 93, 93' are stopped, the suction heads 87, 87' are deactivated by closing their associated shutters (not shown), so that the coated veneer sheet A7, A7' are placed on the base material 1-2, as shown in FIG. 34.

Figure 35:
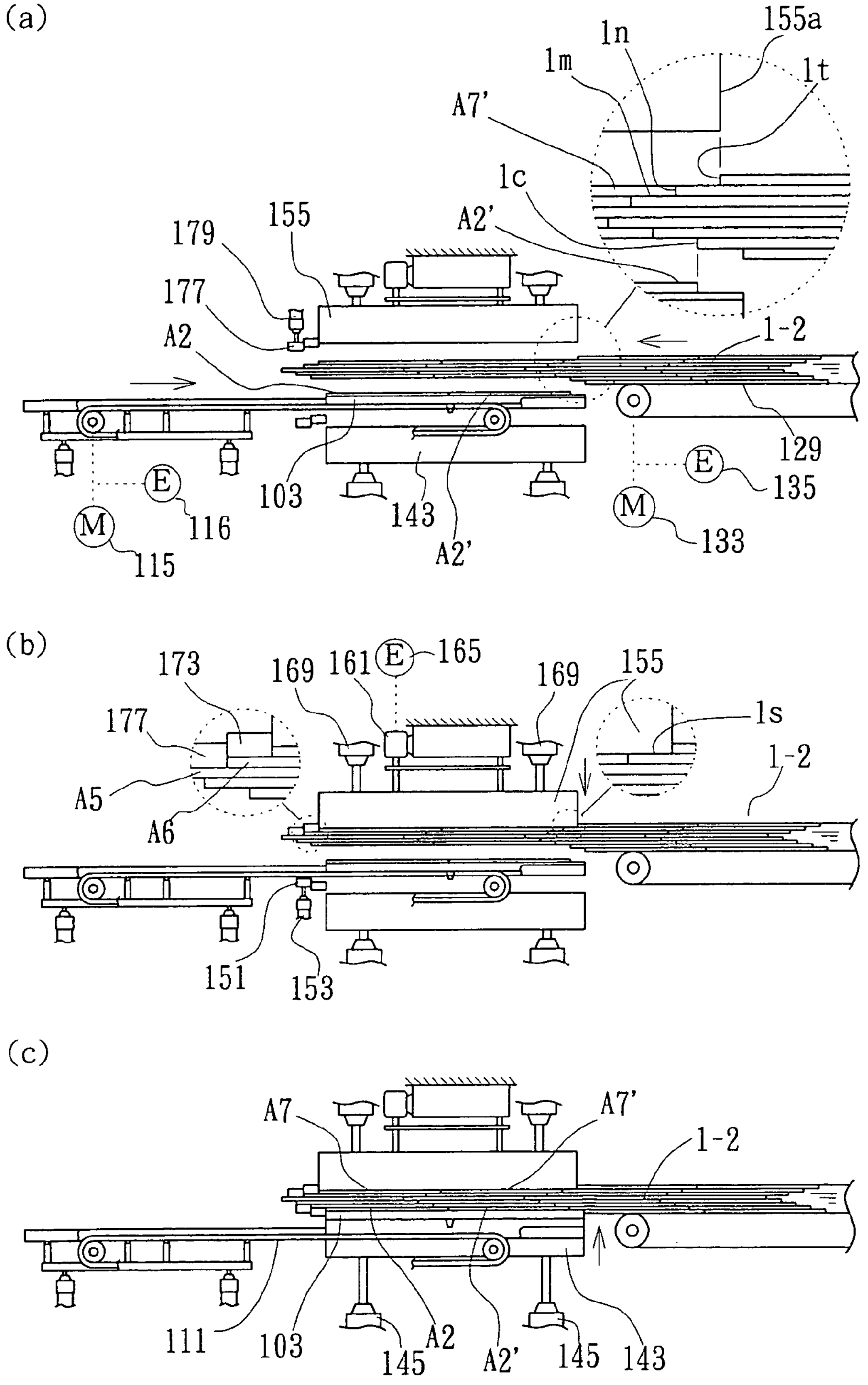

Then moving the chain conveyer 129 by the servo motor 133, the base material 1-2 is moved in arrow direction to a position where the eighth end face of veneer sheet in the eighth layer is substantially in alignment with the adjacent end face 155*a* of the upper heating plate 155, as shown in FIG. 35(*a*). Subsequently, the motor 115 is driven so as to move the carrier plate 103 in arrow direction of FIG. 35(*a*) to a position where the leading end (or right-hand end as seen in the drawing) of the coated veneer sheet A2' on the carrier plate 103 is substantially in alignment with the second end face 1*c* of the base material 1-2 as shown in FIG. 35(*a*).

Then, the cylinders 179 are operated so as to lower the second upper auxiliary heating plate 177 for a distance of about 8 mm, as shown in FIG. 35(*a*).

Subsequently, the electromagnetic valve 171 is opened and then the servo motor 161 is activated so as to lower the upper heating plate 155 until the lower surface of the upper heating plate 155 comes to a position away from the reference position of the base material 1-2 by a distance corresponding to three times as large as the veneer thickness, i.e. to a position where the lower surface of the upper heating plate 155 is moved to the height corresponding to that of the seventh face is of the seventh layer of veneer sheet of the base material 1-2, as shown in FIG. 35(*b*).

The electromagnetic valve 171 is closed after the upper heating plate 155 is positioned and the servo motor 161 is stopped. With the upper heating plate 155 thus positioned, the first and second upper auxiliary heating plates 173 and 177 are placed in contact engagement with the upper surfaces of the coated veneer sheets A6 and A5, respectively, as shown in an enlarged view of FIG. 35(*b*).

The cylinders 153 are also operated so as to raise the second lower auxiliary heating plate 151 for a distance of about 8 mm, as shown in FIG. 35(*b*). This is followed by operation of the cylinders 145 to raise the lower heating plate 143 with the carrier plate 103 for hot pressing the veneer sheets A2, A2', A7, A7' to the base material 1-2, as shown in FIG. 35(*c*).

Figure 36:
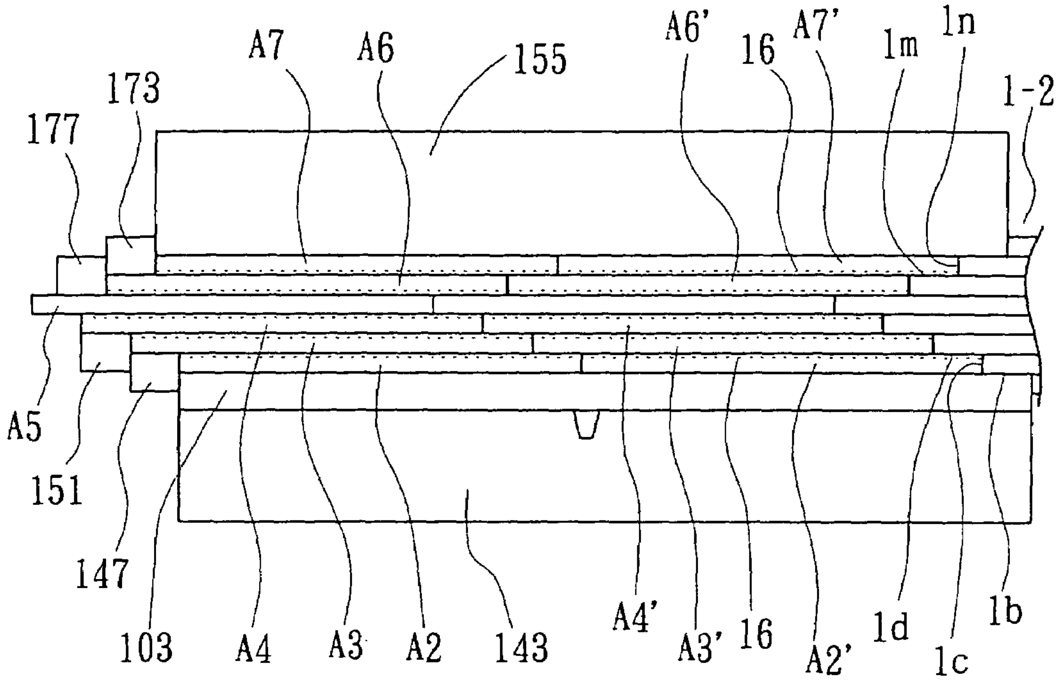
Figure 36:
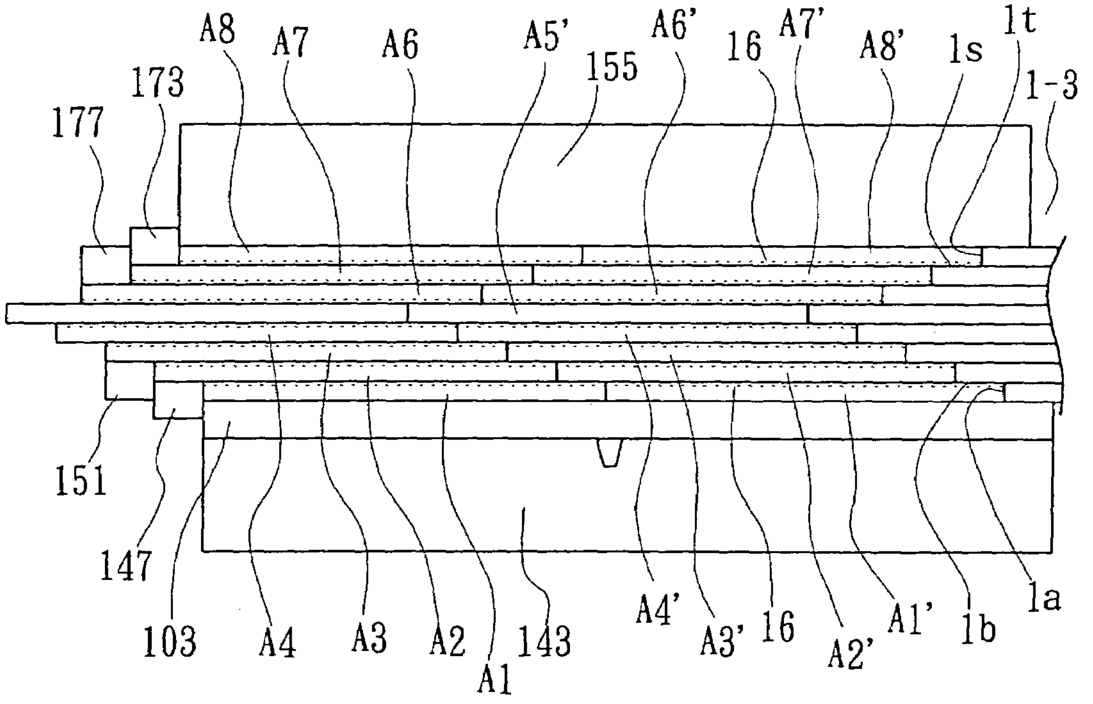

As shown in FIG. 36(*a*), the coated veneer sheet A2' is pressed with its right end (as seen in the drawing) in facing relation to the second end face 1*c* of veneer sheet in the second layer of the base material 1-2 and extends over the second face 1*d* of veneer sheet in the third layer of the base material 1-2 and part of the previously laminated veneer sheet A3'. Similarly, the coated veneer sheet A7' is pressed with its right end 1*n* facing relation to the seventh end face in of veneer sheet in the seventh layer of the base material 1-2 and extends over the sixth face 1*m* of veneer sheet in the sixth layer of the base material 1-2 and part of the previously laminated veneer sheet A6'. Additionally, during this hot pressing, the entire surface area of the coated veneer sheets A2, A2' is pressed by the lower heating plate 143 and the same entire surface area is supported by the upper heating plate 155. On the other hand, the entire surface area of the coated veneer sheets A7, A7' is pressed by the upper heating plate 155. Major part of the same entire surface area is supported by the lower heating plate 143, while the remaining part thereof which extends beyond the left end face of the lower heating plate 143 is supported by the first auxiliary lower heating plate 147. Furthermore, part of the contact area between the veneer sheets A3, A4 which is not covered by the lower heating pate 143 and was hot pressed only for one minute in the previous hot pressing operation receives heat and pressure from the first auxiliary lower heating plate 147 while the same area is supported by the upper heating plate 155 and the first auxiliary upper heating plate 173. The same is true to part of the contact area between the veneer sheets A7, A6 which is not covered by the upper heating plate 155. This part of contact area receives heat and pressure from the first auxiliary upper heating plate 173 and supported by the first and second auxiliary lower heating plates 147, 151. Thus, curing of adhesive in these contact areas is promoted toward complete curing. Hot pressing of FIG. 36(*a*) is continued for about one minute under the same pressure of about 1 MPa.

Adhesive coated on the veneer sheets A2, A2' begins to be cured by the heat transmitted from the lower heating plate 143 through the carrier plate 103. Additionally, heat from the lower heating plate 143 is also transmitted to the veneer sheets A3, A3' through the veneer sheets A2, A2' or directly by the first lower auxiliary heating plate 147, so that curing of the adhesive on the veneer sheets A3, A3'is furthered during this hot pressing operation. Similarly, adhesive coated on the veneer sheets A7, A7' begins to be cured by the heat transmitted from the upper heating plate 155, and heat transmitted from the same heating plate 155 to the veneer sheet A6, A6' through the veneer sheets A7, A7' or directly by the first upper auxiliary heating plate 173 helps to promote curing the adhesive on the veneer sheets A6, A6'.

After the pressing, the base material 1-2 and the veneer sheets A2, A2', A7, A7' are integrated by gluing although the adhesive is yet to be cured completely. A new base material or another in-process LVL board which includes the added veneer sheets A2, A2', A7, A7' is formed, which will be referred to by reference numeral 1-3.

Though detailed description is omitted, during the above one minute of hot pressing operation, two sets of coated veneer sheets A8, A8' and A1, A1' are prepared in the same manner as the veneer sheets A6, A6' and the veneer sheets A3, A3', respectively.

After one minute of the above hot pressing is over, a series of operation steps is performed for laying and hot pressing two sets of veneer sheets A1, A1' and A8, A8'. Since the manners in which such operations are performed are substantially the same as in the case of veneer sheets A2, A2' and A7, A7', detailed description therefor will be omitted. It is noted, however, that this hot pressing is continued for about three minutes under the same pressure of about 1 Mpa.

During this hot pressing as shown in FIG. 36(*b*), the coated veneer sheet Al' is pressed with its right end (as seen in the drawing) in facing relation to the first end face 1*a* of veneer sheet in the first layer of the base material 1-3 and extends over the first face 1*b* of veneer sheet in the second layer of the base material 1-3 and part of the previously laminated veneer sheet A2'. Similarly, the coated veneer sheet A8' has its right end disposed in facing relation to the eighth end face 1*t* of veneer sheet in the eighth layer of the base material 1-3 and extends over the seventh face 1*s* of veneer sheet in the seventh layer of the base material 1-3 and part of the previously laminated veneer sheet A7'. Additionally, during this hot pressing, the entire surface area of the coated veneer sheets A1, A1' is pressed by the lower heating plate 143 and the same entire surface area is supported by the upper heating plate 155. On the other hand, the entire surface area of the coated veneer sheets A8, A8' is pressed by the upper heating plate 155. Major part of the same entire surface area is supported by the lower heating plate 143, while the remaining part thereof which extends beyond the left end face of the lower heating plate 143 is supported by the first auxiliary lower heating plate 147. As will be understood readily from comparison with the illustration of FIG. 36(*a*), the auxiliary heating plates work effectively also in this case by providing heat and pressure to those parts of contact areas between the veneer sheets A2, A3 and A6, A7 which are not covered by the lower and upper hating plates 143, 155, respectively, and heated only for one minute during the previous hot pressing operation. Furthermore, parts of the contact areas between the veneer sheets A3, A4 and A6, A7 receive direct heat from the second auxiliary heating plates 151, 177. Hot pressing of FIG. 36(*b*) is continued for about three minutes under the same pressure of about 1 MPa.

After three minutes of the above hot pressing operation is over, the base material 1-3 and the veneer sheets A1, A1', A8, A8' are integrated by gluing although the adhesive is yet to be cured completely. Thus, a new base material 1', or still another in-process LVL board, is made, as shown in FIG. 37(*a*), whose end portion is shaped in substantially the same form of flights of steps as the initial base material 1 shown in FIG. 11.

Figure 37:
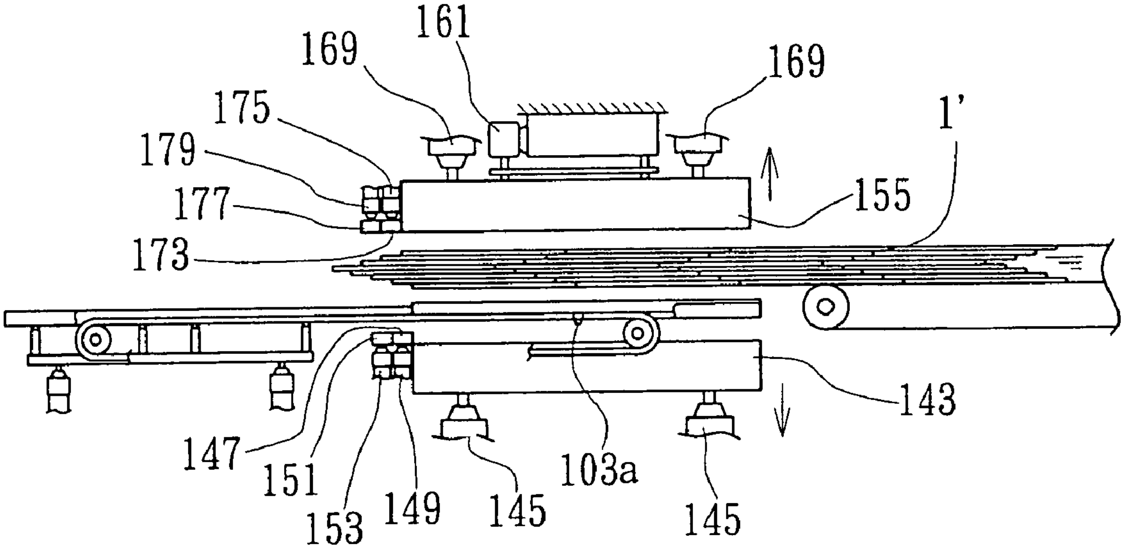
Figure 37:
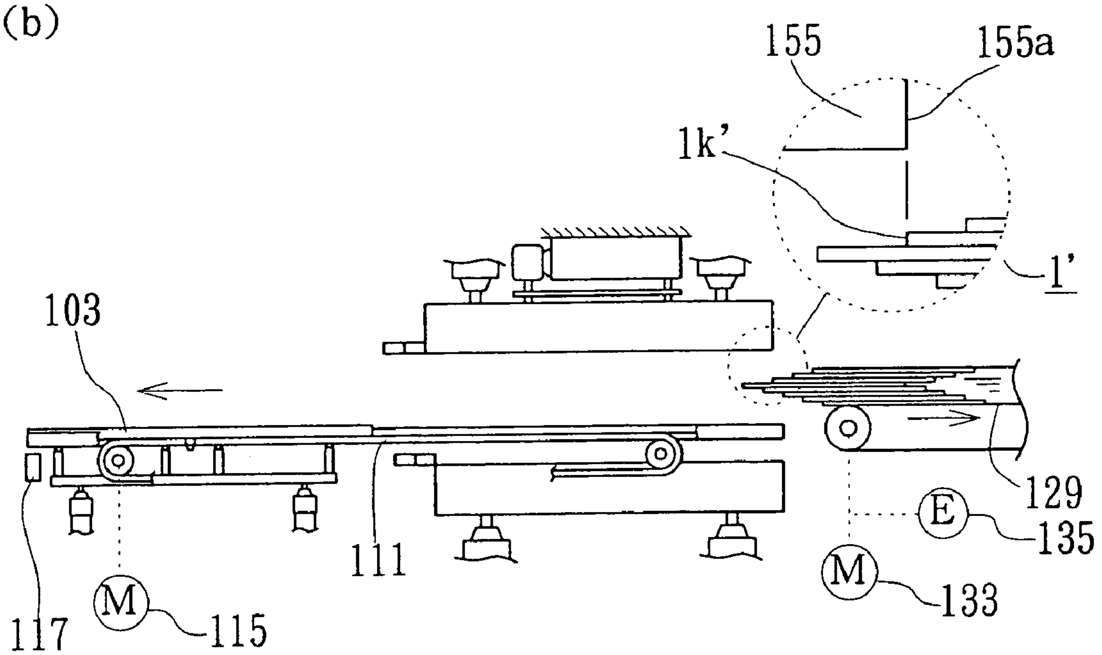

The control unit C then generates signals to cause the upper and lower heating plates 155, 143, the first and second upper auxiliary heating plates 173, 177 and the first and second lower auxiliary heating plates 147, 151 to retract to their original standby positions, respectively, as shown in FIG. 37(*a*). Subsequently, the motor 115 is operated to drive the belts 111 so as to move the carrier plate 103 in arrow direction of FIG. 37(*b*) back to its original standby position. Simultaneously, the motor 133 is operated thereby to move the chain conveyer 129 in arrow direction until the base material 1' carried the chain conveyer 129 comes to position where the end face 1*k*' of veneer sheet A6 in the sixth layer of the base material 1' is substantially in alignment with the end face 155*a* of the upper heating plate 155, as shown in the enlarged view of FIG. 37(*b*).

Thereafter, a series of steps of operation as described with reference to FIGS. 12 through 37 is repeated as many times as required to produce the desired length of eight-layered LVL board.

In the above description of the preferred embodiment, a laminated veneer assembly having eight layers of veneer sheets each having a thickness of about 4 mm, shown in FIG. 11, is used as the initial base material 1 from one end of which a continuous length of LVL board is to be made. If the veneer sheet thickness or the number of layers is changed, the aforementioned reference position with respect to which the suction heads 87, 87' and the upper heating plate 155 are positioned will be changed. In such a case, the reference position may be established in the same manner as in the above-described preferred embodiment. That is, the reference position may be set at the mid-position of a new initial base material carried on the chain conveyer 129 as measured across base material thickness. Setting of a new reference position becomes necessary also in case when the number of layers is changed. In such case, the length of time for hot pressing may be set longer for the first and last hot pressing steps (or FIG. 20(*c*) and FIG. 36(*b*) in the preferred embodiment) than others similar steps in each complete cycle of operation which covers the steps described with reference to FIGS. 12 through 37 in the preferred illustrated embodiment.

While the invention has been described and illustrated with reference to the specific embodiment, it is to be understood that the invention can be practiced in other various changes and modifications without departing from the spirit or scope of the invention, as exemplified below.

In the above-described preferred embodiment of the hot press, the upper heating plate 155 is moved by a servo motor 161 to a desired position where the heating plate 155 is held by hydraulic cylinders 169 and then the lower heating cylinder 143 is moved toward the upper heating plate 155 for pressing a veneer sheet therebetween at a predetermined pressure. According to the present invention, however, the upper and lower heating plates arrangement may be reversed. That is, the heating plate 155 and its associated parts and devices such as servo motor 161, rotary encoder 165, drive chain 163, hydraulic cylinders 169 and electromagnetic valve 171 are used as the lower heating plate assembly, while the heating plate 143 and hydraulic cylinders 145 is used as the upper heating plate assembly, respectively. In such modified embodiment, the lower heating plate 143 is elevated by screw mechanism driven by a servo motor until the top surface of the carrier plate 103 which is then moved upward by the lower heating plate 143 is spaced away from the surface of the glued laminated wood board to which veneer sheet is to be glued, by a distance corresponding to the thickness of veneer sheet. Then, the electromagnetic valve 171 for the lower heating plate 143 is closed and the upper heating plate 155 is moved toward the lower heating plate 143 by hydraulic cylinders until veneer sheets are pressed under the desired pressure.

In the preferred embodiment, two veneer sheets are prepared as one set for lamination which are disposed one next the other with the adjacent ends thereof set in facing relation to each other, as shown, e.g., in FIG. 2. However, the number of veneer sheets of one set to be prepared may be more than two. Alternatively, a single veneer sheet may be provided as a set of veneer sheet.

In the above-described preferred embodiment, a base material or an in-process LVL board is moved back and forth horizontally by the chain conveyer 129 for each laminating operation. It is noted that the present invention may be practiced without moving the base material.

The following will describe a modified embodiment of the present invention wherein a number of veneer sheets having a predetermined length, width and thickness are prepared and glued together into an LVL board of a desired thickness. According to this modified embodiment, firstly two veneer sheets are glued together by using a pair of upper and lower heating plates thereby to make a first base material, then second two veneer sheets are added by gluing to the opposite upper and lower sides of the first base material thereby to make a second base material, and still further pair of veneer sheets are laminated successively until an LVL board of a desired thickness is produced.

In such a case, each base material or an in-process LVL board is held at its opposite lateral sides by holders having at the ends thereof a plurality of tooth-like projections and movable by cylinders toward each other for engagement with the lateral sides of the base material. With the base material thus held, veneer sheets are supplied and laid on opposite upper and lower surfaces of the base material and then the upper and lower heating plates are moved toward each other for pressing in a manner similar to that in the above-described preferred embodiment. After the base material and the added veneer sheets are pressed by the heating plates for a predetermined length of time, the holders are disengaged from the base material.

Figure 38:
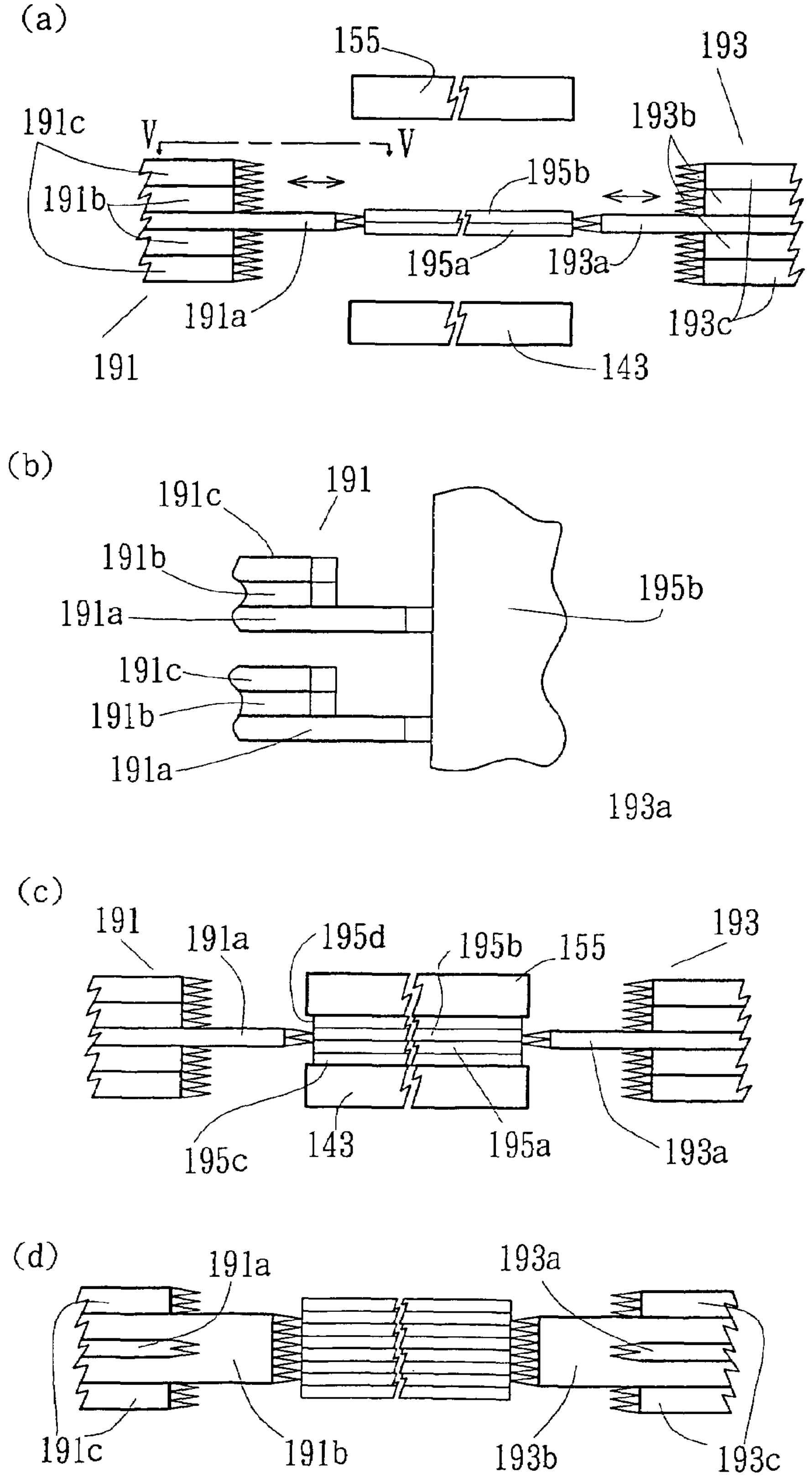
FIGS. 38(*a*) through 38(*d*) are illustrative views showing a modified embodiment of method and apparatus according to the present invention.

Specific embodiment will be described with reference to FIGS. 38(*a*) through 38(*d*). Referring to FIG. 38(*a*) showing the upper and lower heating plates 155, 143 of a hot press as seen from one end thereof and also to FIG. 38(*b*) which is a plan view as seen from line V-V of FIG. 38(*a*), reference numerals 191, 193 designate plural sets of holder units, each unit including three toothed holders 191*a*, 191*b*, 191*c* or 193*a*, 193*b*, 193*c*. A plurality of the holder units 191 is arranged along and adjacent to one side of the heating plates 143, 155 and another plurality of the holder units 193 are disposed along and adjacent to the other side of the heating plates.

Referring to the holder unit 191, it includes three holders 191*a*, 191*b*, 191*c* each having at the distal end thereof a plurality of tooth-like projections. As seen from FIG. 38(*a*), the width of the holder 191*a* as measured vertically is the smallest, or small enough to hold two veneer sheets 195*a*, 195*b* which are glued together at an initial stage of manufacturing of the LVL board, as will be described more in detail later. The holder 191*c* has the largest width and the holder 191*b* has an in-between width. Each of the toothed holders 191*a*, 191*b*, 191*c* are reciprocally movable independently as indicated by double-headed arrow.

Three toothed holders 191*a*, 191*b*, 191*c* are arranged such that their horizontal centers coincide with the center of a base material across the thickness thereof which is increased with addition of veneer sheets 195*c*, 195*d* and so forth. The center of the base material in the case of the present embodiment lies in the mating surface between the two veneer sheets 195*a*, 195*b* and such center is used as reference against which the upper heating plate is positioned.

As apparent from the drawings, the holder units 193 which are disposed on the opposite side of the heating plates 155, 143 are of substantially the same structure and arrangement as the holder units 191. Though the drive and control mechanisms are not shown in the drawings, the upper and lower heating plates 155, 143 are moved up and down by the same mechanism and in the same manner as in the preferred embodiment.

The following will describe the operation of the apparatus thus constructed.

Firstly, with the holder units 191, 193 retracted to their standby position (not shown), two veneer sheets 195*a*, 195*b* are laid one on the other with thermosetting adhesive interposed therebetween are placed on the upper pressing surface of the lower heating plate 143 and the hot press is operated to move the upper and lower heating plates 155, 143 toward each other thereby to press the two veneer sheets 195*a*, 195*b* so that they are glued together. Specifically, the upper heating plate 155 is moved downward to a position where the lower pressing surface of the upper heating plate 155 is spaced from the reference position at the horizontal center of two veneer sheets 195*a*, 195*b* by a distance corresponding to the thickness of veneer sheet. With the upper heating place 155 thus positioned, the lower heating plate 143 is moved upward until the veneer sheets 195*a*, 195*b* are pressed under a predetermined pressure and such pressing is continued for a predetermined length of time. At an appropriate time while the veneer sheets 195*a*, 195*b* are being pressed by the heating plates 155, 143, the holders 191*a* and 193*a* are extended into the spaces between the upper and lower heating plates 155, 143 for engagement with the opposite sides of the veneer sheets 195*a*,

195*b*. With the veneer sheets 195*a*, 195*b* thus held, firstly the lower heating plate 143 is lowered and then the upper heating plates 155 is raised for movement to their standby positions, as shown in FIG. 38(*a*).

Subsequently, two veneer sheets are supplied by veneer sheet supply device (not shown). Specifically, a veneer sheet 195*d* having its lower surface coated with thermosetting adhesive is laid on the upper surface of the veneer sheet 195*b* and another veneer sheet 195*c* having its upper surface coated with thermosetting adhesive is laid on the lower heating plate 143. Then the upper heating plate 155 is moved downward to a position where its lower pressing surface is spaced from the reference center by a distance corresponding to twice the thickness of veneer sheet so that the lower surface of the upper heating plate 155 is just in contact with the upper surface of the veneer sheet 195*c*. Then, the lower heating plate 143 is moved toward the upper heating plate 155 until four veneer sheets 195*a*, 195*b*, 195*c*, 195*d* are pressed, as shown in FIG. 38(*c*), under a predetermined pressure. Though FIG. 38(*c*) shows the holders 191*a*, 193*a* in engagement with an in-process LVL board, the holders 191*a*, 193*a* are retracted at the beginning of this pressing so that such holders provides no resistance or disturbance to the pressing.

After the pressing is done for a predetermined length of time, the holders 191*a*, 193*a* are extended again into engagement with the in-process LVL board thereby to hold the board, as shown in FIG. 38(*c*). The upper and lower heating plates 155, 143 are moved away from each other for retraction to their standby positions as shown in FIG. 38(*a*).

Thus, steps including (1) placement of new veneer sheets having thermosetting adhesive coated on one surfaces thereof, i.e., one veneer sheet on an in-process LVL board held by the holders and the other veneer sheet on the lower heating plate 143; (2) lowering of the upper heating plate 155 to a position where its lower pressing surface is spaced away from the above reference center by a distance corresponding to the total thickness of veneer sheets then present above the reference center; (3) raising the lower heating plate 143 for pressing of the veneer sheets to the in-process LVL board under a desire pressure; (4) retracting the holders from the in-process LVL board; (5) extending the holders again into engagement with the LVL board after elapse of a predetermined length of time of pressing; and (6) moving the upper and lower heating plates 155, 143 away from each other to their standby positions are repeated as many times as required for making an LVL board with the desired thickness.

As the thickness of the in-process LVL board grows, holders of a larger size, or toothed holders 191*b*, 193*b* or 191*c*, 193*c*, may be selected, as exemplified in FIG. 38(*d*) in which the toothed holders 191*b*, 193*b* are selected for use. Depending on the thickness of LVL board to be made, toothed holders of still larger size may be prepared.

Figure 39:
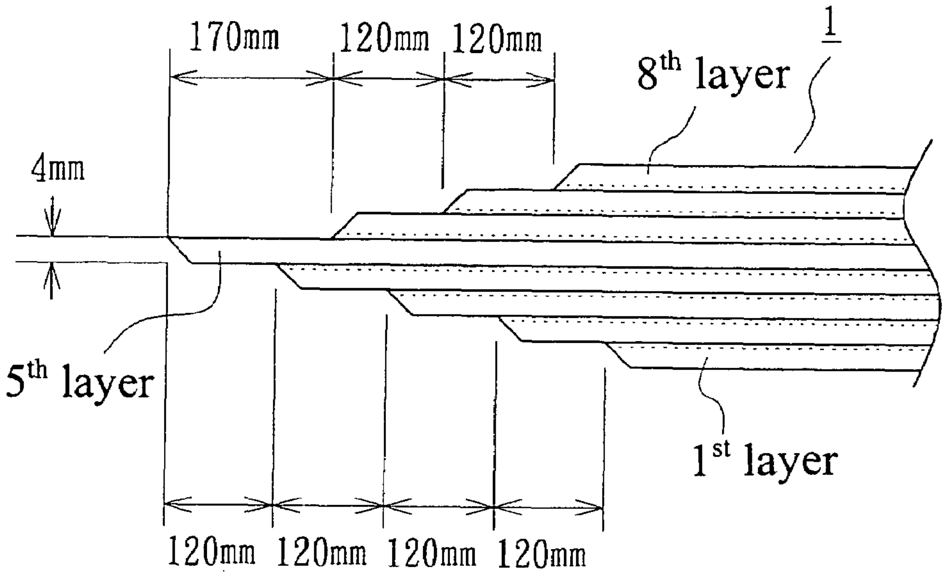
FIGS. 39(*a*) and 39(*b*) are schematic illustrative views showing a modified initial base material and a process of pressing veneer sheets for manufacturing LVL from the modified base material, respectively.
Figure 39:
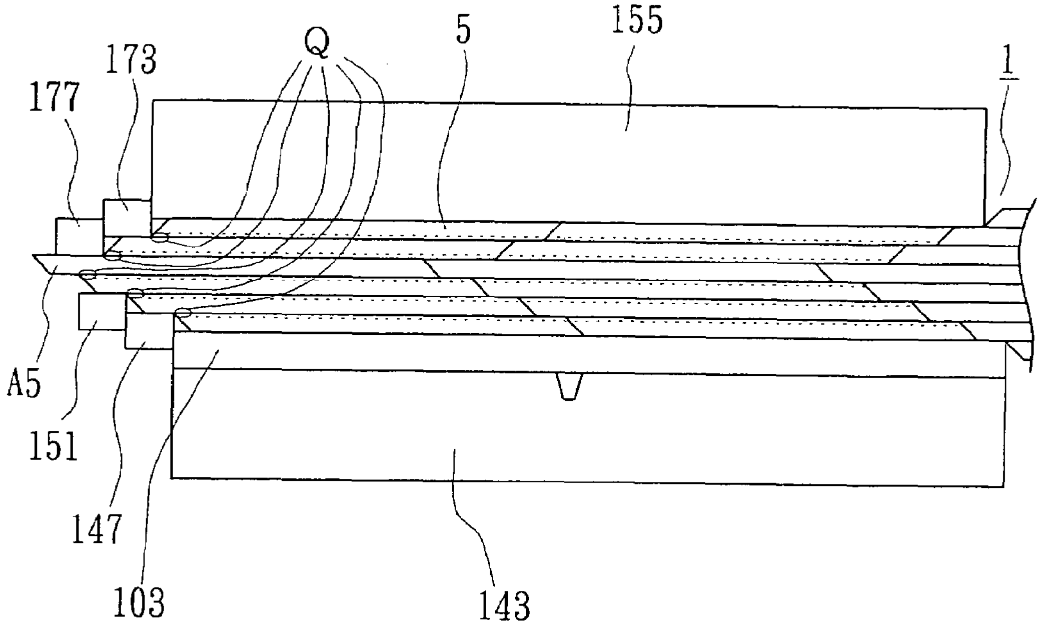

FIG. 39(*a*) shows an alternative form of initial laminated veneer assembly 1 wherein veneer sheets in the first to fifth layers have one ends thereof scarf-cut or beveled at a predetermined angle with the beveled surfaces facing downward, while veneer sheets in the sixth to eighth layers have one ends thereof beveled at the same angle in opposite direction so that the beveled surfaces thereof face upward. As shown in FIG. 39(*b*), veneer sheets for lamination to such base material have the opposite ends thereof beveled at the same angle in the same direction so that the opposite beveled surfaces of each veneer sheet extend in parallel to each other. The veneer sheets are laminated in such a way that a lap joint is formed between any two adjacent veneer sheets in the same layer, as clearly shown in FIG. 39(*b*). Though the portions of veneer sheet ends which are depicted by Q receive only reduced pressure during hot pressing, they will not influence the general strength of the resulting LVL board because the area of such portions is small.

In the preferred embodiment and the modified embodiment of FIG. 39(*a*), one end of the eight-layered initial is shaped in the form of two flights of steps, one flight of steps formed by the fifth through eighth veneer sheets and facing upward and the other flight of steps formed by the first through fifth veneer sheet and facing downward. The present invention does not limit the initial base material to such a form, but an initial base material may be provided, for example, by using veneer sheets only in the first to fifth layers of the base material of FIG. 11 so that end of the resulting base material has a form of a single flight of steps facing downward. In case of using such initial base material, veneer sheets A4, A4', A5, A5' are laminated substantially in the same manner as in the step of FIG. 20(*c*). In the step corresponding to that of FIG. 32(*b*), only veneer sheets A3, A3' are laminated. In the steps corresponding to those of FIGS. 36(*a*) and 36(*b*), only veneer sheets A2, A2' and A1, A1' are glued to the base material, respectively.

What is claimed is:

1. Apparatus of pressing for use in manufacturing glued laminated wood which is made of a number of wood sheets having a predetermined length, width and thickness, and laminated together by hot pressing with a thermosetting adhesive in such a way that a multiple-layered board of the glued laminated wood is made, comprising:

a pair of heating plates disposed one above the other and having pressing surfaces facing each other and both of which are vertically movable toward and away from each other;

a wood sheet supply device arranged to supply a wood sheet having one surface thereof coated with the thermosetting adhesive to each of upper and lower sides of an in-process board of the glued laminated wood for lamination of the wood sheet to said each of the upper and lower sides of said in-process glued laminated wood board;

a board carrier arranged to carry thereon said in-process glued laminated wood board and reciprocatingly moving said in-process glued laminated wood board horizontally between a first position where at least part of said in-process glued laminated wood board having said supplied wood sheets thereon are placed between said pair of heating plates and a second position where said at least part of the in-process glued laminated wood board is placed horizontally away from said first position;

a control which is arranged to control the operation of said paired heating plates, wood supply device and board carrier in such a way that a wood sheet having one surface thereof coated with the thermosetting adhesive is supplied to one side of the in-process glued laminated wood board which one side is adapted to face one heating plate of said paired heating plates and said in-process glued laminated wood board is moved by said board carrier to said first position at latest before said one heating plate is vertically moved toward the other heating plate to a pressing position where the distance between the pressing surface of said one heating plate and the surface coated with the thermosetting adhesive of the wood sheet supplied to said one side of the in-process glued laminated wood board substantially corresponds to the thickness of the respective wood sheet and also that, after said one pressing plate has vertically moved to said heating position, another wood sheet having one surface thereof coated with the thermosetting adhesive is supplied to the other side of the in-process glued laminated wood board at latest before said other heating plate is vertically moved toward said one heating plate until the wood sheets supplied to the opposite sides of the in-process glued laminated wood board are pressed thereto under a predetermined pressure, and the wood sheets are kept pressed under said predetermined pressure for a predetermined length of time.

2. Apparatus of pressing for use in manufacturing glued laminated wood which is made of a number of wood sheets having a predetermined length, width and thickness, and laminated together by hot pressing with a thermosetting adhesive in such a way that a multiple-layered board of the glued laminated wood is made, comprising:

a pair of heating plates disposed one above the other and having pressing surfaces facing each other and both of which are vertically movable toward and away from each other;

a wood sheet supply device arranged to supply a wood sheet having one surface thereof coated with the thermosetting adhesive to each of upper and lower sides of an in-process board of the glued laminated wood for lamination of the wood sheet to said each of the upper and lower sides of said in-process glued laminated wood board;

a control which is arranged to control the operation of said paired heating plates and wood supply device in such a way that a wood sheet having one surface thereof coated with the thermosetting adhesive is supplied to one side of the in-process glued laminated wood board which one side is adapted to face one heating plate of said paired heating plates at latest before said one heating plate is vertically moved toward the other heating plate to a pressing position where the distance between the pressing surface of said one heating plate and the surface coated with the thermosetting adhesive of the wood sheet supplied to said one side of the in-process glued laminated wood board substantially corresponds to the thickness of the respective wood sheet and also that, after said one pressing plate has vertically moved to said heating position, another wood sheet having one surface thereof coated with the thermosetting adhesive is supplied to the other side of the in-process glued laminated wood board at latest before said other heating plate is vertically moved toward said one heating plate until the wood sheets supplied to the opposite sides of the in-process glued laminated wood board are pressed thereto under a predetermined pressure, and the wood sheets are kept pressed under said predetermined pressure for a predetermined length of time.

3. Apparatus according to claim 1, wherein said control is arranged to control the operation of said paired heating plates and the board carrier in such a way that, after elapse of said predetermined length of time, said heating plates are vertically moved away from each other and then said board carrier carrying thereon the in-process glued laminated wood board having the veneer sheets laminated thereto is moved to said second position.

4. Apparatus of pressing for use in manufacturing glued laminated wood which is made of a number of wood sheets having a predetermined length, width and thickness and laminated together by hot pressing with a thermosetting adhesive into the form of a multiple-layered board of the glued laminated wood in such a way that at least one first wood sheet having on one surface thereof coated with the thermosetting adhesive and laid on each of opposite upper and lower sides of a first base material, form which said multiple-layered board of the glued laminated wood is to be made, are pressed for gluing to the first base material thereby to form a second base material, then at least one second wood sheet having on one surface coated with the thermosetting adhesive and laid on each of opposite upper and lower sides of the second base material are pressed for gluing to the second base material thereby to form a third base material and, pressing of further wood sheet having on one surface coated with the thermosetting adhesive and laid on each of opposite upper and lower sides of a base material formed during the previous pressing is performed repeatedly until an N-layered board of the glued laminated wood is formed, wherein "N" represents an integer, comprising:

a pair of heating plates disposed one above the other and having pressing surfaces facing each other and both of which are vertically movable toward and away from each other;

a wood sheet supply device arranged to supply a wood sheet having one surface thereof coated with the thermosetting adhesive to each of upper and lower sides of a base material for lamination of the wood sheet to said each of the upper and lower sides of the base material;

a base material carrier arranged to carry thereon a base material and reciprocatingly moving the base material horizontally between a first position where at least part of said base material having the supplied wood sheets thereon are placed between said pair of heating plates and a second position where said at least part of the base material is placed horizontally away from said first position; and a control which is arranged to control the operation of said paired heating plates, wood supply device and base material carrier in such a way that (1) one of said paired heating plates is vertically moved during each cycle of pressing operation from a retracted position thereof which is spaced away from the base material moved to said first position by the base material carrier, successively to a first pressing position where the spaced distance between the pressing surface of said one heating plate and the surface of the first base material which faces said one heating plate and to which said first wood sheet is to be glued corresponds to the thickness of said first wood sheet, to a second pressing position where said spaced distance corresponds to the total of said thickness of said first wood sheet and the thickness of said second wood sheet to be glued to the second base material, and to (N-1)th pressing position, wherein "Nth" represents an ordinal number other than first, second and third, where said spaced distance corresponds to the total thickness of the first, second through (N-1)th wood sheets, and (2) after said one heating plate has vertically moved to each of said pressing positions, the other heating plate is vertically moved toward said one heating plate until the wood sheets placed to the opposite sides of the respective base material are pressed under a predetermined pressure, and also that (3) wood sheet having one surface thereof coated with the thermosetting adhesive is supplied to each of the opposite sides of the respective base material and the respective base material is moved by said base material carrier to said first position at latest before said one heating plate is moved to each of said pressing positions, and (4) after the wood sheets are continued to be pressed under said predetermined pressure for a predetermined length of time, said paired heating plates are vertically moved away from each other for retraction and the respective base material is moved by said base material carrier to said second position.

5. Apparatus according to claim 1, 2 or 4, further comprising an electric motor operatively connected to said one heating plate and having an encoder connected to said motor for counting rotation angle of the motor thereby to controllably move said one heating plate, and a hydraulic cylinder connected to said one heating plate and operable so as to hold said one heating plate at said pressing position.

6. Apparatus according to claim 1, 2 or 4, further comprising a hydraulic cylinder for moving said other heating plate toward the one heating plate.

* * * * *